United States Patent
Weston et al.

(10) Patent No.: US 9,616,334 B2
(45) Date of Patent: *Apr. 11, 2017

(54) MULTI-PLATFORM GAMING SYSTEM USING RFID-TAGGED TOYS

(71) Applicant: MQ GAMING, LLC, Irvine, CA (US)

(72) Inventors: Denise Chapman Weston, Wakefield, RI (US); Jonathan A. Barney, Newport Beach, CA (US)

(73) Assignee: MQ Gaming, LLC, Irvine, CA (US)

( * ) Notice: Subject to any disclaimer, the term of this patent is extended or adjusted under 35 U.S.C. 154(b) by 459 days.

This patent is subject to a terminal disclaimer.

(21) Appl. No.: 14/204,330

(22) Filed: Mar. 11, 2014

(65) Prior Publication Data
US 2014/0342831 A1    Nov. 20, 2014

Related U.S. Application Data

(60) Continuation of application No. 13/440,812, filed on Apr. 5, 2012, now Pat. No. 8,702,515, which is a
(Continued)

(51) Int. Cl.
*A63F 9/24* (2006.01)
*A63F 13/00* (2014.01)
(Continued)

(52) U.S. Cl.
CPC ............ *A63F 13/235* (2014.09); *A63F 13/10* (2013.01); *A63F 13/24* (2014.09); *A63F 13/323* (2014.09);
(Continued)

(58) Field of Classification Search
CPC ................................ A63F 13/10; G06K 7/008
(Continued)

(56) References Cited

U.S. PATENT DOCUMENTS 973,105 A    10/1910  Chamberlain, Jr.
1,661,058 A   2/1928  Theremin
(Continued)

FOREIGN PATENT DOCUMENTS

CN    1032246       4/1989
CN    2113224 U     2/1992
(Continued)

OTHER PUBLICATIONS

"HyperScan", release date Oct. 2006. Source http://www.giantbomb.com/hyperscan/3045-1 041.
(Continued)

*Primary Examiner* — William A Brandenburg
(74) *Attorney, Agent, or Firm* — Knobbe, Martens, Olson & Bear, LLP

(57) ABSTRACT

A multi-platform gaming system for amusing or entertaining one or more game participants playing a game on a gaming platform is described. The multi-platform gaming system can include collectible toys depicting or representing one or more game characters or objects relevant to a game adapted to be played on the gaming platform. The collectible toys can have associated therewith an RFID tag including a corresponding unique tag identification number. The RFID tag can include an antenna, integrated circuitry for wirelessly transmitting and receiving information to and from an associated RFID tag reader, and non-volatile programmable memory for storing game-relevant information describing skills, abilities or attributes associated with one of said game characters or objects.

20 Claims, 23 Drawing Sheets

Related U.S. Application Data division of application No. 13/209,087, filed on Aug. 12, 2011, which is a continuation of application No. 11/507,934, filed on Aug. 22, 2006, now abandoned, which is a continuation-in-part of application No. 11/183,592, filed on Jul. 18, 2005, now Pat. No. 8,608,535, which is a continuation of application No. 10/410,583, filed on Apr. 7, 2003, now Pat. No. 6,967,566.

(60) Provisional application No. 60/370,568, filed on Apr. 5, 2002.

(51) Int. Cl.
| | |
|---|---|
| *G06F 17/00* | (2006.01) |
| *G06F 19/00* | (2011.01) |
| *A63F 13/235* | (2014.01) |
| *A63F 13/24* | (2014.01) |
| *A63H 30/04* | (2006.01) |
| *A63H 33/00* | (2006.01) |
| *A63J 21/00* | (2006.01) |
| *G06Q 30/02* | (2012.01) |
| *A63F 13/323* | (2014.01) |
| *A63F 13/98* | (2014.01) |
| *A63F 13/40* | (2014.01) |
| *A63F 3/00* | (2006.01) |

(52) U.S. Cl.
CPC ............ *A63F 13/98* (2014.09); *A63H 30/04* (2013.01); *A63H 33/009* (2013.01); *A63J 21/00* (2013.01); *G06Q 30/02* (2013.01); *A63F 3/00145* (2013.01); *A63F 2300/1025* (2013.01); *A63F 2300/1043* (2013.01); *A63F 2300/201* (2013.01); *A63F 2300/206* (2013.01); *A63F 2300/636* (2013.01); *A63F 2300/69* (2013.01); *A63F 2300/807* (2013.01); *A63H 2200/00* (2013.01)

(58) Field of Classification Search
USPC .......................................................... 463/39
See application file for complete search history.

(56) References Cited

U.S. PATENT DOCUMENTS

| | | |
|---|---|---|
| 1,789,680 A | 1/1931 | Gwinnett |
| 2,001,366 A | 5/1935 | Mittelman |
| 2,752,725 A | 7/1956 | Unsworth |
| 2,902,023 A | 9/1959 | Waller |
| 3,135,512 A | 6/1964 | Taylor |
| 3,336,030 A | 8/1967 | Martell et al. |
| 3,395,920 A | 8/1968 | Moe |
| 3,454,920 A | 7/1969 | Mehr |
| 3,456,134 A | 7/1969 | Ko |
| 3,468,533 A | 9/1969 | House, Jr. |
| 3,474,241 A | 10/1969 | Kuipers |
| D220,268 S | 3/1971 | Kliewer |
| 3,572,712 A | 3/1971 | Vick |
| 3,633,904 A | 1/1972 | Kojima |
| 3,660,648 A | 5/1972 | Kuipers |
| 3,707,055 A | 12/1972 | Pearce |
| 3,795,805 A | 3/1974 | Swanberg et al. |
| 3,843,127 A | 10/1974 | Lack |
| 3,949,364 A | 4/1976 | Clark et al. |
| 3,949,679 A | 4/1976 | Barber |
| 3,973,257 A | 8/1976 | Rowe |
| 3,978,481 A | 8/1976 | Angwin et al. |
| 3,997,156 A | 12/1976 | Barlow et al. |
| 4,009,619 A | 3/1977 | Snymann |
| 4,038,876 A | 8/1977 | Morris |
| 4,055,341 A | 10/1977 | Martinez |
| 4,063,111 A | 12/1977 | Dobler et al. |
| 4,153,250 A | 5/1979 | Anthony |
| 4,166,406 A | 9/1979 | Maughmer |
| 4,171,737 A | 10/1979 | McLaughlin |
| 4,175,665 A | 11/1979 | Dogliotti |
| 4,205,785 A | 6/1980 | Stanley |
| 4,231,077 A | 10/1980 | Joyce et al. |
| 4,240,638 A | 12/1980 | Morrison et al. |
| 4,282,681 A | 8/1981 | McCaslin |
| 4,287,765 A | 9/1981 | Kreft |
| 4,296,929 A | 10/1981 | Meyer et al. |
| 4,303,978 A | 12/1981 | Shaw |
| 4,318,245 A | 3/1982 | Stowell et al. |
| 4,321,678 A | 3/1982 | Krogmann |
| 4,325,199 A | 4/1982 | McEdwards |
| 4,337,948 A | 7/1982 | Breslow |
| 4,342,985 A | 8/1982 | Desjardins |
| 4,402,250 A | 9/1983 | Baasch |
| 4,412,205 A | 10/1983 | Von Kemenczky |
| 4,425,488 A | 1/1984 | Moskin |
| 4,443,866 A | 4/1984 | Burgiss |
| 4,450,325 A | 5/1984 | Luque |
| 4,503,299 A | 3/1985 | Henrard |
| 4,514,600 A | 4/1985 | Lentz |
| 4,514,798 A | 4/1985 | Lesche |
| 4,540,176 A | 9/1985 | Baer |
| 4,546,551 A | 10/1985 | Franks |
| 4,558,604 A | 12/1985 | Auer |
| 4,561,299 A | 12/1985 | Orlando |
| 4,575,621 A | 3/1986 | Dreifus |
| 4,578,674 A | 3/1986 | Baker et al. |
| 4,595,369 A | 6/1986 | Downs |
| 4,623,887 A | 11/1986 | Welles |
| 4,623,930 A | 11/1986 | Oshima |
| 4,627,620 A | 12/1986 | Yang |
| 4,645,458 A | 2/1987 | Williams |
| 4,672,374 A | 6/1987 | Desjardins |
| 4,678,450 A | 7/1987 | Scolari et al. |
| 4,695,058 A | 9/1987 | Carter, III et al. |
| 4,695,953 A | 9/1987 | Blair et al. |
| 4,699,379 A | 10/1987 | Chateau et al. |
| 4,739,128 A | 4/1988 | Grisham |
| 4,750,733 A | 6/1988 | Foth |
| 4,761,540 A | 8/1988 | McGeorge |
| 4,776,253 A | 10/1988 | Downes |
| 4,787,051 A | 11/1988 | Olson |
| 4,816,810 A | 3/1989 | Moore |
| 4,817,950 A | 4/1989 | Goo |
| 4,819,182 A | 4/1989 | King et al. |
| 4,837,568 A | 6/1989 | Snaper et al. |
| 4,839,838 A | 6/1989 | LaBiche et al. |
| 4,843,568 A | 6/1989 | Kreuger et al. |
| 4,849,655 A | 7/1989 | Bennett |
| 4,851,685 A | 7/1989 | Dubgen |
| 4,858,390 A | 8/1989 | Kenig |
| 4,858,930 A | 8/1989 | Sato |
| 4,862,165 A | 8/1989 | Gart |
| 4,882,717 A | 11/1989 | Hayakawa et al. |
| 4,891,032 A | 1/1990 | Davis |
| 4,904,222 A | 2/1990 | Gastgeb et al. |
| 4,910,677 A | 3/1990 | Remedio et al. |
| 4,914,598 A | 4/1990 | Krogmann |
| 4,918,293 A | 4/1990 | McGeorge |
| 4,924,358 A | 5/1990 | VonHeck |
| 4,932,917 A | 6/1990 | Klitsner |
| 4,957,291 A | 9/1990 | Miffitt |
| 4,960,275 A | 10/1990 | Magon |
| 4,961,369 A | 10/1990 | McGill |
| 4,964,837 A | 10/1990 | Collier |
| 4,967,321 A | 10/1990 | Cimock |
| 4,969,647 A | 11/1990 | Mical et al. |
| 4,980,519 A | 12/1990 | Mathews |
| 4,988,981 A | 1/1991 | Zimmerman et al. |
| 4,994,795 A | 2/1991 | MacKenzie |
| 5,011,161 A | 4/1991 | Galphin |
| 5,036,442 A | 7/1991 | Brown |
| RE33,662 E | 8/1991 | Blair et al. |
| 5,045,843 A | 9/1991 | Hansen |
| 5,048,831 A | 9/1991 | Sides |

(56) References Cited

U.S. PATENT DOCUMENTS

| | | |
|---|---|---|
| D320,624 S | 10/1991 | Taylor |
| 5,058,480 A | 10/1991 | Suzuki et al. |
| 5,059,958 A | 10/1991 | Jacobs et al. |
| 5,062,696 A | 11/1991 | Oshima |
| 5,068,645 A | 11/1991 | Drumm |
| D322,242 S | 12/1991 | Cordell |
| 5,076,584 A | 12/1991 | Openiano |
| D325,225 S | 4/1992 | Adhida |
| 5,114,155 A | 5/1992 | Tillery et al. |
| 5,114,344 A | 5/1992 | Fumagalli et al. |
| 5,124,938 A | 6/1992 | Algrain |
| 5,127,657 A | 7/1992 | Ikezawa et al. |
| 5,128,671 A | 7/1992 | Thomas, Jr. |
| D328,463 S | 8/1992 | King et al. |
| 5,136,222 A | 8/1992 | Yamamoto |
| 5,138,154 A | 8/1992 | Hotelling |
| 5,145,446 A | 9/1992 | Kuo |
| D331,058 S | 11/1992 | Morales |
| 5,166,502 A | 11/1992 | Rendleman |
| 5,170,002 A | 12/1992 | Suzuki et al. |
| 5,175,481 A | 12/1992 | Kanno |
| 5,177,311 A | 1/1993 | Suzuki et al. |
| 5,178,477 A | 1/1993 | Gambaro |
| 5,181,181 A | 1/1993 | Glynn |
| 5,184,830 A | 2/1993 | Okada et al. |
| 5,188,368 A | 2/1993 | Ryan |
| 5,190,285 A | 3/1993 | Levy et al. |
| 5,192,082 A | 3/1993 | Inoue et al. |
| 5,192,823 A | 3/1993 | Suzuki et al. |
| 5,194,006 A | 3/1993 | Zaenglein, Jr. |
| 5,194,048 A | 3/1993 | Briggs |
| 5,202,844 A | 4/1993 | Kamio |
| 5,207,426 A | 5/1993 | Inoue et al. |
| 5,212,368 A | 5/1993 | Hara |
| 5,213,327 A | 5/1993 | Kitaue |
| 5,223,698 A | 6/1993 | Kapur |
| 5,231,568 A | 7/1993 | Cohen et al. |
| D338,242 S | 8/1993 | Cordell |
| 5,232,223 A | 8/1993 | Dornbusch |
| 5,236,200 A | 8/1993 | McGregor et al. |
| 5,247,651 A | 9/1993 | Clarisse |
| D340,042 S | 10/1993 | Copper et al. |
| 5,259,626 A | 11/1993 | Ho |
| 5,262,777 A | 11/1993 | Low et al. |
| D342,256 S | 12/1993 | Payne et al. |
| 5,277,645 A | 1/1994 | Kelley et al. |
| 5,279,513 A | 1/1994 | Connelly |
| 5,280,744 A | 1/1994 | DeCarlo |
| D345,164 S | 3/1994 | Grae |
| 5,290,964 A | 3/1994 | Hiyoshi et al. |
| 5,292,124 A | 3/1994 | Carpenter |
| 5,292,254 A | 3/1994 | Miller et al. |
| 5,296,871 A | 3/1994 | Paley |
| 5,299,967 A | 4/1994 | Gilbert |
| 5,307,325 A | 4/1994 | Scheiber |
| 5,310,192 A | 5/1994 | Miyake |
| 5,317,394 A | 5/1994 | Hale |
| 5,319,548 A | 6/1994 | Germain |
| 5,320,358 A | 6/1994 | Jones |
| 5,320,362 A | 6/1994 | Bear et al. |
| 5,329,276 A | 7/1994 | Hirabayashi |
| 5,332,322 A | 7/1994 | Gambaro |
| 5,339,095 A | 8/1994 | Redford |
| D350,736 S | 9/1994 | Takahashi et al. |
| D350,782 S | 9/1994 | Barr |
| D351,430 S | 10/1994 | Barr |
| 5,354,057 A | 10/1994 | Pruitt et al. |
| 5,356,343 A | 10/1994 | Lovetere |
| 5,357,267 A | 10/1994 | Inoue |
| 5,359,321 A | 10/1994 | Ribic |
| 5,359,348 A | 10/1994 | Pilcher et al. |
| 5,363,120 A | 11/1994 | Drumm |
| 5,365,214 A | 11/1994 | Angott et al. |
| 5,366,229 A | 11/1994 | Suzuki |
| 5,369,580 A | 11/1994 | Monji |
| 5,369,889 A | 12/1994 | Callaghan |
| 5,372,365 A | 12/1994 | McTeigue et al. |
| 5,373,857 A | 12/1994 | Travers et al. |
| 5,378,197 A | 1/1995 | Briggs |
| 5,382,026 A | 1/1995 | Harvard et al. |
| 5,392,613 A | 2/1995 | Goto |
| 5,393,074 A | 2/1995 | Bear et al. |
| 5,396,227 A | 3/1995 | Carroll et al. |
| 5,396,265 A | 3/1995 | Ulrich et al. |
| 5,403,238 A | 4/1995 | Baxter et al. |
| 5,405,294 A | 4/1995 | Briggs |
| 5,411,269 A | 5/1995 | Thomas |
| 5,416,535 A | 5/1995 | Sato et al. |
| 5,421,575 A | 6/1995 | Triner |
| 5,421,590 A | 6/1995 | Robbins |
| 5,422,956 A | 6/1995 | Wheaton |
| 5,429,361 A | 7/1995 | Raven et al. |
| 5,430,435 A | 7/1995 | Hoch |
| 5,432,864 A | 7/1995 | Lu et al. |
| 5,435,561 A | 7/1995 | Conley |
| 5,435,569 A | 7/1995 | Zilliox |
| D360,903 S | 8/1995 | Barr et al. |
| 5,439,199 A | 8/1995 | Briggs et al. |
| 5,440,326 A | 8/1995 | Quinn |
| 5,443,261 A | 8/1995 | Lee et al. |
| 5,452,893 A | 9/1995 | Faulk et al. |
| 5,453,053 A | 9/1995 | Danta et al. |
| 5,453,758 A | 9/1995 | Sato |
| D362,870 S | 10/1995 | Oikawa |
| 5,459,489 A | 10/1995 | Redford |
| 5,469,194 A | 11/1995 | Clark et al. |
| 5,481,957 A | 1/1996 | Paley |
| 5,482,510 A | 1/1996 | Ishii et al. |
| 5,484,355 A | 1/1996 | King |
| 5,485,171 A | 1/1996 | Copper et al. |
| 5,488,362 A | 1/1996 | Ullman et al. |
| 5,490,058 A | 2/1996 | Yamasaki |
| 5,498,002 A | 3/1996 | Gechter |
| 5,502,486 A | 3/1996 | Ueda |
| 5,506,605 A | 4/1996 | Paley |
| 5,509,806 A | 4/1996 | Ellsworth |
| 5,512,892 A | 4/1996 | Corballis et al. |
| 5,516,105 A | 5/1996 | Eisenbrey et al. |
| 5,517,183 A | 5/1996 | Bozeman |
| 5,523,800 A | 6/1996 | Dudek |
| 5,524,637 A | 6/1996 | Erickson |
| 5,526,022 A | 6/1996 | Donahue et al. |
| 5,528,222 A | 6/1996 | Moskowitz |
| 5,528,265 A | 6/1996 | Harrison |
| 5,531,443 A | 7/1996 | Cruz |
| 5,533,933 A | 7/1996 | Garnjost et al. |
| 5,541,860 A | 7/1996 | Takei et al. |
| 5,550,721 A | 8/1996 | Rapisarda |
| 5,551,701 A | 9/1996 | Bouton et al. |
| 5,554,033 A | 9/1996 | Bizzi et al. |
| 5,554,980 A | 9/1996 | Hashimoto et al. |
| 5,561,543 A | 10/1996 | Ogawa |
| 5,563,628 A | 10/1996 | Stroop |
| 5,569,085 A | 10/1996 | Igarashi et al. |
| D375,326 S | 11/1996 | Yokoi et al. |
| 5,573,011 A | 11/1996 | Felsing |
| 5,574,479 A | 11/1996 | Odell |
| 5,579,025 A | 11/1996 | Itoh |
| D376,826 S | 12/1996 | Ashida |
| 5,580,319 A | 12/1996 | Hamilton |
| 5,581,484 A | 12/1996 | Prince |
| 5,585,584 A | 12/1996 | Usa |
| 5,586,767 A | 12/1996 | Bohland |
| 5,587,558 A | 12/1996 | Matsushima |
| 5,587,740 A | 12/1996 | Brennan |
| 5,594,465 A | 1/1997 | Poulachon |
| 5,598,187 A | 1/1997 | Ide et al. |
| 5,602,569 A | 2/1997 | Kato |
| 5,603,658 A | 2/1997 | Cohen |
| 5,605,505 A | 2/1997 | Han |
| 5,606,343 A | 2/1997 | Tsuboyama |
| 5,611,731 A | 3/1997 | Bouton et al. |
| 5,613,913 A | 3/1997 | Ikematsu et al. |
| 5,615,132 A | 3/1997 | Horton |

(56) References Cited

U.S. PATENT DOCUMENTS

| | | |
|---|---|---|
| 5,621,459 A | 4/1997 | Ueda |
| 5,623,581 A | 4/1997 | Attenberg |
| 5,624,117 A | 4/1997 | Ohkubo et al. |
| 5,627,565 A | 5/1997 | Morishita et al. |
| 5,629,981 A | 5/1997 | Nerlikar |
| 5,632,878 A | 5/1997 | Kitano |
| D379,832 S | 6/1997 | Ashida |
| 5,636,994 A | 6/1997 | Tong |
| 5,640,152 A | 6/1997 | Copper |
| 5,641,288 A | 6/1997 | Zzenglein, Jr. |
| 5,642,931 A | 7/1997 | Gappelberg |
| 5,643,087 A | 7/1997 | Marcus et al. |
| 5,645,077 A | 7/1997 | Foxlin |
| 5,645,277 A | 7/1997 | Cheng |
| 5,647,796 A | 7/1997 | Cohen |
| 5,649,867 A | 7/1997 | Briggs |
| 5,651,049 A | 7/1997 | Easterling et al. |
| 5,655,053 A | 8/1997 | Renie |
| 5,662,332 A | 9/1997 | Garfield |
| 5,662,525 A | 9/1997 | Briggs |
| 5,666,138 A | 9/1997 | Culver |
| 5,667,217 A | 9/1997 | Kelly et al. |
| 5,667,220 A | 9/1997 | Cheng |
| 5,670,845 A | 9/1997 | Grant |
| 5,670,988 A | 9/1997 | Tickle |
| 5,672,090 A | 9/1997 | Liu |
| 5,674,128 A | 10/1997 | Holch et al. |
| 5,676,450 A | 10/1997 | Sink et al. |
| 5,676,673 A | 10/1997 | Ferre et al. |
| 5,679,004 A | 10/1997 | McGowan et al. |
| 5,682,181 A | 10/1997 | Nguyen et al. |
| 5,685,776 A | 11/1997 | Stambolic et al. |
| 5,685,778 A | 11/1997 | Sheldon et al. |
| 5,694,340 A | 12/1997 | Kim |
| 5,698,784 A | 12/1997 | Hotelling et al. |
| 5,701,131 A | 12/1997 | Kuga |
| 5,702,232 A | 12/1997 | Moore |
| 5,702,305 A | 12/1997 | Norman et al. |
| 5,702,323 A | 12/1997 | Poulton |
| 5,703,623 A | 12/1997 | Hall et al. |
| 5,716,216 A | 2/1998 | O'Loughlin et al. |
| 5,716,281 A | 2/1998 | Dote |
| 5,724,106 A | 3/1998 | Autry et al. |
| 5,724,497 A | 3/1998 | San et al. |
| 5,726,675 A | 3/1998 | Inoue |
| 5,733,131 A | 3/1998 | Park |
| 5,734,371 A | 3/1998 | Kaplan |
| 5,734,373 A | 3/1998 | Rosenberg |
| 5,734,807 A | 3/1998 | Sumi |
| D393,884 S | 4/1998 | Hayami |
| 5,736,970 A | 4/1998 | Bozeman |
| 5,739,811 A | 4/1998 | Rosenberg et al. |
| 5,741,182 A | 4/1998 | Lipps et al. |
| 5,741,189 A | 4/1998 | Briggs |
| 5,742,233 A | 4/1998 | Doe et al. |
| 5,742,331 A | 4/1998 | Uomori |
| 5,745,226 A | 4/1998 | Gigioli |
| D394,264 S | 5/1998 | Sakamoto et al. |
| 5,746,602 A | 5/1998 | Kikinis |
| 5,751,273 A | 5/1998 | Cohen |
| 5,752,880 A | 5/1998 | Gabai et al. |
| 5,752,882 A | 5/1998 | Acres et al. |
| 5,757,305 A | 5/1998 | Xydis |
| 5,757,354 A | 5/1998 | Kawamura |
| 5,757,360 A | 5/1998 | Nitta et al. |
| D395,464 S | 6/1998 | Shiibashi et al. |
| 5,764,224 A | 6/1998 | Lilja et al. |
| 5,766,077 A | 6/1998 | Hongo |
| 5,769,719 A | 6/1998 | Hsu |
| 5,770,533 A | 6/1998 | Franchi |
| 5,771,038 A | 6/1998 | Wang |
| 5,772,508 A | 6/1998 | Sugita et al. |
| D396,468 S | 7/1998 | Schindler et al. |
| 5,775,998 A | 7/1998 | Ikematsu et al. |
| 5,779,240 A | 7/1998 | Santella |
| 5,785,317 A | 7/1998 | Sasaki |
| 5,785,592 A | 7/1998 | Jacobsen |
| 5,785,952 A | 7/1998 | Taylor et al. |
| 5,786,626 A | 7/1998 | Brady et al. |
| D397,162 S | 8/1998 | Yokoi et al. |
| 5,791,648 A | 8/1998 | Hohl |
| 5,794,081 A | 8/1998 | Itoh |
| 5,796,354 A | 8/1998 | Cartabiano et al. |
| 5,803,740 A | 9/1998 | Gesink et al. |
| 5,803,840 A | 9/1998 | Young |
| 5,806,849 A | 9/1998 | Rutkowski |
| 5,807,284 A | 9/1998 | Foxlin |
| 5,810,666 A | 9/1998 | Mero et al. |
| 5,811,896 A | 9/1998 | Grad |
| 5,819,206 A | 10/1998 | Horton et al. |
| 5,820,462 A | 10/1998 | Yokoi et al. |
| 5,820,471 A | 10/1998 | Briggs |
| 5,820,472 A | 10/1998 | Briggs |
| 5,821,859 A | 10/1998 | Schrott et al. |
| 5,822,713 A | 10/1998 | Profeta |
| 5,825,298 A | 10/1998 | Walter |
| 5,825,350 A | 10/1998 | Case, Jr. et al. |
| D400,885 S | 11/1998 | Goto |
| 5,830,065 A | 11/1998 | Sitrick |
| 5,831,553 A | 11/1998 | Lenssen et al. |
| 5,833,549 A | 11/1998 | Zur et al. |
| 5,835,077 A | 11/1998 | Dao et al. |
| 5,835,156 A | 11/1998 | Blonstein et al. |
| 5,835,576 A | 11/1998 | Katz |
| 5,836,817 A | 11/1998 | Acres et al. |
| 5,838,138 A | 11/1998 | Henty |
| 5,841,409 A | 11/1998 | Ishibashi et al. |
| D402,328 S | 12/1998 | Ashida |
| 5,847,854 A | 12/1998 | Benson, Jr. |
| 5,850,624 A | 12/1998 | Gard |
| 5,851,149 A | 12/1998 | Xidos et al. |
| 5,853,327 A | 12/1998 | Gilboa |
| 5,853,332 A | 12/1998 | Briggs |
| 5,854,622 A | 12/1998 | Brannon |
| 5,855,483 A | 1/1999 | Collins et al. |
| D405,071 S | 2/1999 | Gambaro |
| 5,865,680 A | 2/1999 | Briggs |
| 5,867,146 A | 2/1999 | Kim et al. |
| 5,874,941 A | 2/1999 | Yamada |
| 5,875,257 A | 2/1999 | Marrin et al. |
| D407,071 S | 3/1999 | Keating |
| D407,761 S | 4/1999 | Barr |
| 5,893,562 A | 4/1999 | Spector |
| 5,897,437 A | 4/1999 | Nishiumi |
| 5,898,421 A | 4/1999 | Quinn |
| 5,900,867 A | 5/1999 | Schindler et al. |
| 5,901,246 A | 5/1999 | Hoffberg et al. |
| 5,902,968 A | 5/1999 | Sato et al. |
| 5,906,542 A | 5/1999 | Neumann |
| D410,909 S | 6/1999 | Tickle |
| 5,908,996 A | 6/1999 | Litterst et al. |
| 5,911,634 A | 6/1999 | Nidata et al. |
| 5,912,612 A | 6/1999 | DeVolpi |
| 5,913,019 A | 6/1999 | Attenberg |
| 5,913,727 A | 6/1999 | Ahdoot |
| 5,919,149 A | 7/1999 | Allen |
| 5,923,317 A | 7/1999 | Sayler et al. |
| 5,924,695 A | 7/1999 | Heykoop |
| 5,926,780 A | 7/1999 | Fox et al. |
| 5,929,782 A | 7/1999 | Stark et al. |
| 5,929,841 A | 7/1999 | Fujii |
| 5,929,848 A | 7/1999 | Albukerk et al. |
| D412,940 S | 8/1999 | Kato et al. |
| 5,931,739 A | 8/1999 | Layer et al. |
| 5,942,969 A | 8/1999 | Wicks |
| 5,944,533 A | 8/1999 | Wood |
| 5,946,444 A | 8/1999 | Evans et al. |
| 5,947,789 A | 9/1999 | Chan |
| 5,947,868 A | 9/1999 | Dugan |
| 5,955,713 A | 9/1999 | Titus |
| 5,955,988 A | 9/1999 | Blonstein |
| 5,956,035 A | 9/1999 | Sciammarella |
| 5,957,779 A | 9/1999 | Larson |
| 5,961,386 A | 10/1999 | Sawaguchi |

(56) References Cited

U.S. PATENT DOCUMENTS

| | | |
|---|---|---|
| 5,963,136 A | 10/1999 | O'Brien |
| 5,964,660 A | 10/1999 | James et al. |
| 5,967,898 A | 10/1999 | Takasaka et al. |
| 5,967,901 A | 10/1999 | Briggs |
| 5,971,270 A | 10/1999 | Barna |
| 5,971,271 A | 10/1999 | Wynn et al. |
| 5,973,757 A | 10/1999 | Aubuchon et al. |
| 5,977,951 A | 11/1999 | Danieli et al. |
| 5,980,254 A | 11/1999 | Muehle et al. |
| 5,982,352 A | 11/1999 | Pryor |
| 5,982,356 A | 11/1999 | Akiyama |
| 5,984,785 A | 11/1999 | Takeda et al. |
| 5,984,788 A | 11/1999 | Lebensfeld et al. |
| 5,986,570 A | 11/1999 | Black et al. |
| 5,986,644 A | 11/1999 | Herder |
| 5,987,421 A | 11/1999 | Chuang |
| 5,989,120 A | 11/1999 | Truchsess |
| 5,991,085 A | 11/1999 | Rallison et al. |
| 5,991,693 A | 11/1999 | Zalewski |
| 5,996,033 A | 11/1999 | Chiu-Hao |
| 5,999,168 A | 12/1999 | Rosenberg |
| 6,001,014 A | 12/1999 | Ogata |
| 6,001,015 A | 12/1999 | Nishiumi et al. |
| 6,002,394 A | 12/1999 | Schein |
| 6,009,458 A | 12/1999 | Hawkins et al. |
| D419,199 S | 1/2000 | Cordell et al. |
| D419,200 S | 1/2000 | Ashida |
| 6,010,406 A | 1/2000 | Kajikawa et al. |
| 6,011,526 A | 1/2000 | Toyoshima et al. |
| 6,012,980 A | 1/2000 | Yoshida et al. |
| 6,012,984 A | 1/2000 | Roseman |
| 6,013,007 A | 1/2000 | Root et al. |
| 6,016,144 A | 1/2000 | Blonstein |
| 6,019,680 A | 2/2000 | Cheng |
| 6,020,876 A | 2/2000 | Rosenberg |
| 6,024,647 A | 2/2000 | Bennett et al. |
| 6,024,675 A | 2/2000 | Kashiwaguchi |
| 6,025,830 A | 2/2000 | Cohen |
| 6,037,882 A | 3/2000 | Levy |
| 6,044,297 A | 3/2000 | Sheldon |
| 6,049,823 A | 4/2000 | Hwang |
| 6,052,083 A | 4/2000 | Wilson |
| 6,057,788 A | 5/2000 | Cummings |
| 6,058,342 A | 5/2000 | Orbach |
| 6,059,576 A | 5/2000 | Brann |
| 6,060,847 A | 5/2000 | Hettema et al. |
| 6,066,075 A | 5/2000 | Poulton |
| 6,069,594 A | 5/2000 | Barnes et al. |
| 6,072,467 A | 6/2000 | Walker |
| 6,072,470 A | 6/2000 | Ishigaki |
| 6,075,443 A | 6/2000 | Schepps et al. |
| 6,075,575 A | 6/2000 | Schein et al. |
| 6,076,734 A | 6/2000 | Dougherty et al. |
| 6,077,106 A | 6/2000 | Mish |
| 6,078,789 A | 6/2000 | Bodenmann |
| 6,079,982 A | 6/2000 | Meader |
| 6,080,063 A | 6/2000 | Khosla |
| 6,081,819 A | 6/2000 | Ogino |
| 6,084,315 A | 7/2000 | Schmitt |
| 6,084,577 A | 7/2000 | Sato et al. |
| 6,085,805 A | 7/2000 | Bates |
| 6,087,950 A | 7/2000 | Capan |
| 6,089,987 A | 7/2000 | Briggs |
| 6,091,342 A | 7/2000 | Janesch et al. |
| D429,718 S | 8/2000 | Rudolph |
| 6,095,926 A | 8/2000 | Hettema et al. |
| 6,102,406 A | 8/2000 | Miles et al. |
| 6,110,000 A | 8/2000 | Ting |
| 6,110,039 A | 8/2000 | Oh |
| 6,110,041 A | 8/2000 | Walker et al. |
| 6,115,028 A | 9/2000 | Balakrishnan |
| 6,127,928 A | 10/2000 | Issacman et al. |
| 6,127,990 A | 10/2000 | Zwern |
| 6,129,549 A | 10/2000 | Thompson |
| 6,132,318 A | 10/2000 | Briggs |
| 6,137,457 A | 10/2000 | Tokuhashi |
| D433,381 S | 11/2000 | Talesfore |
| 6,142,870 A | 11/2000 | Wada |
| 6,142,876 A | 11/2000 | Cumbers |
| 6,144,367 A | 11/2000 | Berstis |
| 6,146,278 A | 11/2000 | Kobayashi |
| 6,148,100 A | 11/2000 | Anderson et al. |
| 6,149,490 A | 11/2000 | Hampton |
| 6,150,947 A | 11/2000 | Shima |
| 6,154,723 A | 11/2000 | Cox et al. |
| 6,155,926 A | 12/2000 | Miyamoto et al. |
| 6,160,405 A | 12/2000 | Needle |
| 6,160,540 A | 12/2000 | Fishkin et al. |
| 6,160,986 A | 12/2000 | Gabai et al. |
| 6,162,122 A | 12/2000 | Acres et al. |
| 6,162,123 A | 12/2000 | Woolston |
| 6,162,191 A | 12/2000 | Foxin |
| 6,164,808 A | 12/2000 | Shibata |
| 6,171,190 B1 | 1/2001 | Thanasack et al. |
| 6,174,242 B1 | 1/2001 | Briggs et al. |
| 6,176,837 B1 | 1/2001 | Foxlin |
| 6,181,253 B1 | 1/2001 | Eschenbach et al. |
| 6,181,329 B1 | 1/2001 | Stork et al. |
| 6,183,364 B1 | 2/2001 | Trovato |
| 6,183,365 B1 | 2/2001 | Tonomura et al. |
| 6,184,847 B1 | 2/2001 | Fateh et al. |
| 6,184,862 B1 | 2/2001 | Leiper |
| 6,184,863 B1 | 2/2001 | Sibert |
| 6,186,902 B1 | 2/2001 | Briggs |
| 6,190,174 B1 | 2/2001 | Lam |
| 6,191,774 B1 | 2/2001 | Schena |
| 6,196,893 B1 | 3/2001 | Casola et al. |
| 6,198,295 B1 | 3/2001 | Hill |
| 6,198,470 B1 | 3/2001 | Agam et al. |
| 6,198,471 B1 | 3/2001 | Cook |
| 6,200,216 B1 | 3/2001 | Peppel |
| 6,200,219 B1 | 3/2001 | Rudell et al. |
| 6,200,253 B1 | 3/2001 | Nishiumi |
| 6,201,554 B1 | 3/2001 | Lands |
| 6,206,745 B1 | 3/2001 | Gabai et al. |
| 6,206,782 B1 | 3/2001 | Walker et al. |
| 6,210,287 B1 | 4/2001 | Briggs |
| 6,211,861 B1 | 4/2001 | Rosenberg et al. |
| 6,214,155 B1 | 4/2001 | Leighton |
| 6,217,450 B1 | 4/2001 | Meredith |
| 6,217,478 B1 | 4/2001 | Vohmann |
| 6,220,171 B1 | 4/2001 | Hettema et al. |
| 6,220,964 B1 | 4/2001 | Miyamoto |
| 6,220,965 B1 | 4/2001 | Hanna et al. |
| 6,222,522 B1 | 4/2001 | Mathews |
| D442,998 S | 5/2001 | Ashida |
| 6,224,486 B1 | 5/2001 | Walker et al. |
| 6,224,491 B1 | 5/2001 | Hiromi et al. |
| 6,225,987 B1 | 5/2001 | Matsuda |
| 6,226,534 B1 | 5/2001 | Aizawa |
| 6,227,966 B1 | 5/2001 | Yokoi |
| 6,227,974 B1 | 5/2001 | Eilat et al. |
| 6,231,451 B1 | 5/2001 | Briggs |
| 6,234,803 B1 | 5/2001 | Watkins |
| 6,238,289 B1 | 5/2001 | Sobota et al. |
| 6,238,291 B1 | 5/2001 | Fujimoto et al. |
| 6,239,806 B1 | 5/2001 | Nishiumi et al. |
| RE37,220 E | 6/2001 | Rapisarda et al. |
| 6,241,611 B1 | 6/2001 | Takeda et al. |
| 6,243,491 B1 | 6/2001 | Andersson |
| 6,243,658 B1 | 6/2001 | Raby |
| 6,244,987 B1 | 6/2001 | Ohsuga et al. |
| 6,245,014 B1 | 6/2001 | Brainard et al. |
| 6,248,019 B1 | 6/2001 | Mudie et al. |
| 6,254,101 B1 | 7/2001 | Young |
| 6,254,394 B1 | 7/2001 | Draper et al. |
| 6,261,180 B1 | 7/2001 | Lebensfeld et al. |
| 6,264,202 B1 | 7/2001 | Briggs |
| 6,264,558 B1 | 7/2001 | Nishiumi et al. |
| 6,265,984 B1 | 7/2001 | Molinaroli |
| 6,267,673 B1 | 7/2001 | Miyamoto et al. |
| 6,273,425 B1 | 8/2001 | Westfall et al. |
| 6,273,819 B1 | 8/2001 | Strauss et al. |
| 6,276,353 B1 | 8/2001 | Briggs et al. |

(56) References Cited

U.S. PATENT DOCUMENTS

| | | |
|---|---|---|
| 6,280,327 B1 | 8/2001 | Leifer et al. |
| 6,280,328 B1 | 8/2001 | Holch et al. |
| 6,283,862 B1 | 9/2001 | Richter |
| 6,283,871 B1 | 9/2001 | Briggs |
| 6,287,200 B1 | 9/2001 | Sharma |
| 6,290,565 B1 | 9/2001 | Galyean, III et al. |
| 6,290,566 B1 | 9/2001 | Gabai et al. |
| 6,293,684 B1 | 9/2001 | Riblett |
| 6,297,751 B1 | 10/2001 | Fadavi-Ardekani |
| 6,301,534 B1 | 10/2001 | McDermott |
| 6,302,793 B1 | 10/2001 | Fertitta, III et al. |
| 6,302,796 B1 | 10/2001 | Lebensfeld et al. |
| 6,304,250 B1 | 10/2001 | Yang |
| 6,311,982 B1 | 11/2001 | Lebensfeld et al. |
| 6,312,335 B1 | 11/2001 | Tosaki et al. |
| 6,315,673 B1 | 11/2001 | Kopera |
| 6,320,495 B1 | 11/2001 | Sporgis |
| 6,322,365 B1 | 11/2001 | Shechter et al. |
| 6,323,614 B1 | 11/2001 | Palaxxolo |
| 6,323,654 B1 | 11/2001 | Needle |
| 6,325,718 B1 | 12/2001 | Nishiumi et al. |
| 6,328,648 B1 | 12/2001 | Walker et al. |
| 6,328,650 B1 | 12/2001 | Fukawa et al. |
| 6,329,648 B1 | 12/2001 | Delatorre |
| 6,330,427 B1 | 12/2001 | Tabachnik |
| 6,331,841 B1 | 12/2001 | Tokuhashi |
| 6,331,856 B1 | 12/2001 | VanHook |
| 6,332,840 B1 | 12/2001 | Nishiumi et al. |
| 6,337,954 B1 | 1/2002 | Soshi |
| 6,342,010 B1 | 1/2002 | Slifer |
| 6,346,047 B1 | 2/2002 | Sobota |
| 6,347,993 B1 | 2/2002 | Kondo et al. |
| 6,347,998 B1 | 2/2002 | Yoshitomi et al. |
| 6,350,199 B1 | 2/2002 | Williams et al. |
| 6,352,478 B1 * | 3/2002 | Gabai ............... A63F 13/30 463/42 |
| 6,356,867 B1 | 3/2002 | Gabai et al. |
| 6,361,396 B1 | 3/2002 | Snyder |
| 6,361,507 B1 | 3/2002 | Foxlin |
| D456,410 S | 4/2002 | Ashida |
| 6,364,735 B1 | 4/2002 | Bristow et al. |
| 6,368,177 B1 | 4/2002 | Gabai et al. |
| 6,368,217 B2 | 4/2002 | Kanno |
| 6,369,794 B1 | 4/2002 | Sakurai et al. |
| 6,369,908 B1 | 4/2002 | Frey et al. |
| 6,371,375 B1 | 4/2002 | Ackley et al. |
| 6,371,853 B1 | 4/2002 | Borta |
| 6,375,566 B1 | 4/2002 | Yamada |
| 6,375,569 B1 | 4/2002 | Acres |
| 6,375,572 B1 | 4/2002 | Masuyama et al. |
| 6,375,578 B1 | 4/2002 | Briggs |
| 6,377,793 B1 | 4/2002 | Jenkins |
| 6,377,906 B1 | 4/2002 | Rowe |
| D456,854 S | 5/2002 | Ashida |
| 6,383,079 B1 | 5/2002 | Takeda et al. |
| 6,386,538 B1 | 5/2002 | Mejia |
| 6,392,613 B1 | 5/2002 | Goto |
| 6,394,904 B1 | 5/2002 | Stallker |
| 6,400,480 B1 | 6/2002 | Thomas |
| 6,400,996 B1 | 6/2002 | Hoffberg et al. |
| 6,404,409 B1 | 6/2002 | Solomon |
| 6,409,379 B1 | 6/2002 | Gabathuler et al. |
| 6,409,604 B1 | 6/2002 | Matsuno |
| 6,409,687 B1 | 6/2002 | Foxlin |
| D459,727 S | 7/2002 | Ashida |
| D460,787 S | 7/2002 | Nishikawa |
| 6,414,589 B1 | 7/2002 | Angott et al. |
| 6,415,223 B1 | 7/2002 | Lin |
| 6,421,056 B1 | 7/2002 | Nishiumi |
| 6,424,264 B1 | 7/2002 | Giraldin et al. |
| 6,424,333 B1 | 7/2002 | Tremblay |
| 6,426,719 B1 | 7/2002 | Nagareda |
| 6,426,741 B1 | 7/2002 | Goldsmith et al. |
| 6,438,193 B1 | 8/2002 | Ko et al. |
| D462,683 S | 9/2002 | Ashida |
| 6,445,960 B1 | 9/2002 | Borta |
| 6,452,494 B1 | 9/2002 | Harrison |
| 6,456,276 B1 | 9/2002 | Park |
| D464,052 S | 10/2002 | Fletcher |
| D464,950 S | 10/2002 | Fraquelli et al. |
| 6,462,769 B1 | 10/2002 | Trowbridge et al. |
| 6,463,257 B1 | 10/2002 | Wood |
| 6,463,859 B1 | 10/2002 | Ikezawa et al. |
| 6,466,198 B1 | 10/2002 | Feinstein |
| 6,466,831 B1 | 10/2002 | Shibata |
| 6,473,070 B2 | 10/2002 | Mishra et al. |
| 6,473,713 B1 | 10/2002 | McCall |
| 6,474,159 B1 | 11/2002 | Foxlin et al. |
| 6,482,067 B1 | 11/2002 | Pickens |
| 6,484,080 B2 | 11/2002 | Breed |
| 6,490,409 B1 | 12/2002 | Walker |
| 6,491,566 B2 | 12/2002 | Peters |
| 6,492,981 B1 | 12/2002 | Stork et al. |
| 6,494,457 B2 | 12/2002 | Conte et al. |
| 6,496,122 B2 | 12/2002 | Sampsell |
| 6,509,217 B1 | 1/2003 | Reddy |
| 6,512,511 B2 | 1/2003 | Willner |
| 6,517,438 B2 | 2/2003 | Tosaki |
| 6,518,952 B1 | 2/2003 | Leiper |
| 6,525,660 B1 | 2/2003 | Surintrspanont |
| 6,526,158 B1 | 2/2003 | Goldberg |
| 6,527,638 B1 | 3/2003 | Walker et al. |
| 6,527,646 B1 | 3/2003 | Briggs |
| 6,530,838 B2 | 3/2003 | Ha et al. |
| 6,530,841 B2 | 3/2003 | Bull et al. |
| 6,538,675 B2 | 3/2003 | Aratani |
| D473,942 S | 4/2003 | Motoki et al. |
| 6,540,607 B2 | 4/2003 | Mokris et al. |
| 6,540,611 B1 | 4/2003 | Nagata |
| 6,544,124 B2 | 4/2003 | Ireland |
| 6,544,126 B2 | 4/2003 | Sawano |
| 6,545,611 B2 | 4/2003 | Hayashi et al. |
| 6,545,661 B1 | 4/2003 | Goschy et al. |
| 6,551,165 B2 | 4/2003 | Smirnov |
| 6,551,188 B2 | 4/2003 | Toyama et al. |
| 6,554,707 B1 | 4/2003 | Sinclair et al. |
| 6,554,781 B1 | 4/2003 | Carter et al. |
| D474,763 S | 5/2003 | Tozaki et al. |
| 6,558,225 B1 | 5/2003 | Rehkemper et al. |
| 6,560,511 B1 | 5/2003 | Yokoo et al. |
| 6,561,049 B2 | 5/2003 | Akiyama et al. |
| 6,565,438 B2 | 5/2003 | Ogino |
| 6,565,444 B2 | 5/2003 | Nagata et al. |
| 6,567,536 B2 | 5/2003 | McNitt et al. |
| 6,569,023 B1 | 5/2003 | Briggs |
| 6,572,108 B1 | 6/2003 | Bristow |
| 6,575,753 B2 | 6/2003 | Rosa et al. |
| 6,577,350 B1 | 6/2003 | Proehl |
| 6,579,098 B2 | 6/2003 | Shechter |
| 6,582,299 B1 | 6/2003 | Matsuyama et al. |
| 6,582,380 B2 | 6/2003 | Kazlausky et al. |
| 6,583,783 B1 | 6/2003 | Dietrich |
| 6,585,596 B1 | 7/2003 | Liefer et al. |
| 6,589,120 B1 | 7/2003 | Takahashi |
| 6,590,536 B1 | 7/2003 | Walton |
| 6,591,677 B2 | 7/2003 | Rothoff |
| 6,592,461 B1 | 7/2003 | Raviv et al. |
| 6,595,863 B2 | 7/2003 | Chamberlain et al. |
| 6,597,342 B1 | 7/2003 | Haruta |
| 6,597,443 B2 | 7/2003 | Boman |
| 6,598,978 B2 | 7/2003 | Hasegawa |
| 6,599,194 B1 | 7/2003 | Smith |
| 6,605,038 B1 | 8/2003 | Teller et al. |
| 6,607,123 B1 | 8/2003 | Jollifee et al. |
| 6,609,969 B1 | 8/2003 | Luciano et al. |
| 6,609,977 B1 | 8/2003 | Shimizu |
| 6,616,452 B1 | 9/2003 | Clark et al. |
| 6,616,535 B1 | 9/2003 | Nishizak |
| 6,616,607 B2 | 9/2003 | Hashimoto |
| 6,626,728 B2 | 9/2003 | Holt |
| 6,628,257 B1 | 9/2003 | Oka |
| 6,629,019 B2 | 9/2003 | Legge et al. |
| 6,632,142 B2 | 10/2003 | Keith |
| 6,633,155 B1 | 10/2003 | Liang |

(56) References Cited

U.S. PATENT DOCUMENTS

| | | |
|---|---|---|
| 6,634,949 B1 | 10/2003 | Briggs et al. |
| 6,636,826 B1 | 10/2003 | Abe et al. |
| 6,641,482 B2 | 11/2003 | Masuyama et al. |
| 6,642,837 B1 | 11/2003 | Vigoda et al. |
| 6,650,029 B1 | 11/2003 | Johnston |
| 6,650,313 B2 | 11/2003 | Levine |
| 6,650,345 B1 | 11/2003 | Saito |
| 6,651,268 B1 | 11/2003 | Briggs |
| 6,654,001 B1 | 11/2003 | Su |
| 6,672,962 B1 | 1/2004 | Ozaki et al. |
| 6,676,520 B2 | 1/2004 | Nishiumi et al. |
| 6,676,524 B1 | 1/2004 | Botzas |
| 6,677,990 B1 | 1/2004 | Kawahara |
| 6,681,629 B2 | 1/2004 | Foxlin et al. |
| 6,682,074 B2 | 1/2004 | Weston |
| 6,682,351 B1 | 1/2004 | Abraham-Fuchs et al. |
| 6,684,062 B1 | 1/2004 | Gosior et al. |
| D486,145 S | 2/2004 | Kaminski et al. |
| 6,686,954 B1 | 2/2004 | Kitaguchi |
| 6,692,170 B2 | 2/2004 | Abir |
| 6,693,622 B1 | 2/2004 | Shahoian et al. |
| 6,702,672 B1 | 3/2004 | Angell et al. |
| 6,709,336 B2 | 3/2004 | Siegel et al. |
| 6,712,692 B2 | 3/2004 | Basson |
| 6,716,102 B2 | 4/2004 | Whitten et al. |
| 6,717,573 B1 | 4/2004 | Shahoian et al. |
| 6,717,673 B1 | 4/2004 | Janssen |
| 6,718,280 B2 | 4/2004 | Hermann |
| 6,725,107 B2 | 4/2004 | MacPherson |
| 6,725,173 B2 | 4/2004 | An |
| 6,726,099 B2 | 4/2004 | Becker et al. |
| D489,361 S | 5/2004 | Mori et al. |
| 6,729,934 B1 | 5/2004 | Driscoll et al. |
| 6,733,390 B2 | 5/2004 | Walker et al. |
| 6,736,009 B1 | 5/2004 | Schwabe |
| 6,739,874 B2 | 5/2004 | Marcus et al. |
| 6,739,979 B2 | 5/2004 | Tracy |
| D491,924 S | 6/2004 | Kaminski et al. |
| D492,285 S | 6/2004 | Ombao et al. |
| 6,743,104 B1 | 6/2004 | Ota et al. |
| 6,746,334 B1 | 6/2004 | Barney |
| 6,747,562 B2 | 6/2004 | Giraldin et al. |
| 6,747,632 B2 | 6/2004 | Howard |
| 6,747,690 B2 | 6/2004 | Molgaard |
| 6,749,432 B2 | 6/2004 | French et al. |
| 6,752,719 B2 | 6/2004 | Himoto et al. |
| 6,753,849 B1 | 6/2004 | Curran et al. |
| 6,753,888 B2 | 6/2004 | Kamiwada |
| 6,757,068 B2 | 6/2004 | Foxlin |
| 6,757,446 B1 | 6/2004 | Li |
| 6,761,637 B2 | 7/2004 | Weston et al. |
| 6,765,553 B1 | 7/2004 | Odamura |
| D495,336 S | 8/2004 | Andre et al. |
| 6,770,863 B2 | 8/2004 | Walley |
| 6,773,325 B1 | 8/2004 | Mawle et al. |
| 6,773,344 B1 | 8/2004 | Gabai et al. |
| 6,785,539 B2 | 8/2004 | Hale |
| 6,786,877 B2 | 9/2004 | Foxlin |
| 6,796,177 B2 | 9/2004 | Mori |
| 6,796,908 B2 | 9/2004 | Weston |
| 6,797,895 B2 | 9/2004 | Lapstun |
| 6,811,489 B1 | 11/2004 | Shimizu |
| 6,811,491 B1 | 11/2004 | Levenberg et al. |
| 6,812,583 B2 | 11/2004 | Cheung et al. |
| 6,812,881 B1 | 11/2004 | Mullaly et al. |
| 6,813,525 B2 | 11/2004 | Reid |
| 6,813,574 B1 | 11/2004 | Yedur |
| 6,813,584 B1 | 11/2004 | Zhou et al. |
| 6,816,151 B2 | 11/2004 | Dellinger |
| 6,821,204 B2 | 11/2004 | Aonuma et al. |
| 6,821,206 B1 | 11/2004 | Ishida et al. |
| 6,835,135 B1 | 12/2004 | Silverbrook et al. |
| 6,836,705 B2 | 12/2004 | Hellman |
| 6,836,751 B2 | 12/2004 | Paxton |
| 6,836,971 B1 | 1/2005 | Wang |
| 6,842,991 B2 | 1/2005 | Levi |
| 6,846,238 B2 | 1/2005 | Wells |
| 6,850,221 B1 | 2/2005 | Tickle |
| 6,850,844 B1 | 2/2005 | Walters |
| 6,852,032 B2 | 2/2005 | Ishino |
| 6,856,327 B2 | 2/2005 | Choi |
| D502,468 S | 3/2005 | Knight et al. |
| 6,868,738 B2 | 3/2005 | Moscrip |
| 6,872,139 B2 | 3/2005 | Sato et al. |
| 6,873,406 B1 | 3/2005 | Hines |
| D503,750 S | 4/2005 | Kit et al. |
| 6,878,066 B2 | 4/2005 | Leifer |
| 6,882,824 B2 | 4/2005 | Wood |
| D504,677 S | 5/2005 | Kaminski et al. |
| D505,424 S | 5/2005 | Ashida et al. |
| 6,890,262 B2 | 5/2005 | Oishi |
| 6,891,469 B2 | 5/2005 | Engellenner et al. |
| 6,891,526 B2 | 5/2005 | Gombert |
| 6,894,686 B2 | 5/2005 | Stamper et al. |
| 6,897,845 B2 | 5/2005 | Ozawa |
| 6,897,854 B2 | 5/2005 | Cho |
| 6,902,483 B2 | 6/2005 | Lin |
| 6,903,725 B2 | 6/2005 | Nacson |
| 6,905,411 B2 | 6/2005 | Nguyen et al. |
| 6,906,700 B1 | 6/2005 | Armstrong |
| 6,908,386 B2 | 6/2005 | Suzuki et al. |
| 6,908,388 B2 | 6/2005 | Shimizu |
| 6,918,833 B2 | 7/2005 | Emmerson et al. |
| 6,921,332 B2 | 7/2005 | Fukunaga |
| 6,922,632 B2 | 7/2005 | Foxlin |
| 6,924,787 B2 | 8/2005 | Kramer et al. |
| 6,925,410 B2 | 8/2005 | Narayanan |
| 6,929,543 B1 | 8/2005 | Ueshima et al. |
| 6,929,548 B2 | 8/2005 | Wang |
| 6,932,698 B2 | 8/2005 | Sprogis |
| 6,932,706 B1 | 8/2005 | Kaminkow |
| 6,933,861 B2 | 8/2005 | Wang |
| 6,933,923 B2 | 8/2005 | Feinstein |
| 6,935,864 B2 | 8/2005 | Shechter et al. |
| 6,935,952 B2 | 8/2005 | Walker et al. |
| 6,939,232 B2 | 9/2005 | Tanaka et al. |
| 6,948,999 B2 | 9/2005 | Chan |
| 6,954,980 B2 | 10/2005 | Song |
| 6,955,606 B2 | 10/2005 | Taho et al. |
| 6,956,564 B1 | 10/2005 | Williams |
| 6,965,374 B2 | 11/2005 | Villet et al. |
| 6,966,775 B1 | 11/2005 | Kendir et al. |
| 6,967,563 B2 | 11/2005 | Bormaster |
| 6,967,566 B2 | 11/2005 | Weston et al. |
| 6,982,697 B2 | 1/2006 | Wilson et al. |
| 6,983,219 B2 | 1/2006 | Mantyjarvi |
| 6,984,208 B2 | 1/2006 | Zheng |
| 6,990,639 B2 | 1/2006 | Wilson |
| 6,993,451 B2 | 1/2006 | Chang et al. |
| 6,995,748 B2 | 2/2006 | Gordon et al. |
| 6,998,966 B2 | 2/2006 | Pedersen |
| 7,000,469 B2 | 2/2006 | Foxlin et al. |
| 7,002,591 B1 | 2/2006 | Leather |
| 7,004,847 B2 | 2/2006 | Henry |
| 7,005,985 B1 | 2/2006 | Steeves |
| 7,029,400 B2 | 4/2006 | Briggs |
| 7,031,875 B2 | 4/2006 | Ellenby et al. |
| 7,038,661 B2 | 5/2006 | Wilson et al. |
| 7,040,986 B2 | 5/2006 | Koshima |
| 7,040,993 B1 | 5/2006 | Lovitt |
| 7,040,998 B2 | 5/2006 | Jolliffe et al. |
| 7,052,391 B1 | 5/2006 | Luciano, Jr. |
| 7,055,101 B2 | 5/2006 | Abbott et al. |
| 7,056,221 B2 | 6/2006 | Thirkettle et al. |
| 7,059,974 B1 | 6/2006 | Golliffe et al. |
| 7,066,781 B2 | 6/2006 | Weston |
| D524,298 S | 7/2006 | Hedderich et al. |
| 7,081,033 B1 | 7/2006 | Mawle |
| 7,081,051 B2 | 7/2006 | Himoto et al. |
| 7,086,645 B2 | 8/2006 | Hardie |
| 7,090,582 B2 | 8/2006 | Danieli et al. |
| 7,094,147 B2 | 8/2006 | Nakata |
| 7,098,891 B1 | 8/2006 | Pryor |
| 7,098,894 B2 | 8/2006 | Yang |

(56) References Cited

U.S. PATENT DOCUMENTS

| | | |
|---|---|---|
| 7,102,615 B2 | 9/2006 | Marks |
| 7,102,616 B1 | 9/2006 | Sleator |
| 7,107,168 B2 | 9/2006 | Oystol |
| D531,228 S | 10/2006 | Ashida et al. |
| 7,115,032 B2 | 10/2006 | Cantu et al. |
| 7,117,009 B2 | 10/2006 | Wong et al. |
| 7,118,482 B2 | 10/2006 | Ishihara et al. |
| 7,126,584 B1 | 10/2006 | Nishiumi et al. |
| 7,127,370 B2 | 10/2006 | Kelly |
| D531,585 S | 11/2006 | Weitgasser et al. |
| 7,133,026 B2 | 11/2006 | Horie et al. |
| 7,136,674 B2 | 11/2006 | Yoshie et al. |
| 7,136,826 B2 | 11/2006 | Alsafadi |
| 7,137,899 B2 | 11/2006 | Hiei |
| 7,139,983 B2 | 11/2006 | Kelts |
| 7,140,962 B2 | 11/2006 | Okuda et al. |
| 7,142,191 B2 | 11/2006 | Idesawa et al. |
| 7,145,551 B1 | 12/2006 | Bathiche |
| 7,149,627 B2 | 12/2006 | Ockerse |
| 7,154,475 B2 | 12/2006 | Crew |
| 7,155,604 B2 | 12/2006 | Kawai |
| 7,158,116 B2 | 1/2007 | Poltorak |
| 7,158,118 B2 | 1/2007 | Liberty |
| 7,160,196 B2 | 1/2007 | Thirkettle et al. |
| 7,168,089 B2 | 1/2007 | Nguyen et al. |
| 7,173,604 B2 | 2/2007 | Marvit |
| 7,176,919 B2 | 2/2007 | Drebin |
| 7,180,414 B2 | 2/2007 | Nyfelt |
| 7,180,503 B2 | 2/2007 | Burr |
| 7,182,691 B1 | 2/2007 | Schena |
| 7,183,480 B2 | 2/2007 | Nishitani et al. |
| 7,184,059 B1 | 2/2007 | Fouladi |
| D543,246 S | 5/2007 | Ashida et al. |
| 7,220,220 B2 | 5/2007 | Stubbs et al. |
| 7,223,173 B2 | 5/2007 | Masuyama et al. |
| 7,225,101 B2 | 5/2007 | Usuda et al. |
| 7,231,063 B2 | 6/2007 | Naimark |
| 7,233,316 B2 | 6/2007 | Smith et al. |
| 7,236,156 B2 | 6/2007 | Liberty et al. |
| 7,239,301 B2 | 7/2007 | Liberty et al. |
| 7,252,572 B2 | 8/2007 | Wright et al. |
| 7,253,800 B2 | 8/2007 | Goldberg et al. |
| 7,261,690 B2 | 8/2007 | Teller et al. |
| 7,262,760 B2 | 8/2007 | Liberty |
| RE39,818 E | 9/2007 | Slifer |
| 7,288,028 B2 | 10/2007 | Rodriguez et al. |
| D556,201 S | 11/2007 | Ashida et al. |
| 7,291,014 B2 | 11/2007 | Chung et al. |
| 7,292,151 B2 | 11/2007 | Ferguson et al. |
| 7,297,059 B2 | 11/2007 | Vancura et al. |
| 7,301,527 B2 | 11/2007 | Marvit |
| 7,301,648 B2 | 11/2007 | Foxlin |
| D556,760 S | 12/2007 | Ashida et al. |
| 7,307,617 B2 | 12/2007 | Wilson et al. |
| D559,847 S | 1/2008 | Ashida et al. |
| D561,178 S | 2/2008 | Azuma |
| 7,331,857 B2 | 2/2008 | MacIver |
| 7,335,134 B1 | 2/2008 | LaVelle |
| D563,948 S | 3/2008 | d'Hoore |
| 7,337,965 B2 | 3/2008 | Thirkettle et al. |
| 7,339,105 B2 | 3/2008 | Eitaki |
| 7,345,670 B2 | 3/2008 | Armstrong |
| D567,243 S | 4/2008 | Ashida et al. |
| 7,359,121 B2 | 4/2008 | French et al. |
| 7,359,451 B2 | 4/2008 | McKnight |
| 7,361,073 B2 | 4/2008 | Martin |
| RE40,324 E | 5/2008 | Crawford |
| 7,371,177 B2 | 5/2008 | Ellis et al. |
| 7,379,566 B2 | 5/2008 | Hildreth |
| 7,387,559 B2 | 6/2008 | Sanchez-Castro et al. |
| 7,394,459 B2 | 7/2008 | Bathiche et al. |
| 7,395,181 B2 | 7/2008 | Foxlin |
| 7,398,151 B1 | 7/2008 | Burrell et al. |
| 7,408,453 B2 | 8/2008 | Breed |
| 7,414,611 B2 | 8/2008 | Liberty |
| 7,419,428 B2 | 9/2008 | Rowe |
| 7,424,388 B2 | 9/2008 | Sato |
| 7,428,499 B1 | 9/2008 | Philyaw |
| 7,435,179 B1 | 10/2008 | Ford |
| 7,441,151 B2 | 10/2008 | Whitten et al. |
| 7,442,108 B2 | 10/2008 | Ganz |
| 7,445,550 B2 | 11/2008 | Barney et al. |
| 7,465,212 B2 | 12/2008 | Ganz |
| 7,488,231 B2 | 2/2009 | Weston |
| 7,488,254 B2 | 2/2009 | Himoto |
| 7,489,299 B2 | 2/2009 | Liberty et al. |
| 7,492,268 B2 | 2/2009 | Ferguson et al. |
| 7,492,367 B2 | 2/2009 | Mahajan et al. |
| 7,500,917 B2 | 3/2009 | Barney et al. |
| 7,502,759 B2 | 3/2009 | Hannigan et al. |
| 7,519,537 B2 | 4/2009 | Rosenberg |
| 7,524,246 B2 | 4/2009 | Briggs et al. |
| 7,535,456 B2 | 5/2009 | Liberty et al. |
| 7,536,156 B2 | 5/2009 | Tischer |
| 7,556,563 B2 | 7/2009 | Ellis et al. |
| 7,564,426 B2 | 7/2009 | Poor |
| 7,568,289 B2 | 8/2009 | Burlingham et al. |
| 7,572,191 B2 | 8/2009 | Weston et al. |
| 7,582,016 B2 | 9/2009 | Suzuki |
| 7,596,466 B2 | 9/2009 | Ohta |
| 7,614,958 B2 | 11/2009 | Weston et al. |
| 7,623,115 B2 | 11/2009 | Marks |
| 7,627,139 B2 | 12/2009 | Marks |
| 7,627,451 B2 | 12/2009 | Vock et al. |
| 7,645,178 B1 | 1/2010 | Trotto et al. |
| 7,662,015 B2 | 2/2010 | Hui |
| 7,663,509 B2 | 2/2010 | Shen |
| 7,674,184 B2 | 3/2010 | Briggs et al. |
| 7,704,135 B2 | 4/2010 | Harrison |
| 7,704,146 B2 | 4/2010 | Ellis |
| 7,727,090 B2 | 6/2010 | Gant |
| 7,749,089 B1 | 7/2010 | Briggs et al. |
| 7,774,155 B2 | 8/2010 | Sato et al. |
| 7,775,882 B2 | 8/2010 | Kawamura et al. |
| 7,775,884 B1 | 8/2010 | McCauley |
| 7,789,741 B1 | 9/2010 | Fields |
| 7,796,116 B2 | 9/2010 | Salsman et al. |
| 7,828,295 B2 | 11/2010 | Matsumoto et al. |
| 7,850,527 B2 | 12/2010 | Barney et al. |
| 7,878,905 B2 | 2/2011 | Weston et al. |
| 7,883,420 B2 | 2/2011 | Bradbury |
| 7,896,742 B2 | 3/2011 | Weston et al. |
| 7,927,216 B2 | 4/2011 | Ikeda |
| 7,942,745 B2 | 5/2011 | Ikeda |
| 7,989,971 B2 | 8/2011 | Lemieux |
| 8,021,239 B2 | 9/2011 | Weston et al. |
| 8,025,573 B2 | 9/2011 | Stenton et al. |
| 8,033,901 B2 | 10/2011 | Wood |
| 8,089,458 B2 | 1/2012 | Barney et al. |
| 8,164,567 B1 | 4/2012 | Barney et al. |
| 8,169,406 B2 | 5/2012 | Barney et al. |
| 8,184,097 B1 | 5/2012 | Barney et al. |
| 8,206,223 B2 | 6/2012 | Marans et al. |
| 8,226,493 B2 | 7/2012 | Briggs et al. |
| 8,248,367 B1 | 8/2012 | Barney et al. |
| 8,287,372 B2 | 10/2012 | Hong et al. |
| 8,287,373 B2 | 10/2012 | Marks et al. |
| 8,330,284 B2 | 12/2012 | Weston et al. |
| 8,342,929 B2 | 1/2013 | Briggs et al. |
| 8,368,648 B2 | 2/2013 | Barney et al. |
| 8,373,659 B2 | 2/2013 | Barney et al. |
| 8,384,668 B2 | 2/2013 | Barney et al. |
| 8,439,757 B2 | 5/2013 | Hornsby et al. |
| 8,469,766 B2 | 6/2013 | Zheng |
| 8,475,275 B2 | 7/2013 | Weston et al. |
| 8,491,389 B2 | 7/2013 | Weston et al. |
| 8,531,050 B2 | 9/2013 | Barney et al. |
| 8,535,153 B2 | 9/2013 | Bradbury et al. |
| 8,545,335 B2 | 10/2013 | Fiegener et al. |
| 8,550,916 B2 | 10/2013 | Raynal |
| 8,602,857 B2 | 12/2013 | Morichau-Beauchant et al. |
| 8,608,535 B2 | 12/2013 | Weston et al. |
| 8,686,579 B2 | 4/2014 | Barney et al. |
| 8,702,515 B2 | 4/2014 | Weston et al. |

(56) References Cited

U.S. PATENT DOCUMENTS

| | | |
|---|---|---|
| 8,708,821 B2 | 4/2014 | Barney et al. |
| 8,711,094 B2 | 4/2014 | Barney et al. |
| 8,753,165 B2 | 6/2014 | Weston |
| 8,758,136 B2 | 6/2014 | Briggs et al. |
| 8,790,180 B2 | 7/2014 | Barney et al. |
| 8,795,079 B2 | 8/2014 | Penzias, III |
| 8,814,688 B2 | 8/2014 | Barney et al. |
| 8,827,810 B2 | 9/2014 | Weston et al. |
| 8,834,271 B2 | 9/2014 | Ikeda |
| 8,870,655 B2 | 10/2014 | Ikeda |
| 8,888,576 B2 | 11/2014 | Briggs et al. |
| 8,894,462 B2 | 11/2014 | Leyland et al. |
| 8,913,011 B2 | 12/2014 | Barney et al. |
| 8,915,785 B2 | 12/2014 | Barney et al. |
| 8,961,260 B2 | 2/2015 | Weston |
| 8,961,312 B2 | 2/2015 | Barney et al. |
| 9,039,533 B2 | 5/2015 | Barney et al. |
| 9,138,650 B2 | 9/2015 | Barney et al. |
| 9,149,717 B2 | 10/2015 | Barney et al. |
| 9,162,148 B2 | 10/2015 | Barney et al. |
| 9,162,149 B2 | 10/2015 | Weston et al. |
| 9,180,378 B2 | 11/2015 | Reiche |
| 9,186,585 B2 | 11/2015 | Briggs et al. |
| 9,272,206 B2 | 3/2016 | Weston et al. |
| 9,320,976 B2 | 4/2016 | Weston |
| 9,393,491 B2 | 7/2016 | Barney et al. |
| 9,393,500 B2 | 7/2016 | Barney et al. |
| 9,446,319 B2 | 9/2016 | Barney et al. |
| 2001/0010514 A1 | 8/2001 | Ishino |
| 2001/0015123 A1 | 8/2001 | Nishitani et al. |
| 2001/0018361 A1 | 8/2001 | Acres |
| 2001/0021950 A1 | 9/2001 | Hawley |
| 2001/0024973 A1 | 9/2001 | Meredith |
| 2001/0031652 A1 | 10/2001 | Gabai et al. |
| 2001/0031662 A1 | 10/2001 | Larian |
| 2001/0034257 A1* | 10/2001 | Weston ............... A63F 13/327 463/1 |
| 2001/0039206 A1 | 11/2001 | Peppel |
| 2001/0040591 A1 | 11/2001 | Abbott et al. |
| 2001/0049302 A1 | 12/2001 | Hagiwara et al. |
| 2001/0054082 A1 | 12/2001 | Rudolph et al. |
| 2002/0005787 A1 | 1/2002 | Gabai et al. |
| 2002/0008622 A1 | 1/2002 | Weston et al. |
| 2002/0024500 A1 | 2/2002 | Howard |
| 2002/0024675 A1 | 2/2002 | Foxlin |
| 2002/0028071 A1 | 3/2002 | Molgaard |
| 2002/0028710 A1 | 3/2002 | Ishihara et al. |
| 2002/0032067 A1 | 3/2002 | Barney |
| 2002/0036617 A1 | 3/2002 | Pryor |
| 2002/0038267 A1 | 3/2002 | Can et al. |
| 2002/0052238 A1 | 5/2002 | Muroi |
| 2002/0058459 A1 | 5/2002 | Holt |
| 2002/0068500 A1 | 6/2002 | Gabai et al. |
| 2002/0072418 A1 | 6/2002 | Masuyama |
| 2002/0075335 A1 | 6/2002 | Relimoto |
| 2002/0077180 A1 | 6/2002 | Swanberg et al. |
| 2002/0077182 A1 | 6/2002 | Swanberg et al. |
| 2002/0090985 A1 | 7/2002 | Tochner et al. |
| 2002/0090992 A1 | 7/2002 | Legge et al. |
| 2002/0098887 A1 | 7/2002 | Himoto et al. |
| 2002/0103026 A1 | 8/2002 | Himoto et al. |
| 2002/0107069 A1 | 8/2002 | Ishino |
| 2002/0107591 A1 | 8/2002 | Gabai et al. |
| 2002/0116615 A1 | 8/2002 | Nguyen et al. |
| 2002/0118147 A1 | 8/2002 | Solomon |
| 2002/0123377 A1 | 9/2002 | Shulman |
| 2002/0126026 A1 | 9/2002 | Lee et al. |
| 2002/0128056 A1 | 9/2002 | Kato |
| 2002/0137427 A1 | 9/2002 | Peters |
| 2002/0137567 A1 | 9/2002 | Cheng |
| 2002/0140745 A1 | 10/2002 | Ellenby |
| 2002/0158751 A1 | 10/2002 | Bormaster |
| 2002/0158843 A1 | 10/2002 | Levine |
| 2002/0183961 A1 | 12/2002 | French et al. |
| 2003/0001016 A1 | 1/2003 | Fraier |
| 2003/0013513 A1 | 1/2003 | Rowe |
| 2003/0022736 A1 | 1/2003 | Cass |
| 2003/0027634 A1 | 2/2003 | Matthews, III |
| 2003/0036425 A1 | 2/2003 | Kaminkow et al. |
| 2003/0037075 A1 | 2/2003 | Hannigan |
| 2003/0038778 A1 | 2/2003 | Noguera |
| 2003/0040347 A1 | 2/2003 | Roach et al. |
| 2003/0052860 A1 | 3/2003 | Park et al. |
| 2003/0057808 A1 | 3/2003 | Lee et al. |
| 2003/0060286 A1 | 3/2003 | Walker et al. |
| 2003/0063068 A1 | 4/2003 | Anton |
| 2003/0064812 A1 | 4/2003 | Rappaport et al. |
| 2003/0069077 A1 | 4/2003 | Korienek |
| 2003/0073505 A1 | 4/2003 | Tracy |
| 2003/0095101 A1 | 5/2003 | Jou |
| 2003/0096652 A1 | 5/2003 | Siegel et al. |
| 2003/0106455 A1 | 6/2003 | Weston |
| 2003/0107551 A1 | 6/2003 | Dunker |
| 2003/0114233 A1 | 6/2003 | Hiei |
| 2003/0134679 A1 | 7/2003 | Siegel et al. |
| 2003/0144047 A1 | 7/2003 | Sprogis |
| 2003/0144056 A1 | 7/2003 | Leifer et al. |
| 2003/0149803 A1 | 8/2003 | Wilson et al. |
| 2003/0166416 A1 | 9/2003 | Ogata |
| 2003/0171145 A1 | 9/2003 | Rowe |
| 2003/0171190 A1 | 9/2003 | Rice |
| 2003/0190967 A1 | 10/2003 | Henry |
| 2003/0193572 A1 | 10/2003 | Wilson et al. |
| 2003/0195037 A1 | 10/2003 | Vuong et al. |
| 2003/0195041 A1 | 10/2003 | McCauley |
| 2003/0195046 A1 | 10/2003 | Bartsch |
| 2003/0204361 A1 | 10/2003 | Townsend |
| 2003/0214259 A9 | 11/2003 | Dowling et al. |
| 2003/0216176 A1 | 11/2003 | Shimizu |
| 2003/0222851 A1 | 12/2003 | Lai |
| 2003/0234914 A1 | 12/2003 | Solomon |
| 2004/0028258 A1 | 2/2004 | Naimark |
| 2004/0033833 A1 | 2/2004 | Briggs et al. |
| 2004/0034289 A1 | 2/2004 | Teller et al. |
| 2004/0043806 A1 | 3/2004 | Kirby et al. |
| 2004/0048666 A1 | 3/2004 | Bagley |
| 2004/0063480 A1 | 4/2004 | Wang |
| 2004/0070564 A1 | 4/2004 | Dawson |
| 2004/0075650 A1 | 4/2004 | Paul |
| 2004/0077423 A1 | 4/2004 | Weston et al. |
| 2004/0081313 A1 | 4/2004 | McKnight et al. |
| 2004/0095317 A1 | 5/2004 | Zhang |
| 2004/0102247 A1 | 5/2004 | Smoot et al. |
| 2004/0119693 A1 | 6/2004 | Kaemmler |
| 2004/0121834 A1 | 6/2004 | Libby et al. |
| 2004/0134341 A1 | 7/2004 | Sandoz |
| 2004/0140954 A1 | 7/2004 | Faeth |
| 2004/0143413 A1 | 7/2004 | Oystol |
| 2004/0147317 A1 | 7/2004 | Ito et al. |
| 2004/0152499 A1 | 8/2004 | Lind et al. |
| 2004/0152515 A1 | 8/2004 | Wegmuller et al. |
| 2004/0152520 A1 | 8/2004 | Shinoda |
| 2004/0174287 A1 | 9/2004 | Deak |
| 2004/0193413 A1 | 9/2004 | Wilson |
| 2004/0198158 A1* | 10/2004 | Driscoll ............... A63H 3/28 446/297 |
| 2004/0198517 A1 | 10/2004 | Briggs |
| 2004/0203638 A1 | 10/2004 | Chan |
| 2004/0204240 A1 | 10/2004 | Barney |
| 2004/0207597 A1 | 10/2004 | Marks |
| 2004/0214642 A1 | 10/2004 | Beck |
| 2004/0218104 A1 | 11/2004 | Smith |
| 2004/0222969 A1 | 11/2004 | Buchenrieder |
| 2004/0227725 A1 | 11/2004 | Calarco |
| 2004/0229693 A1 | 11/2004 | Lind |
| 2004/0229696 A1 | 11/2004 | Beck |
| 2004/0236453 A1 | 11/2004 | Szoboszlay |
| 2004/0239626 A1 | 12/2004 | Noguera |
| 2004/0252109 A1 | 12/2004 | Trent et al. |
| 2004/0254020 A1 | 12/2004 | Dragusin |
| 2004/0259651 A1 | 12/2004 | Storek |
| 2004/0268393 A1 | 12/2004 | Hunleth |
| 2005/0017454 A1 | 1/2005 | Endo et al. |
| 2005/0020369 A1 | 1/2005 | Davis |

(56) References Cited

U.S. PATENT DOCUMENTS

| | | |
|---|---|---|
| 2005/0032582 A1 | 2/2005 | Mahajan et al. |
| 2005/0047621 A1 | 3/2005 | Cranfill |
| 2005/0054457 A1 | 3/2005 | Eyestone |
| 2005/0059488 A1 | 3/2005 | Larsen et al. |
| 2005/0059503 A1 | 3/2005 | Briggs et al. |
| 2005/0060586 A1 | 3/2005 | Burger et al. |
| 2005/0076161 A1 | 4/2005 | Albanna |
| 2005/0085298 A1 | 4/2005 | Woolston |
| 2005/0110751 A1 | 5/2005 | Wilson et al. |
| 2005/0116020 A1 | 6/2005 | Smolucha et al. |
| 2005/0125826 A1 | 6/2005 | Hunleth |
| 2005/0127868 A1 | 6/2005 | Calhoon et al. |
| 2005/0130739 A1 | 6/2005 | Argentar |
| 2005/0134555 A1 | 6/2005 | Liao |
| 2005/0138851 A1 | 6/2005 | Ingraselino |
| 2005/0143173 A1 | 6/2005 | Barney et al. |
| 2005/0156883 A1 | 7/2005 | Wilson et al. |
| 2005/0162389 A1 | 7/2005 | Obermeyer |
| 2005/0164601 A1 | 7/2005 | McEachen et al. |
| 2005/0170889 A1 | 8/2005 | Lum et al. |
| 2005/0172734 A1 | 8/2005 | Alsio |
| 2005/0174324 A1 | 8/2005 | Liberty |
| 2005/0176485 A1 | 8/2005 | Ueshima |
| 2005/0179644 A1 | 8/2005 | Alsio |
| 2005/0202866 A1 | 9/2005 | Luciano et al. |
| 2005/0210418 A1 | 9/2005 | Marvit |
| 2005/0210419 A1 | 9/2005 | Kela |
| 2005/0212749 A1 | 9/2005 | Marvit et al. |
| 2005/0212750 A1 | 9/2005 | Marvit et al. |
| 2005/0212751 A1 | 9/2005 | Marvit et al. |
| 2005/0212752 A1 | 9/2005 | Marvit et al. |
| 2005/0212753 A1 | 9/2005 | Marvit et al. |
| 2005/0212754 A1 | 9/2005 | Marvit et al. |
| 2005/0212755 A1 | 9/2005 | Marvit |
| 2005/0212756 A1 | 9/2005 | Marvit et al. |
| 2005/0212757 A1 | 9/2005 | Marvit et al. |
| 2005/0212758 A1 | 9/2005 | Marvit et al. |
| 2005/0212759 A1 | 9/2005 | Marvit et al. |
| 2005/0212760 A1 | 9/2005 | Marvit et al. |
| 2005/0212764 A1 | 9/2005 | Toba |
| 2005/0212767 A1 | 9/2005 | Marvit |
| 2005/0215295 A1 | 9/2005 | Arneson |
| 2005/0215322 A1 | 9/2005 | Himoto et al. |
| 2005/0217525 A1 | 10/2005 | McClure |
| 2005/0227579 A1 | 10/2005 | Yamaguchi et al. |
| 2005/0233808 A1 | 10/2005 | Himoto et al. |
| 2005/0239548 A1 | 10/2005 | Ueshima et al. |
| 2005/0243061 A1 | 11/2005 | Liberty et al. |
| 2005/0243062 A1 | 11/2005 | Liberty |
| 2005/0253806 A1 | 11/2005 | Liberty et al. |
| 2005/0256675 A1 | 11/2005 | Kurata |
| 2005/0277465 A1 | 12/2005 | Whitten et al. |
| 2005/0278741 A1 | 12/2005 | Robarts |
| 2006/0003843 A1 | 1/2006 | Kobayashi et al. |
| 2006/0007115 A1 | 1/2006 | Furuhashi |
| 2006/0009270 A1 | 1/2006 | Kobayash et al. |
| 2006/0028446 A1 | 2/2006 | Liberty |
| 2006/0030385 A1 | 2/2006 | Barney et al. |
| 2006/0040720 A1 | 2/2006 | Harrison |
| 2006/0046849 A1 | 3/2006 | Kovacs |
| 2006/0092133 A1 | 5/2006 | Touma |
| 2006/0094502 A1 | 5/2006 | Katayama et al. |
| 2006/0122474 A1 | 6/2006 | Teller et al. |
| 2006/0123146 A1 | 6/2006 | Wu et al. |
| 2006/0148563 A1 | 7/2006 | Yang |
| 2006/0152487 A1 | 7/2006 | Grunnet-Jepsen |
| 2006/0152488 A1 | 7/2006 | Salsman |
| 2006/0152489 A1 | 7/2006 | Sweetser |
| 2006/0154726 A1 | 7/2006 | Weston et al. |
| 2006/0178212 A1 | 8/2006 | Penzias |
| 2006/0205507 A1 | 9/2006 | Ho |
| 2006/0229134 A1 | 10/2006 | Briggs et al. |
| 2006/0231794 A1 | 10/2006 | Sakaguchi et al. |
| 2006/0234601 A1 | 10/2006 | Weston |
| 2006/0246403 A1 | 11/2006 | Monpouet et al. |
| 2006/0252475 A1 | 11/2006 | Zalewski et al. |
| 2006/0252477 A1 | 11/2006 | Zalewski et al. |
| 2006/0256081 A1 | 11/2006 | Zalewski et al. |
| 2006/0258452 A1 | 11/2006 | Hsu |
| 2006/0258471 A1 | 11/2006 | Briggs et al. |
| 2006/0264258 A1 | 11/2006 | Zalewski et al. |
| 2006/0264260 A1 | 11/2006 | Zalewski et al. |
| 2006/0267935 A1 | 11/2006 | Corson |
| 2006/0273907 A1 | 12/2006 | Heiman |
| 2006/0282873 A1 | 12/2006 | Zalewski et al. |
| 2006/0284842 A1 | 12/2006 | Poltorak |
| 2006/0287030 A1 | 12/2006 | Briggs et al. |
| 2006/0287085 A1 | 12/2006 | Mao |
| 2006/0287086 A1 | 12/2006 | Zalewski et al. |
| 2006/0287087 A1 | 12/2006 | Zalewski et al. |
| 2007/0015588 A1 | 1/2007 | Matsumoto et al. |
| 2007/0021208 A1 | 1/2007 | Mao et al. |
| 2007/0049374 A1 | 3/2007 | Ikeda et al. |
| 2007/0050597 A1 | 3/2007 | Ikeda |
| 2007/0052177 A1 | 3/2007 | Ikeda et al. |
| 2007/0060391 A1 | 3/2007 | Ikeda et al. |
| 2007/0066394 A1 | 3/2007 | Ikeda et al. |
| 2007/0066396 A1 | 3/2007 | Weston et al. |
| 2007/0072680 A1 | 3/2007 | Ikeda et al. |
| 2007/0082720 A1 | 4/2007 | Bradbury et al. |
| 2007/0087837 A1 | 4/2007 | Bradbury et al. |
| 2007/0087838 A1 | 4/2007 | Bradbury et al. |
| 2007/0087839 A1 | 4/2007 | Bradbury et al. |
| 2007/0091084 A1 | 4/2007 | Ueshima et al. |
| 2007/0093170 A1 | 4/2007 | Zheng |
| 2007/0093291 A1 | 4/2007 | Hulvey |
| 2007/0093293 A1 | 4/2007 | Osnato |
| 2007/0100696 A1 | 5/2007 | Illingworth |
| 2007/0159362 A1 | 7/2007 | Shen |
| 2007/0173705 A1 | 7/2007 | Teller et al. |
| 2007/0249425 A1 | 10/2007 | Weston et al. |
| 2007/0252815 A1 | 11/2007 | Kuo |
| 2007/0257884 A1 | 11/2007 | Taira |
| 2007/0265075 A1 | 11/2007 | Zalewski |
| 2007/0265076 A1 | 11/2007 | Lin |
| 2007/0265088 A1 | 11/2007 | Nakada et al. |
| 2008/0014835 A1 | 1/2008 | Weston et al. |
| 2008/0015017 A1 | 1/2008 | Ashida et al. |
| 2008/0039202 A1 | 2/2008 | Sawano et al. |
| 2008/0119270 A1 | 5/2008 | Ohta |
| 2008/0121782 A1 | 5/2008 | Hotelling et al. |
| 2008/0174550 A1 | 7/2008 | Laurila |
| 2008/0183678 A1 | 7/2008 | Weston et al. |
| 2008/0216765 A1 | 9/2008 | Kates |
| 2008/0273011 A1 | 11/2008 | Lin |
| 2008/0278445 A1 | 11/2008 | Sweester |
| 2009/0009294 A1 | 1/2009 | Kupstas |
| 2009/0033621 A1 | 2/2009 | Quinn |
| 2009/0051653 A1 | 2/2009 | Barney et al. |
| 2009/0124165 A1 | 5/2009 | Weston |
| 2009/0137323 A1 | 5/2009 | Fiegener et al. |
| 2009/0156309 A1 | 6/2009 | Weston et al. |
| 2009/0203446 A1 | 8/2009 | Bradbury et al. |
| 2009/0215534 A1 | 8/2009 | Wilson et al. |
| 2009/0273560 A1 | 11/2009 | Kalanithi et al. |
| 2009/0305799 A1 | 12/2009 | Weston et al. |
| 2009/0326851 A1 | 12/2009 | Tanenhaus |
| 2010/0056285 A1 | 3/2010 | Weston et al. |
| 2010/0105475 A1 | 4/2010 | Mikhailov |
| 2010/0144436 A1 | 6/2010 | Marks et al. |
| 2010/0203932 A1 | 8/2010 | Briggs et al. |
| 2010/0273556 A1 | 10/2010 | Briggs et al. |
| 2010/0289744 A1 | 11/2010 | Cohen |
| 2011/0081969 A1 | 4/2011 | Ikeda |
| 2011/0081970 A1 | 4/2011 | Barney et al. |
| 2011/0177853 A1 | 7/2011 | Ueshima |
| 2011/0190052 A1 | 8/2011 | Takeda |
| 2011/0263330 A1 | 10/2011 | Weston et al. |
| 2011/0300941 A1 | 12/2011 | Weston et al. |
| 2012/0004031 A1 | 1/2012 | Barney et al. |
| 2012/0034980 A1 | 2/2012 | Weston et al. |
| 2012/0094759 A1 | 4/2012 | Barney et al. |
| 2012/0122575 A1 | 5/2012 | Barney et al. |
| 2012/0190452 A1 | 7/2012 | Weston et al. |

(56) References Cited

U.S. PATENT DOCUMENTS

| | | |
|---|---|---|
| 2012/0208638 A1 | 8/2012 | Barney et al. |
| 2012/0258802 A1 | 10/2012 | Weston et al. |
| 2012/0270657 A1 | 10/2012 | Barney et al. |
| 2012/0295699 A1 | 11/2012 | Reiche |
| 2012/0295703 A1 | 11/2012 | Reiche et al. |
| 2012/0295704 A1 | 11/2012 | Reiche |
| 2012/0295710 A1 | 11/2012 | Barney et al. |
| 2012/0309528 A1 | 12/2012 | Barney et al. |
| 2013/0079141 A1 | 3/2013 | Barney et al. |
| 2013/0116020 A1 | 5/2013 | Barney et al. |
| 2013/0116051 A1 | 5/2013 | Barney et al. |
| 2013/0196727 A1 | 8/2013 | Barney et al. |
| 2013/0196770 A1 | 8/2013 | Barney et al. |
| 2013/0303276 A1 | 11/2013 | Weston et al. |
| 2014/0100029 A1 | 4/2014 | Reiche et al. |
| 2014/0194206 A1 | 7/2014 | Barney et al. |
| 2014/0235341 A1 | 8/2014 | Barney et al. |
| 2014/0256446 A1 | 9/2014 | Barney et al. |
| 2014/0323221 A1 | 10/2014 | Ikeda |
| 2014/0357373 A1 | 12/2014 | Barney et al. |
| 2014/0378233 A1 | 12/2014 | Weston et al. |
| 2015/0038229 A1 | 2/2015 | Reiche et al. |
| 2015/0050971 A1 | 2/2015 | Briggs et al. |
| 2015/0094140 A1 | 4/2015 | Barney et al. |
| 2015/0165316 A1 | 6/2015 | Barney et al. |
| 2015/0174479 A1 | 6/2015 | Reiche et al. |
| 2015/0251100 A1 | 9/2015 | Barney et al. |
| 2015/0290545 A1 | 10/2015 | Barney et al. |
| 2015/0328556 A1 | 11/2015 | Weston |
| 2015/0360125 A1 | 12/2015 | Barney et al. |
| 2016/0030836 A1 | 2/2016 | Barney et al. |
| 2016/0067600 A1 | 3/2016 | Barney et al. |
| 2016/0144273 A1 | 5/2016 | Barney et al. |
| 2016/0184701 A1 | 6/2016 | Weston et al. |

FOREIGN PATENT DOCUMENTS

| | | |
|---|---|---|
| CN | 1338961 | 3/2002 |
| CN | 1559644 | 1/2005 |
| DE | 3930581 | 3/1991 |
| DE | 19701374 | 7/1997 |
| DE | 19632273 | 2/1998 |
| DE | 19648487 | 6/1998 |
| DE | 19814254 | 10/1998 |
| DE | 19937307 | 2/2000 |
| DE | 10029173 | 1/2002 |
| DE | 10219198 | 11/2003 |
| EP | 0 264 782 A2 | 4/1988 |
| EP | 0 570 999 | 12/1988 |
| EP | 0 322 825 A2 | 7/1989 |
| EP | 0 695 565 A1 | 2/1996 |
| EP | 0 835 676 | 4/1998 |
| EP | 0 848 226 | 6/1998 |
| EP | 0 852 961 | 7/1998 |
| EP | 1 062 994 | 12/2000 |
| EP | 1 279 425 | 1/2003 |
| EP | 1 293 237 | 3/2003 |
| EP | 0 993 845 | 12/2005 |
| FR | 2547093 A1 | 12/1984 |
| GB | 2244546 | 12/1991 |
| GB | 2284478 | 6/1995 |
| GB | 2307133 | 5/1997 |
| GB | 2310481 | 8/1997 |
| GB | 2316482 | 2/1998 |
| GB | 2319374 | 5/1998 |
| GB | 2325558 A | 11/1998 |
| GB | 2388418 | 11/2003 |
| JP | 62-14527 | 1/1987 |
| JP | 63-186687 | 8/1988 |
| JP | 03-210622 | 9/1991 |
| JP | 06-050758 | 2/1994 |
| JP | 6154422 | 6/1994 |
| JP | 06-198075 | 7/1994 |
| JP | 6190144 | 7/1994 |
| JP | H0677387 | 10/1994 |
| JP | 06-308879 | 11/1994 |
| JP | 07-028591 | 1/1995 |
| JP | 07-044315 | 2/1995 |
| JP | 07-107573 | 4/1995 |
| JP | 07-115690 | 5/1995 |
| JP | 07-146123 | 6/1995 |
| JP | 07-200142 | 8/1995 |
| JP | 07-262797 | 10/1995 |
| JP | 07-302148 | 11/1995 |
| JP | 07-318332 | 12/1995 |
| JP | 08-095704 | 4/1996 |
| JP | 08-106352 | 4/1996 |
| JP | 08-111144 | 4/1996 |
| JP | 08-114415 | 5/1996 |
| JP | 08-122070 | 5/1996 |
| JP | 08-152959 | 6/1996 |
| JP | 08-191953 | 7/1996 |
| JP | 08-211993 | 8/1996 |
| JP | 08-221187 | 8/1996 |
| JP | 08-305355 | 11/1996 |
| JP | 08-335136 | 12/1996 |
| JP | 09-034456 | 2/1997 |
| JP | 09-149915 | 6/1997 |
| JP | 09-164273 | 6/1997 |
| JP | 09-225137 | 9/1997 |
| JP | 09-230997 | 9/1997 |
| JP | 09-237087 | 9/1997 |
| JP | 09-274534 | 10/1997 |
| JP | 09-319510 | 12/1997 |
| JP | 10-021000 | 1/1998 |
| JP | 10-033831 | 2/1998 |
| JP | 10-043349 A | 2/1998 |
| JP | 10-099542 | 4/1998 |
| JP | 10-154038 | 6/1998 |
| JP | 10-235019 | 9/1998 |
| JP | 10-254614 | 9/1998 |
| JP | 11-053994 | 2/1999 |
| JP | 11-099284 | 4/1999 |
| JP | 2000-176150 | 6/2000 |
| JP | 2000-208756 | 7/2000 |
| JP | 2000-270237 | 9/2000 |
| JP | 2000-300839 | 10/2000 |
| JP | 2000-308756 | 11/2000 |
| JP | 2000-325653 | 11/2000 |
| JP | 2001-038052 | 2/2001 |
| JP | 2001-058484 | 3/2001 |
| JP | 2001-104643 | 4/2001 |
| JP | U20009165 | 4/2001 |
| JP | 2001-175412 | 6/2001 |
| JP | 2001-251324 | 9/2001 |
| JP | 2001-265521 | 9/2001 |
| JP | 2001-306245 | 11/2001 |
| JP | 2002-007057 | 1/2002 |
| JP | 2002-062981 | 2/2002 |
| JP | 2002-78969 | 3/2002 |
| JP | 2002-082751 | 3/2002 |
| JP | 2002-091692 | 3/2002 |
| JP | 2002-126375 | 5/2002 |
| JP | 2002-136694 | 5/2002 |
| JP | 2002-153673 | 5/2002 |
| JP | 2002-202843 | 7/2002 |
| JP | 2002-224444 | 8/2002 |
| JP | 2002-233665 | 8/2002 |
| JP | 2002-298145 | 10/2002 |
| JP | 2003-053038 | 2/2003 |
| JP | 2003-140823 | 5/2003 |
| JP | 2003-208263 | 7/2003 |
| JP | 2003 236246 | 8/2003 |
| JP | 2003-325974 | 11/2003 |
| JP | 2004-062774 | 2/2004 |
| JP | 2004-313429 | 11/2004 |
| JP | 2004-313492 | 11/2004 |
| JP | 2005-040493 | 2/2005 |
| JP | 2005-063230 | 3/2005 |
| JP | 2006-113019 | 4/2006 |
| JP | 2006-136694 | 6/2006 |
| JP | 2006-216569 | 8/2006 |
| JP | 2007-083024 | 4/2007 |
| JP | 4043702 | 2/2008 |

(56) References Cited

FOREIGN PATENT DOCUMENTS

| | | |
|---|---|---|
| NL | 9300171 | 8/1994 |
| RU | 2077358 C1 | 4/1997 |
| RU | 2125853 | 2/1999 |
| RU | 2126161 | 2/1999 |
| WO | WO 90/07961 | 7/1990 |
| WO | WO 94/02931 | 3/1994 |
| WO | WO 95/11730 A1 | 5/1995 |
| WO | WO 96/05766 | 2/1996 |
| WO | WO 96/14115 | 5/1996 |
| WO | WO 96/14121 | 5/1996 |
| WO | WO 97/09101 | 3/1997 |
| WO | WO 97/12337 | 4/1997 |
| WO | WO 97/17598 | 5/1997 |
| WO | WO 97/20305 | 6/1997 |
| WO | WO 97/28864 | 8/1997 |
| WO | WO 97/32641 | 9/1997 |
| WO | WO 98/11528 | 3/1998 |
| WO | WO 98/36400 | 8/1998 |
| WO | WO 99/58214 | 11/1999 |
| WO | WO 00/33168 | 6/2000 |
| WO | WO 00/35345 | 6/2000 |
| WO | WO 00/61251 | 10/2000 |
| WO | WO 00/63874 | 10/2000 |
| WO | WO 00/67863 | 11/2000 |
| WO | WO 01/46916 | 6/2001 |
| WO | WO 01/87426 | 11/2001 |
| WO | WO 01/91042 | 11/2001 |
| WO | WO 02/17054 | 2/2002 |
| WO | WO 02/34345 | 5/2002 |
| WO | WO 02/47013 | 6/2002 |
| WO | WO 03/015005 | 2/2003 |
| WO | WO 03/043709 | 5/2003 |
| WO | WO 03/044743 A2 | 5/2003 |
| WO | WO 03/088147 | 10/2003 |
| WO | WO 03/107260 | 12/2003 |
| WO | WO 2004/039055 | 5/2004 |
| WO | WO 2004/051391 | 6/2004 |
| WO | WO 2004/087271 | 10/2004 |
| WO | WO 2006/039339 | 4/2006 |
| WO | WO 2006/101880 | 9/2006 |
| WO | WO 2007/058996 | 5/2007 |
| WO | WO 2007/120880 | 10/2007 |

OTHER PUBLICATIONS

"Smart Card News Online", published Oct. 25, 2006, source www.smartcard.co.uklNOLARCH/2006/0ctober/251006.html.
"Emerald Forest Toys" [online] [retrieved on Sep. 14, 2005], retrieved from Internet <URL:http://www.pathworks.net/print_eft.html>.
"Gatemaster Features", "Gatemaster Main Screen", "Gatemaster: So You're a Computer Geek eh?", and "Gatemaster Pricing" by Gate Master Management System, internet article, Jul. 9, 1997; http://web.archive.org/web/19970709135000/www.gatemaster.com/gmfeat.htm (accessed on Dec. 11, 2008).
"Ollivanders: Makers of Fine Wands." Dec. 2, 2002. [online] [retrieved on Mar. 30, 2005], Retrieved from Internet (URL:http//www.cim.mcgill.edu/!jer/courses/hci/assignments/2002/www.ece.mcgill.ca/%7Eeuryd).
International Preliminary Examination Report, International App. No. PCT/US00/09482; dated Apr. 24, 2001; 4 pages.
International Search Report and Written Opinion, International App. No. PCT/US04/08912; mailed Aug. 26, 2004; 10 pages.
International Search Report and Written Opinion, International App. No. PCT/US05/34831; mailed Jul. 2, 2008; 11 pages.
International Search Report and Written Opinion; International Appl. No. PCT/US2006/043915; mailed Mar. 9, 2007; 8 pages.
Laser Tag: General info: History of Laser Tag, http://lasertag.org/general/history.html (accessed on Mar. 13, 2008; historical dates start on Mar. 1984).
Laser Tag: Lazer Tag Branded Gear; last update Sep. 26, 2006, http://home.comcast.net/~ferret1963/Lazer_Tag_Brand.HTML (accessed on Mar. 13, 2008; historical dates start in 1986).
Owl Magic Wand & Owl Magic Orb Raving Toy Maniac, Nov. 19, 2001. [online] [retrieved on Mar. 30, 2005], Retrieved from the Internet (URL:http://www.toymania.com/news/messages/1358.shtm1).
U.S. Pat. No. 6,634,949, Non-Final Rejection, May 21, 2002.
U.S. Pat. No. 6,634,949, Response after Non-Final Action, Nov. 21, 2002.
U.S. Pat. No. 6,634,949, Notice of Allowance, Jan. 27, 2003.
U.S. Pat. No. 7,749,089, Non-Final Rejection, Feb. 27, 2002.
U.S. Pat. No. 7,749,089, Response after Non-Final Action, Sep. 4, 2002.
U.S. Pat. No. 7,749,089, Final Rejection, Dec. 2, 2002.
U.S. Pat. No. 7,749,089, Request for Continued Examination, Jun. 2, 2003.
U.S. Pat. No. 7,749,089, Non-Final Rejection, Aug. 27, 2003.
U.S. Pat. No. 7,749,089, Response after Non-Final Action, Mar. 3, 2004.
U.S. Pat. No. 7,749,089, Final Rejection, Feb. 5, 2007.
U.S. Pat. No. 7,749,089, Request for Continued Examination, May 8, 2007.
U.S. Pat. No. 7,749,089, Non-Final Rejection, Jun. 11, 2007.
U.S. Pat. No. 7,749,089, Response after Non-Final Action, Jun. 22, 2007.
U.S. Pat. No. 7,749,089, Final Rejection, Oct. 11, 2007.
U.S. Pat. No. 7,749,089, Request for Continued Examination, Oct. 29, 2007.
U.S. Pat. No. 7,749,089, Supplemental Amendment, Mar. 11, 2008.
U.S. Pat. No. 7,749,089, Non-Final Rejection, Jul. 9, 2008.
U.S. Pat. No. 7,749,089, Response after Non-Final Action, Nov. 10, 2008.
U.S. Pat. No. 7,749,089, Final Rejection, Feb. 5, 2009.
U.S. Pat. No. 7,749,089, Request for Continued Examination, May 5, 2009.
U.S. Pat. No. 7,749,089, Non-Final Rejection, Jul. 22, 2009.
U.S. Pat. No. 7,749,089, Response after Non-Final Action, Dec. 18, 2009.
U.S. Pat. No. 7,749,089, Supplemental Amendment, Jan. 22, 2010.
U.S. Pat. No. 7,749,089, Notice of Allowance, Apr. 2, 2010.
U.S. Appl. No. 11/429,913, Non-Final Rejection, Mar. 27, 2008.
U.S. Appl. No. 11/429,913, Response after Non-Final Action, Aug. 27, 2008.
U.S. Appl. No. 11/429,913, Final Rejection, Dec. 16, 2008.
U.S. Appl. No. 11/429,913, Request for Continued Examination, Apr. 15, 2009.
U.S. Appl. No. 11/429,913, Supplemental Amendment, May 28, 2009.
U.S. Appl. No. 11/429,913, Non-Final Rejection, Sep. 2, 2009.
U.S. Appl. No. 11/429,913, Response after Non-Final Action, Jan. 22, 2010.
U.S. Appl. No. 11/429,913, Final Rejection, May 11, 2010.
U.S. Pat. No. 8,342,929, Non-Final Rejection, May 8, 2012.
U.S. Pat. No. 8,342,929, Response after Non-Final Action, Aug. 8, 2012.
U.S. Pat. No. 8,342,929, Notice of Allowance, Sep. 7, 2012.
U.S. Pat. No. 8,888,576, Non-Final Rejection, Nov. 12, 2013.
U.S. Pat. No. 8,888,576, Response after Non-Final Action, Jan. 8, 2014.
U.S. Pat. No. 8,888,576, Notice of Allowance, Feb. 20, 2014.
U.S. Pat. No. 8,888,576, Request for Continued Examination, Apr. 14, 2014.
U.S. Pat. No. 8,888,576, Notice of Allowance, Oct. 9, 2014.
U.S. Pat. No. 8,758,136, Notice of Allowance, Apr. 1, 2014.
U.S. Appl. No. 14/310,522, Preliminary Amendment, Oct. 30, 2014.
U.S. Appl. No. 14/310,522, Notice of Allowance, Apr. 3, 2015.
U.S. Pat. No. 6,967,566, Non-Final Rejection, Jul. 28, 2004.
U.S. Pat. No. 6,967,566, Response after Non-Final Action, Nov. 1, 2004,
U.S. Pat. No. 6,967,566, Final Rejection, Jan. 26, 2005.
U.S. Pat. No. 6,967,566, Amendment after Final Rejection, Mar. 28, 2005.
U.S. Pat. No. 6,967,566, Notice of Allowance, Apr. 22, 2005.
U.S. Pat. No. 8,608,535, Non-Final Rejection, Mar. 5, 2007.

(56) References Cited

OTHER PUBLICATIONS

U.S. Pat. No. 8,608,535, Response after Non-Final Action, Jun. 27, 2007.
U.S. Pat. No. 8,608,535, Non-Final Rejection, Apr. 2, 2009.
U.S. Pat. No. 8,608,535, Response after Non-Final Action, Aug. 31, 2009.
U.S. Pat. No. 8,608,535, Non-Final Rejection, Oct. 21, 2009.
U.S. Pat. No. 8,608,535, Response after Non-Final Action, Jan. 21, 2010.
U.S. Pat. No. 8,608,535, Final Rejection, Feb. 24, 2010.
U.S. Pat. No. 8,608,535, Request for Continued Examination, Jun. 23, 2010.
U.S. Pat. No. 8,608,535, Non-Final Rejection, Sep. 21, 2010.
U.S. Pat. No. 8,608,535, Response after Non-Final Action, Jan. 19, 2011.
U.S. Pat. No. 8,608,535, Final Rejection, Feb. 11, 2011.
U.S. Pat. No. 8,608,535, Request for Continued Examination, Jun. 10, 2011.
U.S. Pat. No. 8,608,535, Non-Final Rejection, Sep. 9, 2011.
U.S. Pat. No. 8,608,535, Response after Non-Final Action, Jan. 6, 2012.
U.S. Pat. No. 8,608,535, Final Rejection, Jan. 26, 2012.
U.S. Pat. No. 8,608,535, Request for Continued Examination, May 25, 2012.
U.S. Pat. No. 8,608,535, Non-Final Rejection, Nov. 14, 2012.
U.S. Pat. No. 8,608,535, Response after Non-Final Action, Apr. 12, 2013.
U.S. Pat. No. 8,608,535, Notice of Allowance, May 3, 2013.
U.S. Appl. No. 11/507,934, Non-Final Rejection, Aug. 5, 2010.
U.S. Appl. No. 11/507,934, Response after Non-Final Action, Feb. 3, 2011.
U.S. Appl. No. 11/507,934, Final Rejection, Apr. 14, 2011.
U.S. Pat. No. 8,827,810, Non-Final Rejection, Nov. 14, 2011.
U.S. Pat. No. 8,827,810, Response after Non-final Action, Feb. 14, 2012.
U.S. Pat. No. 8,827,810, Final Rejection, Jun. 13, 2012.
U.S. Pat. No. 8,827,810, Request for Continued Examination, Dec. 11, 2012.
U.S. Pat. No. 8,827,810, Non-Final Rejection, Nov. 7, 2013.
U.S. Pat. No. 8,827,810, Response after Non-final Action, Feb. 3, 2014.
U.S. Pat. No. 8,827,810, Notice of Allowance, May 21, 2014.
U.S. Pat. No. 8,702,515, Non-Final Rejection, Jun. 14, 2012.
U.S. Pat. No. 8,702,515, Response after Non-Final Action, Dec. 11, 2012.
U.S. Pat. No. 8,702,515, Final Rejection, Apr. 11, 2013.
U.S. Pat. No. 8,702,515, Request for Continued Examination, Sep. 4, 2013.
U.S. Pat. No. 8,702,515, Notice of Allowance, Nov. 14, 2013.
U.S. Pat. No. 8,702,515, Suppl Notice of Allowance, Mar. 18, 2014.
U.S. Appl. No. 13/944,773, Preliminary Amendment, Jul. 19, 2013.
U.S. Appl. No. 13/944,773, Non-Final Rejection, May 14, 2015.
U.S. Pat. No. 6,761,637, Non-Final Rejection, Jun. 11, 2003.
U.S. Pat. No. 6,761,637, Response after Non-Final Action, Nov. 3, 2003.
U.S. Pat. No. 6,761,637, Notice of Allowance, Dec. 1, 2003.
U.S. Pat. No. 7,500,917, Non-Final Rejection, Oct. 20, 2004.
U.S. Pat. No. 7,500,917, Response after Non-Final Action, Jan. 25, 2005.
U.S. Pat. No. 7,500,917, Final Rejection, Apr. 1, 2005.
U.S. Pat. No. 7,500,917, Request for Continued Examination, Jun. 30, 2005.
U.S. Pat. No. 7,500,917, Non-Final Rejection, Sep. 28, 2005.
U.S. Pat. No. 7,500,917, Response after Non-Final Action, Dec. 20, 2005.
U.S. Pat. No. 7,500,917, Final Rejection, May 18, 2006.
U.S. Pat. No. 7,500,917, Appeal Brief, Oct. 27, 2006.
U.S. Pat. No. 7,500,917, Examiner's Answer, Mar. 15, 2007.
U.S. Pat. No. 7,500,917, BPAI Decision—Examiner Reversed, Aug. 19, 2008.
U.S. Pat. No. 7,500,917, Notice of Allowance, Oct. 3, 2008.
U.S. Pat. No. 7,850,527, Non-Final Rejection, Aug. 20, 2008.
U.S. Pat. No. 7,850,527, Response after Non-Final Action, Dec. 17, 2008.
U.S. Pat. No. 7,850,527, Non-Final Rejection, Oct. 28, 2009.
U.S. Pat. No. 7,850,527, Response after Non-Final Action, Apr. 26, 2010.
U.S. Pat. No. 7,850,527, Supplemental Amendment, Jul. 1, 2010.
U.S. Pat. No. 7,850,527, Notice of Allowance, Oct. 15, 2010.
U.S. Pat. No. 8,708,821, Non-Final Rejection, May 21, 2013.
U.S. Pat. No. 8,708,821, Response to Non-Final Action, Jul. 30, 2013.
U.S. Pat. No. 8,708,821, Supplemental Amendment, Sep. 5, 2013.
U.S. Pat. No. 8,708,821, Notice of Allowance, Nov. 5, 2013.
U.S. Appl. No. 14/204,305, Preliminary Amendment, Mar. 24, 2014.
U.S. Appl. No. 14/204,305, Non-Final Office Action, Feb. 25, 2015.
U.S. Appl. No. 14/204,305, Response to Non-Final Action, May 15, 2015.
U.S. Pat. No. 7,445,550, Non-Final Rejection, Oct. 29, 2007.
U.S. Pat. No. 7,445,550, Response to Non-Final Action, Feb. 13, 2008.
U.S. Pat. No. 7,445,550, Supplemental Amendment, Mar. 12, 2008.
U.S. Pat. No. 7,445,550, Notice of Allowance, Jul. 2, 2008.
U.S. Pat. No. 8,089,458, Preliminary Amendment, Mar. 14, 2011.
U.S. Pat. No. 8,089,458, Notice of Allowance, Jul. 25, 2011.
U.S. Pat. No. 8,089,458, Request for Continued Examination, Aug. 19, 2011.
U.S. Pat. No. 8,089,458, Notice of Allowance, Sep. 20, 2011.
U.S. Pat. No. 7,878,905, Non-Final Rejection, Mar. 31, 2008.
U.S. Pat. No. 7,878,905, Response to Non-Final Rejection, Jun. 25, 2008.
U.S. Pat. No. 7,878,905, Non-Final Rejection, Dec. 2, 2008.
U.S. Pat. No. 7,878,905, Response to Non-Final Rejection, Mar. 2, 2009.
U.S. Pat. No. 7,878,905, Final Rejection, Jul. 2, 2009.
U.S. Pat. No. 7,878,905, Request for Continued Examination, Nov. 2, 2009.
U.S. Pat. No. 7,878,905, Non-Final Rejection, Nov. 23, 2009.
U.S. Pat. No. 7,878,905, Response to Non-Final Rejection, Mar. 22, 2010.
U.S. Pat. No. 7,878,905, Final Rejection, Jun. 21, 2010.
U.S. Pat. No. 7,878,905, Amendment After Final, Oct. 7, 2010.
U.S. Pat. No. 7,878,905, Request for Continued Examination, Oct. 27, 2010.
U.S. Pat. No. 7,878,905, Notice of Allowance, Nov. 15, 2010.
U.S. Pat. No. 7,896,742, Preliminary Amendment, Feb. 20, 2008.
U.S. Pat. No. 7,896,742, Non-Final Rejection, Jun. 3, 2010.
U.S. Pat. No. 7,896,742, Response to Non-Final Rejection, Jul. 1, 2010.
U.S. Pat. No. 7,896,742, Notice of Allowance, Nov. 9, 2010.
U.S. Pat. No. 8,330,284, Preliminary Amendment, Jul. 5, 2011.
U.S. Pat. No. 8,330,284, Suppl. Preliminary Amendment, Feb. 27, 2012.
U.S. Pat. No. 8,330,284, Notice of Allowance, Aug. 3, 2012.
U.S. Pat. No. 8,531,050, Notice of Allowance, Feb. 8, 2013.
U.S. Pat. No. 8,531,050, Request for Continued Examination, May 7, 2013.
U.S. Pat. No. 8,531,050, Notice of Allowance, Jun. 7, 2013.
U.S. Pat. No. 8,491,389, Preliminary Amendment, Aug. 19, 2011.
U.S. Pat. No. 8,491,389, Supp. Preliminary Amendment, Feb. 27, 2012.
U.S. Pat. No. 8,491,389, Notice of Allowance, Oct. 9, 2012.
U.S. Pat. No. 8,169,406, Notice of Allowance, Nov. 16, 2011.
U.S. Pat. No. 8,184,097, Preliminary Amendment, Dec. 6, 2011.
U.S. Pat. No. 8,184,097, Suppl. Preliminary Amendment, Mar. 1, 2012.
U.S. Pat. No. 8,184,097, Notice of Allowance, Mar. 8, 2012.
U.S. Pat. No. 8,164,567, Preliminary Amendment, Dec. 8, 2011.
U.S. Pat. No. 8,164,567, Supplemental Preliminary Amendment, Feb. 27, 2012.
U.S. Pat. No. 8,164,567, Notice of Allowance, Mar. 7, 2012.
U.S. Pat. No. 8,248,367, Notice of Allowance, May 21, 2012.

(56) References Cited

OTHER PUBLICATIONS

U.S. Pat. No. 8,248,367, Amendment after Allowance, May 30, 2012.
U.S. Pat. No. 8,475,275, Notice of Allowance, Dec. 26, 2012.
U.S. Pat. No. 8,475,275, Request for Continued Examination, Jan. 9, 2013.
U.S. Pat. No. 8,475,275, Notice of Allowance, Apr. 8, 2013.
U.S. Pat. No. 8,373,659, Preliminary Amendment, Jul. 11, 2012.
U.S. Pat. No. 8,373,659, Supp. Preliminary Amendment, Jul. 30, 2012.
U.S. Pat. No. 8,373,659, Notice of Allowance, Dec. 5, 2012.
U.S. Pat. No. 8,368,648, Notice of Allowance, Nov. 2, 2012.
U.S. Pat. No. 8,384,668, Notice of Allowance, Nov. 30, 2012.
U.S. Appl. No. 13/725,899, Suppl. Preliminary Amendment, Dec. 26, 2013.
U.S. Appl. No. 13/725,775, Suppl. Preliminary Amendment, Dec. 26, 2013.
U.S. Pat. No. 8,790,180, Suppl. Preliminary Amendment, Dec. 26, 2013.
U.S. Pat. No. 8,790,180, Notice of Allowance, Apr. 1, 2013.
U.S. Pat. No. 8,711,094, Suppl. Preliminary Amendment, Sep. 25, 2013.
U.S. Pat. No. 8,711,094, Notice of Allowance, Nov. 22, 2013.
U.S. Pat. No. 8,814,688, Non-Final Rejection, Jan. 22, 2014.
U.S. Pat. No. 8,814,688, Response to Non-Final Rejection, Apr. 3, 2014.
U.S. Pat. No. 8,814,688, Notice of Allowance, Jun. 4, 2014.
U.S. Appl. No. 13/827,262, Suppl. Preliminary Amendment, Dec. 26, 2013.
U.S. Pat. No. 8,686,579, Notice of Allowance, Nov. 5, 2013.
U.S. Pat. No. 8,686,579, Corrected Notice of Allowance, Dec. 10, 2013.
U.S. Pat. No. 8,686,579, Corrected Notice of Allowance, Jan. 31, 2014.
U.S. Appl. No. 14/204,945, Preliminary Amendment, Jun. 2, 2014.
U.S. Appl. No. 14/204,945, Notice of Allowance, May 14, 2015.
U.S. Pat. No. 8,913,011, Notice of Allowance, Sep. 25, 2014.
U.S. Pat. No. 8,961,312, Non-Final Rejection, Jul. 11, 2014.
U.S. Pat. No. 8,961,312, Response to Non-Final Rejection, Oct. 8, 2014.
U.S. Pat. No. 8,961,312, Suppl. Response, Nov. 7, 2014.
U.S. Pat. No. 8,961,312, Notice of Allowance, Nov. 21, 2014.
U.S. Pat. No. 8,915,785, Preliminary Amendment, Jul. 22, 2014.
U.S. Pat. No. 8,915,785, Notice of Allowance, Sep. 4, 2014.
U.S. Appl. No. 14/464,652, Preliminary Amendment, Aug. 28, 2014.
U.S. Appl. No. 14/464,652, Non-Final Office Action, Oct. 21, 2014.
U.S. Appl. No. 14/464,652, Notice of Allowance, Dec. 17, 2014.
U.S. Appl. No. 14/568,834, Preliminary Amendment, Dec. 17, 2014.
U.S. Appl. No. 14/568,834, Non-Final Office Action, Feb. 25, 2015.
U.S. Appl. No. 14/568,834, Response to Non-Final Rejection, May 15, 2015.
U.S. Appl. No. 14/569,104, Preliminary Amendment, Dec. 23, 2014.
U.S. Appl. No. 14/628,531, Preliminary Amendment, Feb. 24, 2015.
U.S. Appl. No. 14/720,080, Preliminary Amendment, May 26, 2015.
U.S. Appl. No. 14/479,222, Preliminary Amendment, Sep. 18, 2014.
U.S. Appl. No. 14/479,222, Non-Final Rejection, Nov. 4, 2014.
U.S. Appl. No. 14/479,222, Notice of Allowance, Jun. 8, 2015.
U.S. Pat. No. 8,961,260, Non-Final Rejection, Jul. 29, 2014.
U.S. Pat. No. 8,961,260, Response to Non-Final Rejection, Oct. 22, 2014.
U.S. Pat. No. 8,961,260, Notice of Allowance, Nov. 24, 2014.
U.S. Appl. No. 14/621,711, filed Feb. 13, 2015.
"Kirby Tilt 'n' Tumble 2" http://www.unseen64.net/2008/04/08/koro-koro-kirby-2-kirby-tilt-n-tumble-2-gc-unreleased/, Apr. 8, 2008 (accessed on Jul. 29, 2011).

Boulanger et al., "The 1997 Mathews Radio Baton and Improvisation Modes," Music Synthesis Department, Berklee College of Music (1997).
Complainants' Petition for Review, dated Sep. 17, 2012.
Complainants' Response to Commission's Request for Statements on the Public Interest, dated Oct. 10, 2012.
Complainants' Response to Respondents' Review, dated Sep. 25, 2012.
*Creative Kingdoms LLC* v. *ITC*, The United States Court of Appeals for the Federal Circuit, No. 2014-1072, dated Dec. 19, 2014.
Exintaris, et al., "Ollivander's Magic Wands : HCI Development," available at http://www.cim.mcgill.ca/~jer/courses/hci/project/2002/www.ece.mcgill.ca/%257Eeurydice/hci/notebook/final/MagicWand.pdf (2002).
Expert Report of Branimir R. Vojcic, Ph.D. on Behalf of Complainants Creative Kingdoms, LLC and New Kingdoms, LLC, dated Nov. 17, 2011.
Expert Report of Kenneth Holt on Behalf of Respondents Nintendo of America, Inc. and Nintendo Co., Ltd., dated Nov. 3, 2011.
Expert Report of Nathaniel Polish, Ph.D. on Behalf of Respondents Nintendo of America, Inc. and Nintendo Co., Ltd., dated Nov. 3, 2011.
IGN Article—Mad Catz Rumble Rod Controller, Aug. 20, 1999.
Initial Determination on Violation of Section 337 and Recommended Determination on Rememdy and Bond, dated Aug. 31, 2012.
Marrin, Teresa, "Toward an Understanding of Musical Gesture: Mapping Expressive Intention with the Digital Baton," Masters Thesis, Massachusetts Institute of Technology, Program in Media Arts and Sciences (1996).
Nintendo N64 Controller Pak Instruction Booklet, 1997.
Paradiso, et al., "Musical Applications of Electric Field Sensing", available at http://pubs.media.mit.edu/pubs/papers/96_04_cmj.pdf (1996).
Paradiso, Joseph A., "The Brain Opera Technology: New Instruments and Gestural Sensors for Musical Interaction and Performance" (Nov. 1998) (available at http://pubs.media.mit.edu/pubs/papers/98_3_JNMR_Brain_Opera.pdf).
Petition of the Office of Unfair Import Investigations for Review-in-Part of the Final Initial Determination, dated Sep. 17, 2012.
Pre-Hearing Statement of Complainants Creative Kingdoms, LLC and New Kingdoms, LLC, dated Jan. 13, 2012.
Public Version of Commission Opinion from United States International Trade Commission, dated Oct. 28, 2013.
Respondents Nintendo Co., Ltd. and Nintendo of America Inc.'s Contingent Petition for Review of Initial Determination, dated Sep. 17, 2012.
Respondents Nintendo Co., Ltd. and Nintendo of America Inc.'s Objections and Supplemental Responses to Complainants Creative Kingdoms, LLC and New Kingdoms, LLC's Interrogatory Nos. 35, 44, 47, 53, and 78, dated Oct. 13, 2011.
Respondents Nintendo Co., Ltd. and Nintendo of America Inc.'s Response to Complainants' and Staff's Petitions for Review, dated Sep. 25, 2012.
Response of the Office of Unfair Import Investigations to the Petitions for Review, dated Sep. 25, 2012.
Response to Office Action dated Sep. 18, 2009 for U.S. Appl. No. 11/404,844.
Specification of the Bluetooth System—Core v1.0b, Dec. 1, 1999.
Verplaetse,"Inertial Proprioceptive Devices: Self-Motion Sensing Toys and Tools," IBM Systems Journal, vol. 35, Nos. 3&4 (Sep. 1996).
"At-home fishing", http:www.virtualpet.com/vp/media/fishing/homef.jpg (accessed on Jan. 14, 2010).
"Coleco Vision: Super Action™ Controller Set," www.vintagecomputing.com/wp-content/images/retroscan/coleco_sac_1_large.jpg. (downloaded from Internet on Sep. 2, 2011; available at http://www.vintagecomputing.com on Sep. 4, 2006).
"Controllers-Atari Space Age Joystic," AtariAge: Have You Played Atari Today? www.atariage.com/controller_page.html?SystemID=2600& ControllerID-12., Sep. 1, 2006.

(56) References Cited

OTHER PUBLICATIONS

"Controllers-Booster Grip," AtariAge: Have You Played Atari Today? www.atariage.com/controller_page.html?SystemID=2600& ControllerID=18., (accessed on Jul. 29, 2011; allegedly available as early as Sep. 1, 2006).
"Electronic Plastic: BANDAI—Power Fishing" "Power Fishing Company: BANDAI," 1 page, http://www.handhelden.com/Bandai/PowerFishing.html., 1984 (accessed on Jul. 29, 2011).
"Game Controller" Wikipedia, Jan. 5, 2005.
"Get Bass," Videogame by Sega, The International Arcade Museum and the KLOV (accessed at http://www.arcade-museum.com/game_detail.php?game_id=7933 on Jul. 29, 2011).
"Glove-based input interfaces" Cyberglove/Cyberforce, http://www.angelfire.com/ca7/mellott124/glove1.htm (accessed on Jul. 29, 2011).
"Harry Potter Magic Spell Challenge," Tiger Electronics, 2001.
"Imp Coexists With Your Mouse," Byte, p. 255, Jan. 1994.
"MEMS enable smart golf clubs," Small Times, Jan. 6, 2005, accessed at http://dpwsa.electroiq.com/index/display/semiconductors-article-display/269788/articles/small-times/consumer/2005/01/mems-enable-smart-golf-clubs.html on Jul. 29, 2011.
"Miacomet and Interact Announce Agreement to Launch Line of Reel Feel™ Sport Controllers", PR Newswire (May 13, 1999), accessed at http://www.thefreelibrary.com/_print/PrintArticle.aspx?id=54621351 on Sep. 7, 2011.
"The N.I.C.E. Project," YouTube video uploaded by evltube on Nov. 20, 2007 (accessed at http://www.youtube.com/watch?v=ihGXa21qLms on Sep. 8, 2011; digital video available upon request).
"212 Series Encoders" HT12A/HT12E by HOLTEK—Product Specification, Apr. 2000.
"212 Series of Decoders" HT12D/HT12F by HOLTEK—Product Specification, Nov. 2002.
"ASCII Entertainment releases the Grip," ASCII Entertainment Software—Press News—Coming Soon Magazine, May 1997 (electronic version accessed at http://www.csoon.com/issue25/p_ascii4.htm on Sep. 6, 2011).
"Enchanted Spell-Casting Sorcerers Wand" by Ken Holt as featured on www.inventionconnection.com online advertisement, Dec. 2002.
"Interview with Pat Goschy, the "Real" Nintendo Wii Inventor," YouTube video uploaded by agbulls on Jan. 14, 2008 (accessed at http://www.youtube.com/watch?v=oKtZysYGDLE on Feb. 11, 2011; digital video available upon request).
"Micro Tilt Switch" D6B by Omron® Product Specification, Jan. 2007.
"Nintendo Wii Controller Invented by Americans: Midway Velocity Controller Technology Brief," You Tube Video presentation dated Jun. 28, 2000; uploaded by drjohniefever on Sep. 8, 2007 (accessed at http://www.youtube.com/watch?v=wjLhSrSxFNw on Jun. 30, 2010; digital video available upon request).
"Raise High the 3D Roof Beam: Kids shape these PC games as they go along." by Anne Field, article as featured in Business Week 2001. (Nov. 26, 2001).
"Serial-in Parallel-out Shift Register" SN54/74LS164 by Motorola-Product Specification, Fifth Edition, 1992.
"Sony PS2 Motion Controller 5 years ago (2004)," YouTube Video uploaded by r1oot on Jul. 8, 2009 (accessed at http://www.youtube.com/watch?v=JbSzmRt7HhQ&feature=related on Sep. 6, 2011; digital video available upon request).
"The Big Ideas Behind Nintendo's Wii," Business Week, Nov. 16, 2006 (accessed at http://www.businessweek.com/technology/content/nov2006/tc20061116_750580.htm on Aug. 31, 2011).
"The Magic Labs Conjure Wands" as featured on www.magic-lab.com Product Specification, Dec. 2002.
"Tilt Switch" by Fuji & Co. as featured on www.fuji-piezo.com online advertisement, May 2001.
"Toy Wand Manufacturer Selects MEMSIC Sensor: Magic Labs cuts costs with MEMSIC sensor" Press Release by MEMSIC, Inc. as featured on www.memsic.com, May 2002.
"Wii Mailbag," IGN.com, Jan. 26, 2006 (accessed at http://uk.wii.ign.com/mail/2006-01-26.html on Aug. 31, 2011).
Acar, et al., "Experimental evaluation and comparative analysis of commercial variable-capacitance MEMS accelerometers," Journal of Micromechanics and Microengineering, vol. 13 (1), pp. 634-645, May 2003.
Achenbach, "Golf's New Measuring Stick," Golfweek, 1 page., Jun. 11, 2005.
Act Labs, Miacomet Background, Jan. 27, 2001, http://web.archive.org/web/200101271753/http://www.act-labs.com/ realfeel_background.htm, (accessed on Sep. 7, 2011).
Agard, "Advances in Strapdown Inertial Systems," Agard Lecture Series No. 133, Advisory Group for Aerospace Research and Development, Neuilly-Sur-Seine (France) May 1984.
AirPad Controller Manual, (AirPad Corp. 2000).
Airpad Motion Reflex Controller for Sony Playstation—Physical Product, (AirPad Corp. 2000).
Algrain, "Estimation of 3-D Angular Motion Using Gyroscopes and Linear Accelerometers," IEEE Transactions on Aerospace and Electronic Systems, vol. 27, No. 6, pp. 910-920, Nov. 1991.
Algrain, et al., "Accelerometer Based Line-of-Sight Stabilization Approach for Pointing and Tracking System," Second IEEE Conference on Control Applications, Sep. 13-16, 1993 Vancouver, B.C.., pp. 159-163 Sep. 13-16, 1993.
Algrain, et al., "Interlaced Kalman Filtering of 3-D Angular Motion Based on Euler's Nonlinear Equations," IEEE Transactions on Aerospace and Electronic Systems, vol. 30, No. 1, Jan. 1994.
Allen, et al., "A General Method for Comparing the Expected Performance of Tracing and Motion Capture Systems," {VRST} '05: Proceedings of the ACM Symposium on Virtual Reality Software and Technology, Nov. 7-9, 2005 Monterey, California Nov. 7-9, 2005.
Allen, et al., "Tracking: Beyond 15 Minutes of Thought," SIGGRAPH 2001 Course 11, Aug. 2001.
Analog Devices "ADXL202E Low-Cost .+−.2 g Dual-Axis Accelerometer with Duty Cycle Output" Data Sheet, Rev. A, Oct. 2000.
Analog Devices "ADXL330 Small, Low Power, 3-Axis ±2 g iMEMS Accelerometer" Data Sheet, Rev. PrA Oct. 2005.
Analog Devices "ADXL50 Monolithic Accelerometer with Signal Conditioning" Data Sheet Mar. 1996.
Analog Devices "ADXRS150±150°/s Single Chip Yaw Rate Gyro with Signal Conditioning" Data Sheet, Rev. B, Mar. 2004.
Analog Devices "ADXRS401 ±75°/s Single Chip Yaw Rate Gyro with Signal Conditioning" Data Sheet, Rev. O, Jul. 2004.
Analog Devices "MicroConverter®, Multichannel 12-Bit ADC with Embedded Flash MCU, ADuC812" Data Sheet (Feb. 2003), available at http://www.analog.com/static/imported-files/data_sheets/ADUC812.pdf.
Analog Devices, "ADXL150/ADXL250, ±5g to ±50g, Low Noise, Low Power, Single/Dual Axis iMEMS® Accelerometers," Data Sheet, Rev. 0 (Apr. 1998).
Ang, et al., "Design and Implementation of Active Error Canceling in Hand-held Microsurgical Instrument," Paper presented at 2001 IEEE/RSJ International Conference on Intelligent Robots and Systems (Oct./Nov. 2001).
Ang, et al., "Design of All-Accelerometer Inertial Measurement Unit for Tremor Sensing in Hand-held Microsurgical Instrument," Proceedings of the 2003 IEEE International Conference on Robotics & Automation, Sep. 14-19, 2003, Taipei, Taiwan, pp. 1781-1786, Sep. 14-19, 2003.
Apostolyuk, Vladislav, "Theory and Design of Micromechanical Vibratory Gyroscopes," MEMS/NEMS Handbook, Springer, vol. 1, pp. 173-195 (May 2006).
Ascension Technology, 6D Bird Class B Installation and Operation Guide, Apr. 30, 2003.
ASCII, picture of one-handed controller, 2 pages, Feb. 6, 2006.
Ator, "Image-Velocity Sensing with Parallel-Slit Reticles," Journal of the Optical Society of America, vol. 53, No. 12, pp. 1416-1422, Dec. 1963.
Azarbayejani, et al, "Real-Time 3-D Tracking of the Human Body," M.I.T. Media Laboratory Perceptual Computing Section Technical Report No. 374, Appears in Proceedings of Image'Com 96, Bordeaux, France, May 1996.

(56) References Cited

OTHER PUBLICATIONS

Azarbayejani, et al., "Visually Controlled Graphics," M.I.T. Media Laboratory Perceptual Computing Section Technical Report No. 374, Appears in IEEE Transactions on Pattern Analysis and Machine Intelligence, vol. 15, No. 6, pp. 602-605, Jun. 1993.

Azuma et al., "Improving Static and Dynamic Registration in an Optical See-Through HMD," Paper Presented at SIGGRAPH '94 Annual Conference in Orlando, FL, Mar. 1994.

Azuma, "Predictive Tracking for Augmented Reality," Ph.D. Dissertation, University of North Carolina at Chapel Hill, Department of Computer Science, Feb. 1995.

Azuma, et al., "A Frequency-Domain Analysis of Head-Motion Prediction," Paper Presented at SIGGRAPH '95 Annual Conference in Los Angeles, CA, Feb. 1995.

Azuma, et al., "A motion-stabilized outdoor augmented reality system," Proceedings of IEEE Virtual Reality '99, Houston, TX, Mar. 13-17, 1999, pp. 252-259.

Azuma, et al., "Making Augmented Reality Work Outdoors Requires Hybrid Tracking,"Proceedings of the International Workshop on Augmented Reality, San Francisco, CA, Nov. 1, 1998.

Bachmann et al., "Inertial and Magnetic Posture Tracking for Inserting Humans into Networked Virtual Environments," Virtual Reality Software and Technology archive, Paper Presented at ACM Symposium on Virtual Reality Software and Technology in Banff, Alberta, Canada, Dec. 2000.

Bachmann et al., "Orientation Tracking for Humans and Robots Using Inertial Sensors" Paper Presented at 199 International Symposium on Computational Intelligence in Robotics & Automation (CIRA '99), Mar. 1999.

Bachmann, "Inertial and Magnetic Angle Tracking of Limb Segments for Inserting Humans into Synthetic Environments," Dissertation, Naval Postgraduate School, Monterey, CA (Dec. 2000).

Badler, et al., "Multi-Dimensional Input Techniques and Articulated Figure Positioning by Multiple Constraints," Interactive 3D Graphics, Oct. 1986; pp. 151-169.

Baker et al., "Active Multimodal Control of a 'Floppy' Telescope Structure," Proc. SPIE, vol. 4825, pp. 74-81 (2002).

Balakrishnan, "The Rockin' Mouse: Integral 3D Manipulation on a Plane," Published in Proceedings of 1997 ACM Conference on Human Factors in Computing Systems (CHI'97), pp. 311-318, Jun. 1997.

Ballagas, et al., "iStuff: A Physical User Interface Toolkit for Ubiquitous Computer Environments," Paper presented at SIGCHI Conference on Human Factors in Computing Systems, Apr. 2003.

Baraff, "An Introduction to Physically Based Modeling: Rigid Body Simulation I—Unconstrained Rigid Body Dynamics," SIGGRAPH 97 Course Notes, Robotics Institute, Carnegie Mellon University (Aug. 1997).

Baudisch, et al., "Soap: a Pointing Device that Works in Mid-air," Proc. UIST'06, Oct. 15-18, 2006, Montreux, Switzerland (Oct. 2006).

BBN Report No. 7661, "Virtual Environment Technology for Training (VETT)," The Virtual Environment and Teleoperator Research Consortium (VETREC), pp. III-A-27 to III-A-40 (Mar. 1992).

Behringer, "Improving the Registration Precision by Visual Horizon Silhouette Matching," Paper presented at First IEEE Workshop on Augmented Reality (Feb. 1998).

Behringer, "Registration for Outdoor Augmented Reality Applications Using Computer Vision Techniques and Hybrid Sensors," Paper presented at IEEE Virtual Reality (VR '99) Conference in Houston, TX (Mar. 1999).

BEI GyrochipTM Model QRS11 Data Sheet, BEI Systron Donner Inertial Division, BEI Technologies, Inc., (Sep. 1998).

Benbasat, "An Inertial Measurement Unit for User Interfaces," Massachusetts Institute of Technology Masters Thesis, (Sep. 2000).

Benbasat, et al., "An Inertial Measurement Framework for Gesture Recognition and Applications," Paper Presented at International Gesture Workshop on Gesture and Sign Languages in Human-Computer Interaction (GW '01), London, UK (Sep. 2001).

Bhatnagar, "Position trackers for Head Mounted Display systems: A survey" (Technical Report), University of North Carolina at Chapel Hill (Mar. 1993).

Bianchi, "A Tailless Mouse, New cordless Computer Mouse Invented by ArcanaTech," Inc.com, Jun. 1, 1992 (accessed at http://www.inc.com/magazine/19920601/4115.html on Jun. 17, 2010).

Bishop, "The Self-Tracker: A Smart Optical Sensor on Silicon," Ph.D. Dissertation, Univ. of North Carolina at Chapel Hill (1984), 65 pages.

Bjork, Staffan et al., "Pirates! Using the Physical World as a Game Board," Reportedly presented as part of INTERACT 2001: 8th TC.13 IFIP International Conference on Human-Computer Interaction, Tokyo Japan (Jul. 9-13, 2001).

Bluffing Your Way in Pokemon, Oct. 14, 2002, 7 pages.

Bona, et al., "Optimum Reset of Ship's Inertial Navigation System," IEEE Transactions on Aerospace and Electronic Systems, Abstract only (1965) (accessed at http://oai.dtic.mil/oai/oai?verb=getRecord&metadataPrefix=html&identifier=AD0908193 on Jun. 17, 2010).

Borenstein, et al., "Where am I? Sensors and Methods for Mobile Robot Positioning" (Apr. 1996).

Borovoy, R. , et al., "Things that Blink: Computationally Augmented Name Tags," IBM Systems Journal, vol. 35, Nos. 3 & 4, 1996; pp. 488-495 (May 1996).

Borovoy, Richard et al., "Groupwear: Nametags That Tell About Relationships," Chi 98, Apr. 1998, pp. 329-330.

Boser, "3-Axis Accelerometer with Differential Sense Electronics," Berkeley Sensor & Actuator Center, available at http://www.eecs.berkeley.edu/.about.boser/pdf/3axis.pdf (Feb. 1997).

Boser, "Accelerometer Design Example: Analog Devices XL-05/5," Berkeley Sensor & Actuator Center, available at http://www.eecs.berkeley.edu/.about.boser/pdf/xl05.pdf (1996).

Bowman, et al., "An Introduction to 3-D User Interface Design," MIT Presence, vol. 10, No. 1, pp. 96-108 (Feb. 2001).

Briefs, (New & Improved), (Brief Article), PC Magazine, Oct. 26, 1993.

Britton et al., "Making Nested Rotations Convenient for the User," SIGGRAPH '78 Proceedings of the 5th Annual Conference on Computer Graphics and Interactive Techniques, vol. 12, Issue 3, pp. 222-227 (Aug. 1978).

Britton, "A Methodology for the Ergonomic Design of Interactive Computer Graphic Systems, and its Application to Crystallography" Ph.D. Dissertation, University of North Carolina at Chapel Hill, Dept. of Computer Science (1977).

Brownell, Richard, Review: Peripheral-GameCube-G3 Wireless Controller, gamesarefun.com, Jul. 13, 2003 (accessed at http://www.gamesarefun.com/gamesdb/perireview.php?perireviewid=1 on Jul. 29, 2011).

Buchanan, Levi: "Happy Birthday, Rumble Pak," IGN.com, Apr. 3, 2008 (accessed at http://retro.ign.com/articles/864/864231p1.html on Jul. 29, 2011).

Business Wire, "Feature/Virtual reality glasses that interface to Sega channel,Time Warner, TCI; project announced concurrent with COMDEX," Nov. 14, 1994 (accessed at http://findarticles.com/p/articles/mi_m0EIN/is_1994_Nov_14/ai_15923497/?tag=content;col1 on Jul. 7, 2010).

Business Wire, "Free-space 'Tilt' Game Controller for Sony Playstation Uses Scenix Chip; SX Series IC Processes Spatial Data in Real Time for on-Screen," Dec. 6, 1999 (accessed at http://findarticles.com/p/articles/mi_m0EIN/is_1999_Dec_6/ai_58042965/?tag=content;col1 on Jul. 7, 2010)).

Business Wire, "Logitech MAGELLAN 3D Controller," Apr. 14, 1997 (accessed at http://www.thefreelibrary.com/_/print/PrintArticle.aspx?id=19306114 on Feb. 10, 2011).

Business Wire, "Mind Path Introduces GYROPOINT RF Wireless Remote," Jan. 27, 2000 (accessed at http://www.allbusiness.com/company-activities-management/operations-office/6381880-1.html on Jun. 17, 2010).

Business Wire, "Pegasus' Wireless PenCell Writes on Thin Air with ART's Handwriting Recognition Solutions," Business Editors/High Tech Writers Telecom Israel 2000 Hall 29, Booth 19-20, Nov. 7, 2000 (accessed at http://www.highbeam.com/doc/1G1-66658008.html on Jun. 17, 2010).

(56) References Cited

OTHER PUBLICATIONS

Business Wire, "RPI ships low-cost pro HMD Plus 3D Mouse and VR PC graphics card system for CES," Jan. 9, 1995 (accessed at http://www.highbeam.com/doc/1G1-16009561.html on Jun. 17, 2010).

Business Wire, "InterSense Inc. Launches InertiaCube2—The World's Smallest Precision Orientation Sensor with Serial Interface," Aug. 14, 2001 (accessed at http://www.highbeam.com/doc/1G1-77183067.html/print on Sep. 7, 2011.).

Buxton et al., "A Study in Two-Handed Input," Proceedings of CHI '86, pp. 321-326 (1986) (accessed at http://www.billbuxton.com/2hands.html on Jul. 29, 2011).

Buxton, Bill, "A Directory of Sources for Input Technologies" (last updated Apr. 19, 2001), http://web.archive.org/web/20010604004849/http://www.billbuxton.com/InputSources.html (accessed on Sep. 8, 2011).

Buxton, Bill, "Human input/output devices," In M. Katz (ed.), Technology Forecast: 1995, Menlo Park, CA: Price Waterhouse World Firm Technology Center, pp. 49-65 (Sep. 1994).

Canaday, "R67-26 the Lincoln Wand," IEEE Transactions on Electronic Computers, vol. EC-16, No. 2, p. 240 (Apr. 1967) (downloaded from IEEE Xplore on Jul. 7, 2010).

Caruso, "Application of Magnetoresistive Sensors in Navigation Systems," Sensors and Actuators, SAE SP-1220, pp. 15-21 (Feb. 1997); text of article accessed at http://www.ssec.honeywell.com/position-sensors/datasheets/sae.pdf.

Caruso, "Applications of Magnetic Sensors for Low Cost Compass Systems," Honeywell, SSEC, Paper presented at IEEE 2000 Position Location and Navigation Symposium (Mar. 2000), accessed at http://www.ssec.honeywell.com/magnetic/datasheets/lowcost.pdf.

Caruso, et al., "A New Perspective on Magnetic Field Sensing," Sensors Magazine, Dec. 1, 1998 (accessed at http://www.sensorsmag.com/sensors/electric-magnetic/a-new-perspective-magnetic-field-sensing-855 on Jun. 17, 2010).

Caruso, et al., "Vehicle Detection and Compass Applications using AMR Magnetic Sensors", Paper presented at 1999 Sensors Expo in Baltimore, Maryland (May 1999), available at http://masters.donntu.edu.ua/2007/kita/gerus/library/amr.pdf.

Chatfield, "Fundamentals of High Accuracy Inertial Navigation," vol. 174 Progress in Astronautics and Aeronautics, American Institute of Aeronautics and Astronautics, Inc. (1997).

Cheng, "Direct interaction with Large-Scale Display Systems using Infrared Laser Tracking Devices," Paper presented at Australasian Symposium on Information Visualisation, Adelaide, Australia (Jan. 2003).

Cheok, et al., "Micro-Accelerometer Based Hardware Interfaces for Wearable Computer Mixed Reality Applications," 6th International Symposium on Wearable Computers (ISWC'02), 8 pages.

Cho, et al., "Magic Wand: A Hand-Drawn Gesture Input Device in 3-D Space with Inertial Sensors," Proceedings of the 9th Intl Workshop on Frontiers in Handwriting Recognition (IWFHR-9 2004), IEEE (Aug. 2004).

Clark, James H., "Designing Surfaces in 3-D," Graphics and Image Processing-Communications of the ACM, Aug. 1976; vol. 19; No. 8; pp. 454-460.

Clark, James H., "Three Dimensional Man Machine Interaction," Siggraph '76, Jul. 14-16 Philadelphia, Pennsylvania, 1 page.

CNET News.com, "Nintendo Wii Swings Into Action," May 25, 2006 (accessed at http://news.cnet.com/2300-1043_3-6070295-4.html on Aug. 5, 2011).

Cooke, et al., "NPSNET: Flight simulation dynamic modeling using quaternions," Presence, vol. 1, No. 4, pp. 404-420, (Jan. 25, 1994).

Crecente, Brian, "Motion Gaming Gains Momentum," kotaku.com, Sep. 17, 2010 (accessed at http://kotaku.com/5640867/motion-gaming-gains-momentum on Aug. 31, 2011).

CSIDC Winners—"Tablet-PC Classroom System Wins Design Competition," IEEE Computer Society Press, vol. 36, Issue 8, pp. 15-18, IEEE Computer Society, Aug. 2003.

Cutrone, "Hot products: Gyration GyroPoint Desk, GyroPoint Pro gyroscope-controlled wired and wireless mice," Results from the Comdex Show Floor, Computer Reseller News, Dec. 4, 1995 (accessed from LexisNexis research database on Feb. 17, 2011; see pp. 8 and 9 of reference submitted herewith).

Deering, Michael F. , "HoloSketch a Virtual Reality Sketching Animation Tool," ACM Transactions on Computer-Human Interaction, Sep. 1995; vol. 2, No. 3; pp. 220-238.

Deruyck, et al., "An Electromagnetic Position Sensor," Polhemus Navigation Sciences, Inc., Burlington, VT (Nov. 1973) (Abstract from DTIC Online).

Dichtburn, "Camera in Direct3D" Toymaker (Feb. 6, 2005), http://web.archive.org/web/20050206032104/http:/toymaker.info/games/html/camera.html (accessed on Jul. 29, 2011).

Digital ID Cards the next generation of 'smart' cards will have more than a one-track mind. Wall Street Journal, Jun. 25, 2001.

Donelson, et al., "Spatial Management of Information", Proceedings of 1978 ACM SIGGRAPH Conference in Atlanta, Georgia, pp. 203-209 (Aug. 1977).

Druin et al., Robots for Kids: Exploring New Technologies for Learning; Academic Press, 2000; Chapter One: to Mindstorms and Beyond; 27 pages (Jun. 2000).

Drzymala, Robert E., et al., "A Feasibility Study Using a Stereo-Optical Camera System to Verify Gamma Knife Treatment Specification," Proceedings of 22nd Annual EMBS International Conference, Jul. 2000; pp. 1486-1489.

Durlach, et al., "Virtual Reality: Scientific and Technological Challenges," National Academy Press (1995).

Emura, et al., "Sensor Fusion based Measurement of Human Head Motion," 3rd IEEE International Workshop on Robot and Human Communication (Jul. 1994).

Ewalt, David M., "Nintendo's Wii is a Revolution," Review, Forbes.com, Nov. 13, 2006 (accessed at http://www.forbes.com/2006/11/13/wii-review-ps3-tech-media-cx_de_1113wii.html on Jul. 29, 2011).

Ferrin, "Survey of Helmet Tracking Technologies," Proc. SPIE vol. 1456, p. 86-94 (Apr. 1991).

Fielder, Lauren "E3 2001: Nintendo unleashes GameCube software, a new Miyamoto game, and more," GameSpot, May 16, 2001 (accessed at http://www.gamespot.com/news/2761390/e3-2001-nintendo-unleashes-gamecube-software-a-new-miyamoto-game-and-more?tag=gallery_summary%3Bstory on Jul. 29, 2011).

File Wrapper for U.S. Appl. No. 09/520,148, filed Mar. 7, 2000 by Miriam Mawle.

Foremski, T., "Remote Control Mouse Aims at Interactive TV" Electronics Weekly, Mar. 9, 1994.

Foxlin, "Head-tracking Relative to a Moving Vehicle or Simulator Platform Using Differential Inertial Sensors," Proceedings of Helmet and Head-Mounted Displays V, SPIE vol. 4021, AeroSense Symposium, Orlando, FL, Apr. 24-25, 2000 (2000).

Foxlin, "Inertial Head Tracker Sensor Fusion by a Complementary Separate-bias Kalman Filter," Proceedings of the IEEE 1996 Virtual Reality Annual International Symposium, pp. 185-194, 267 (Mar./Apr. 3, 1996).

Foxlin, "Generalized architecture for simultaneous localization, auto-calibration, and map-building," IEEE/RSJ Conf. on Intelligent Robots and Systems (IROS 2002), Oct. 2-4, 2002, Lausanne, Switzerland (Oct. 2002).

Foxlin, "Motion Tracking Requirements and Technologies," Chapter 8, from Handbook of Virtual Environment Technology, Kay Stanney, Ed., Lawrence Erlbaum Associates (Jan. 2002) (extended draft version available for download at http://www.intersense.com/pages/44/119/).

Foxlin, "Pedestrian Tracking with Shoe-Mounted Inertial Sensors," IEEE Computer Graphics and Applications, vol. 25, No. 6, pp. 38-46, (Nov./Dec. 2005).

Foxlin, et al., "An Inertial Head-Orientation Tracker with Automatic Drift Compensation for Use with HMD's," Proceedings of the 1994 Virtual Reality Software and Technology Conference, Aug. 23-26, 1994, Singapore, pp. 159-173 (1994).

(56) References Cited

OTHER PUBLICATIONS

Foxlin, et al., "Constellation™: A Wide-Range Wireless Motion-Tracking System for Augmented Reality and Virtual Set Applications," ACM SIGGRAPH 98, Orlando, Florida, Jul. 19-24, 1998 (1998).
Foxlin, et al., "Miniature 6-DOF Inertial System for Tracking HMDs," SPIE vol. 3362, Helmet and Head-Mounted Displays III, AeroSense 98, Orlando, FL, Apr. 13-14, 1998 (1998).
Foxlin, et al., "WearTrack: A Self-Referenced Head and Hand Tracker for Wearable Computers and Portable VR," Proceedings of International Symposium on Wearable Computers (ISWC 2000), Oct. 16-18, 2000, Atlanta, GA (2000).
Foxlin, et al., "FlightTracker: A Novel Optical/Inertial Tracker for Cockpit Enhanced Vision, Symposium on Mixed and Augmented Reality," Proceedings of the 3rd IEEE/ACM International Symposium on Mixed and Augmented Reality (ISMAR 2004), Nov. 2-5, 2004, Washington, D.C. (2004).
Foxlin, et al., "Miniaturization, Calibration & Accuracy Evaluation of a Hybrid Self-Tracker," IEEE/ACM International Symposium on Mixed and Augmented Reality (ISMAR 2003), Oct. 7-10, 2003, Tokyo, Japan (2003).
Foxlin, et al., "VIS-Tracker: A Wearable Vision-Inertial Self-Tracker," IEEE VR2003, Mar. 22-26, 2003, Los Angeles, CA (2003).
Frankle, "E3 2002: Roll O Rama," Roll-o-Rama GameCube Preview at IGN, May 23, 2002 (accessed at http://cube.ign.com/articles/360/360662p1.html on Sep. 7, 2011).
Friedmann, et al., "Device Synchronization Using an Optimal Linear Filter," SI3D '92: Proceedings of the 1992 symposium on Interactive 3D graphics, pp. 57-62 (Mar./Apr. 1992).
Friedmann, et al., "Synchronization in virtual realities," M.I.T. Media Lab Vision and Modeling Group Technical Report No. 157, Jan. 1991 to appear in Presence, vol. 1, No. 1, MIT Press, Cambridge, MA (1991).
FrontSide Field Test, "Get This!" Golf Magazine, Jun. 2005, p. 36.
Fuchs, Eric, "Inertial Head-Tracking," MS Thesis, Massachusetts Institute of Technology, Dept. of Electrical Engineering and Computer Science (Sep. 1993).
Furniss, Maureen, "Motion Capture," posted at http://web.mit.edu/m-i-t/articles/index_furniss.html on Dec. 19, 1999; paper presented at the Media in Transition Conference at MIT on Oct. 8, 1999 (accessed on Sep. 8, 2011).
gamecubicle.com News Article, Nintendo WaveBird Controller, http://www.gamecubicle.com/news-Nintendo_gamecube_wavebird_controller.htm, May 14, 2002 (accessed on Aug. 5, 2011).
Geen, et al., "New iMEMS® Angular-Rate-Sensing Gyroscope," Analog Dialogue 37-03, pp. 12-14 (2003).
Gelmis, J., "Ready to Play, the Future Way," Buffalo News, Jul. 23, 1996 (accessed from LexisNexis research database on Sep. 6, 2011).
Grimm, et al., "Real-Time Hybrid Pose Estimation from Vision and Inertial Data," Proceedings of the First Canadian Conference on Computer and Robot Vision (CRV'04), IEEE Computer Society (Apr. 2004).
Gyration Ultra Cordless Optical Mouse, Setting Up Ultra Mouse, Gyration Quick Start Card part No. DL-00071-0001 Rev. A. Gyration, Inc., Jun. 2003.
Gyration Ultra Cordless Optical Mouse, User Manual, Gyration, Inc., Saratoga, CA (2003).
Gyration, "Gyration MicroGyro 100 Developer Kit Data Sheet," http://web.archive.org/web/19980708122611/www.gyration.com/html/devkit.ht- ml (Jul. 1998).
Gyration, Inc., GyroRemote GP240-01 Professional Series (Sep. 2003).
Harada, et al., "Portable Absolute Orientation Estimation Device with Wireless Network Under Accelerated Situation" Proceedings of the 2004 IEEE International Conference on Robotics & Automation, New Orleans, LA, Apr. 2004, pp. 1412-1417(Apr. 2004).
Harada, et al., "Portable orientation estimation device based on accelerometers, magnetometers and gyroscope sensors for sensor network," Proceedings of IEEE International Conference on Multisensor Fusion and Integration for Intelligent Systems (MFI 2003), pp. 191-196, (Aug. 2003).
Haykin, et al., "Adaptive Tracking of Linear Time-Variant Systems by Extended RLS Algorithms, IEEE Transactions on Signal Processing," vol. 45, No. 5, pp. 1118-1128 (May 1997).
Heath, "Virtual Reality Resource Guide AI Expert," v9 n5 p. 32(14) (May 1994) (accessed at http://ftp.hitl.washington.edu/scivw-ftp/commercial/VR-Resource-Guide.txt on Jun. 17, 2010).
HiBall-3100—"Wide-Area, High-Precision Tracker and 3D Digitizer," www.3rdtech.com/HiBall.htm (accessed on Jul. 29, 2011).
Hinckley, "Synchronous Gestures for Multiple Persons and Computers," Paper presented at ACM UIST 2003 Symposium on User Interface Software & Technology in Vancouver, BC, Canada (Nov. 2003).
Hinckley, et al., "A Survey of Design Issues in Spatial Input," Paper presented at 7th Annual ACM Symposium on User Interface Software and Technology (Nov. 1994).
Hinckley, et al., "Sensing Techniques for Mobile Interaction," Proceedings of the 13th Annual ACM Symposium on User Interface Software and Technology (ACM UIST), San Diego, CA, (Nov. 2000).
Hinckley, et al., "The VideoMouse: A Camera-Based Multi-Degree-of-Freedom Input Device" ACM UIST'99 Symposium on User Interface Software & Technology, CHI Letters vol. 1 No. 1, pp. 103-112 (Sep. 1999).
Hinckley, Ken, "Haptic Issues for Virtual Manipulation," Ph.D. Dissertation University of Virginia, Dept. of Computer Science (Jan. 1997).
Hind, Nicholas, "Cosmos: A composition for Live Electronic Instruments Controlled by the Radio Baton and Computer Keyboard (Radio Baton and Magic Glove)," A Final Project Submitted to the Department of Music of Stanford University in Partial Fulfillment of the Requirements for the Degree of Doctor Musical Arts/UMI Microform 9837187, Jan. 1998.
Hoffman, Hunter G., "Physically Touching Virtual Objects Using Tactile Augmentation Enhances the Realism of Virtual Environments," IEEE Virtual Reality Annual International Symposium '98, Atlanta, Georgia, Mar. 14-18, 1998, 5 pages (Mar. 1998).
Hogue, Andrew, "MARVIN: A Mobile Automatic Realtime visual and Inertial tracking system," Master's Thesis, York University (May 2003), available at http://www.cse.yorku.ca/~hogue/marvin.pdf.
Holden, Maureen K. et al., "Use of Virtual Environments in Motor Learning and Rehabilitation," Department of Brain and Cognitive Sciences, Handbook of Virtual Environments: Design, Implementation, and Applications, Chap. 49, pp. 999-1026, Stanney (ed), Lawrence Erlbaum Associates (Jan. 2002).
Holloway, Richard Lee, "Registration Errors in Augmented Reality Systems," Ph.D. Dissertation, University of North Carolina at Chapel Hill, Dept. of Computer Science (1995).
Immersion CyberGlove product, Immersion Corporation, http://www.cyberglovesystem.com (Jul. 2001).
Immersion, "Immersion Ships New Wireless CyberGlove(R) II Hand Motion-Capture Glove; Animators, Designers, and Researchers Gain Enhanced Efficiency and Realism for Animation, Digital Prototyping and Virtual Reality Projects," Business Wire, Dec. 7, 2005 (available at http://ir.immersion.com/releasedetail.cfm?releaseid=181278).
Interfax Press Release, "Tsinghua Tongfang Releases Unique Peripheral Hardware for 3D Gaming," Apr. 2002, 1 page. (Apr. 2002).
Intersense, "InterSense InertiaCube2 Devices," (Specification) (image) (2001).
Intersense, "InterSense InertiaCube2 Manual for Serial Port Model" (2001).
Intersense, "IS-900 Product Technology Brief," http://www.intersense.com/uploadedFiles/Products/White.sub.--Papers/IS900- .sub.--Tech.sub.--Overview.sub.--Enhanced.pdf (1999).

(56) References Cited

OTHER PUBLICATIONS

Intersense, "InterSense Inc., The New Standard in Motion Tracking," Mar. 27, 2004, http://web.archive,org!web12004040500550Z/ http://intersense.com (accessed on May 19, 2009).

Intersense, "InterSense Mobile Mixed Reality Demonstration," YouTube Video dated Oct. 2006 on opening screen; uploaded by InterSenseInc. on Mar. 14, 2008 (accessed at http://www.youtube.com/watch?v=daVdzGK0nUE&feature=channel_page on Sep. 8, 2011; digital video available upon request).

Intersense, "IS-900 Precision Motion Trackers," Jun. 14, 2002, http://web.archive.org/web/20020614110352/http://www.isense.com/products/prec/is900/ (accessed on Sep. 8, 2011).

Intersense, Inc., "Comparison of Intersense IS-900 System and Optical Systems," Whitepaper, Jul. 12, 2004., available at http://www.jazdtech.com/techdirect/research/InterSense-Inc.htm?contentSetId=60032939&supplierId=60018705.

Jacob, "Human-Computer Interaction—Input Devices," ACM Computing Surveys, vol. 28, No. 1, pp. 177-179 (Mar. 1996); link to text of article provided at http://www.cs.tufts.edu/~jacob/papers/.

Jakubowski, et al., "Increasing Effectiveness of Human Hand Tremor Separation Process by Using Higher-Order Statistics," Measurement Science Review, vol. 1, No. 1 (2001).

Ji, H. "Study on the Infrared Remote-Control Lamp-Gesture Device," Yingyong Jiguang/Applied Laser Technology, v. 17, n. 5, p. 225-227, Language: Chinese-Abstract only, Oct. 1997.

Jiang, "Capacitive position-sensing interface for micromachined inertial sensors," Dissertation at Univ. of Cal. Berkeley, 2003.

Ju, et al., "The Challenges of Designing a User Interface for Consumer Interactive Television Consumer Electronics Digest of Technical Papers.," IEEE 1994 International Conference on Volume , Issue , Jun. 21-23, 1994 pp. 114-115 (Jun. 1994) (downloaded from IEEE Xplore on Jul. 13, 2010).

Keir et al., "Gesture-recognition with Nonreferenced Tracking," IEEE Symposium on 3D User Interfaces, pp. 151-158, Mar. 25-26, 2006.

Kennedy, P.J. "Hand-held Data Input Device," IBM Technical Disclosure Bulletin, vol. 26, No. 11, pp. 5826-5827, Apr. 1984.

Kessler, et al., "The Simple Virtual Environment Library: an Extensible Framework for Building VE Applications," Presence, MIT Press vol. 9, No. 2. pp. 187-208 (Apr. 2000).

Kindratenko, "A Comparison of the Accuracy of an Electromagnetic and a Hybrid Ultrasound-Inertia Position Tracking System," MIT Presence, vol. 10, No. 6, pp. 657-663, Dec. 2001.

Klein et al., "Tightly Integrated Sensor Fusion for Robust Visual Tracking," British Machine Vision Computing, vol. 22, No. 10, pp. 769-776, Feb. 2004.

Kohlhase, "NASA Report, The Voyager Neptune travel guide," Jet Propulsion Laboratory Publication 89-24, (Jun. 1989).

Kormos, D.W. et al., "Intraoperative, Real-Time 3-D Digitizer for Neurosurgical Treatment and Planning," IEEE (Feb. 1993) (Abstract only).

Kosak, Dave, "Mind-Numbing New Interface Technologies," Gamespy.com, Feb. 1, 2005 (accessed at http://www.gamespy.com/articles/584/584744p1.html on Aug. 31, 2011).

Krumm et al., "How a Smart Environment can Use Perception," Paper presented at UBICOMP 2001 Workshop on Perception for Ubiquitous Computing (2001).

Kuipers, Jack B., "SPASYN—An Electromagnetic Relative Position and Orientation Tracking System," IEEE Transactions on Instrumentation and Measurement, vol. 29, No. 4, pp. 462-466 (Dec. 1980).

Kunz, Andreas M. et al., "Design and Construction of a New Haptic Interface," Proceedings of DETC '00, ASME 2000 Design Engineering Technical Conferences and Computers and Information in Engineering Conference, Baltimore, Maryland, Sep. 10-13, 2000.

La Scala, et al., "Design of an Extended Kalman Filter Frequency Tracker," IEEE Transactions on Signal Processing, vol. 44, No. 3 (Mar. 1996).

Laughlin, et al., "Inertial Angular Rate Sensors: Theory and Applications," SENSORS Magazine Oct. 1992.

Lee, et al., "Innovative Estimation Method with Measurement Likelihood for all-Accelerometer Type Inertial Navigation System," IEEE Transactions on Aerospace and Electronic Systems, vol. 38, No. 1, Jan. 2002.

Lee, et al., "Tilta-Pointer: the Free-Space Pointing Device," Princeton COS 436 Project (Fall 2004); retrieved from Google's cache of http://www.milyehuang.com/cos436/project/specs.html on May 27, 2011.

Lee, et al., "Two-Dimensional Position Detection System with MEMS Accelerometer for Mouse Applications," Design Automation Conference, 2001, Proceedings, 2001 pp. 852-857, Jun. 2001.

Leganchuk, et al., "Manual and Cognitive Benefits of Two-Handed Input: An Experimental Study," ACM Transactions on Computer-Human Interaction, vol. 5, No. 4, pp. 326-259, Dec. 1998.

Liang, et al., "On Temporal-Spatial Realism in the Virtual Reality Environment," ACM 1991 Symposium on User Interface Software and Technology (Nov. 1991).

Link, "Field-Qualified Silicon Accelerometers from 1 Milli g to 200,000 g," Sensors, Mar. 1993.

Liu, et al., "Enhanced Fisher Linear Discriminant Models for Face Recognition," Paper presented at 14th International Conference on Pattern Recognition (ICPR'98), Queensland, Australia (Aug. 1998).

Lobo, et al., "Vision and Inertial Sensor Cooperation Using Gravity as a Vertical Reference," IEEE Trans. on Pattern Analysis and Machine Intelligence, vol. 25, No. 12, pp. 1597-1608, Dec. 2003.

Logitech, "Logitech Tracker—Virtual Reality Motion Tracker," downloaded from http://www.vrealities.com/logitech.html on Jun. 18, 2010.

Logitech, Inc. "3D Mouse & Head Tracker Technical Reference Manual," Nov. 1992.

Logitech's WingMan Cordless RumblePad Sets PC Gamers Free, Press Release, Sep. 2, 2001 (accessed at http://www.logitech.com/en-us/172/1373 on Aug. 5, 2011).

Louderback, J. "Nintendo Wii", Reviews by PC Magazine, Nov. 13, 2006 (accessed at http://www.pcmag.com/article/print/193909 on Sep. 8, 2011).

Luethi, P. et al., "Low Cost Inertial Navigation System" (2000); downloaded from http://www.electronic-engineering.ch/study/ins/ins.html on Jun. 18, 2010.

Luinge, "Inertial sensing of human movement," Thesis, University of Twente, Twente University Press, (Oct. 2002).

Luinge, et al., "Estimation of orientation with gyroscopes and accelerometers," Proceedings of the First Joint BMES/EMBS Conference, 1999, vol. 2, p. 844 (Oct. 1999).

Mackenzie, et al., "A two-ball mouse affords three degrees of freedom," Extended Abstracts of the CHI '97 Conference on Human Factors in Computing Systems, pp. 303-304. New York: ACM (Oct. 1997).

Mackinlay, "Rapid Controlled Movement Through a Virtual 3D Workspace," ACM SIGGRAPH Computer Graphics archive, vol. 24, No. 4, pp. 171-176 (Aug. 1990).

Maclean, "Designing with Haptic Feedback", Paper presented at IEEE Robotics and Automation (ICRA '2000) Conference in San Francisco, CA, Apr. 22-28, 2000.

Maggioni, C., "A novel gestural input device for virtual reality," IEEE Virtual Reality Annual International Symposium (Cat. No. 93CH3336-5), 118-24, Jan. 1993.

Marks, Richard (Jan. 21, 2004) (Windows Media v7). EyeToy: A New Interface for Interactive Entertainment, Stanford University (accessed at http://lang.stanford.edu/courses/ee380/2003-2004/040121-ee380-100.wmv on Sep. 7, 2011; digital video available upon request).

Marrin, "Possibilities for the Digital Baton as a General Purpose Gestural Interface," Late-Breaking/Short Talks, Paper presented at CHI 97 Conference in Atlanta Georgia, Mar. 22-27, 1997 (accessed at http://www.sigchi.org/chi97/proceedings/short-talk/tm.htm on Aug. 5, 2011).

Marrin, Teresa et al., "The Digital Baton: A Versatile Performance Instrument," Paper presented at International Computer Music Conference, Thessaloniki, Greece (Sep. 1997) (text of paper available at http://quod.lib.umich.edu/cgi/p/pod/dod-idx?c=icmc; idno=bbp2372.1997.083).

(56) References Cited

OTHER PUBLICATIONS

Marti, et al., "Biopsy navigator: a smart haptic interface for interventional radiological gestures" Proceedings of the Computer Assisted Radiology and Surgery (CARS 2003) Conference, International Congress Series, vol. 1256, pp. 788-793 (Jun. 2003) (text of paper available at http://infoscience.epfl.ch/record/29966/files/CARS03-GM.pdf).
Masliah, "Measuring the Allocation of Control in 6 Degree of Freedom Docking Experiment," Paper presented at SIGCHI Conference on Human Factors in Computing Systems, The Hague, Netherlands (Apr. 2000).
Maybeck, "Stochastic Models, Estimation and Control," vol. 1, Chapter 1, Introduction (1979).
Merians, et al., "Virtual Reality-Augmented Rehabilitation for Patients Following Stroke," Physical Therapy, vol. 82, No. 9, Sep. 2002.
Merrill, "FlexiGesture: A sensor-rich real-time adaptive gesture and affordance learning platform for electronic music control," Thesis, Massachusetts Institute of Technology, Jun. 2004.
Meyer, et al., "A Survey of Position Tracker," MIT Presence, vol. 1, No. 2, pp. 173-200, (Nov. 1992).
Miller, Paul, "Exclusive shots of Goschy's prototype 'Wiimote' controllers," Engadget, Jan. 15, 2008 (accessed at http://www.engadget.com/2008/01/15/exclusive-shots-of-goschys-prototype-wiimote-controllers/ on Aug. 31, 2011).
Miller, Ross, "Joystiq interview: Patrick Goschy talks about Midway, tells us he 'made the Wii'," Joystiq.com, Jan. 16, 2008 (accessed at http://www.joystiq.com/2008/01/16/joystiq-interview-patrick-goschy-talks-about-midway-tells-us-h/ on Aug. 31, 2011).
Mizell, "Using Gravity to Estimate Accelerometer Orientation," Proceedings of the Seventh IEEE International Symposium on Wearable Computers (ISWC '03), IEEE Computer Society (Oct. 2003).
Morgan, C., "Still chained to the overhead projector instead of the podium," (TV Interactive Corp's LaserMouse Remote Pro infrared mouse) (clipboard) (brief article) (product announcement) Government Computer News, Jun. 13, 1994.
Morris, "Accelerometry—a technique for the measurement of human body movements," J Biomechanics vol. 6, pp. 729-736 (Nov. 1973).
Moser, "Low Budget Inertial Navigation Platform (2000)," www.tmoser.ch/typo3/11.0.html (accessed on Jul. 29, 2011).
Mulder, "Human movement tracking technology," Technical Report, NSERC Hand Centered Studies of Human Movement project, available through anonymous ftp in fas.sfu.ca:/pub/cs/graphics/vmi/HMTT.pub.ps.Z., Burnab, B.C, Canada: Simon Fraser University (Jul. 1994).
Myers, et al., "Interacting at a Distance: Measuring the Performance of Laser Pointers and Other Devices," CHI 2002, Apr. 2002.
Naimark, et al., "Encoded LED System for Optical Trackers," Paper presented at Fourth IEEE and ACM International Symposium on Mixed and Augmented Reality (ISMAR 2005), Oct. 5-8, 2005, Vienna Austria (2005) (electronic version of text of paper available for download at http://www.intersense.com/pages/44/129/).
Naimark, et al., "Circular Data Matrix Fiducial System and Robust Image Processing for a Wearable Vision-Inertial Self-Tracker," IEEE International Symposium on Mixed and Augmented Reality (ISMAR 2002), Darmstadt, Germany (Sep./Oct. 2002).
Navarrette, et al., "Eigenspace-based Recognition of Faces: Comparisons and a new Approach," Paper Presented at 11th International Conference on Image Analysis and Processing (Sep. 2001).
New Strait Times Press Release, "Microsoft's New Titles," Mar. 1998, 1 page.
News Article, "New Game Controllers Using Analog Devices' G-Force Tilt to be Featured at E3", Norwood, MA (May 10, 1999) (accessed at http://www.thefreelibrary.com/_/print/PrintArticle.aspx?id=54592268 on Jun. 17, 2010).
Nintendo Tilt Controller Ad, Electronic Gaming Monthly, 1994, 1 page.
Nintendo, Game Boy Advance SP System Instruction Booklet (2003).
Nintendo, Nintendo Game Boy Advance System Instruction Booklet (2001-2003).
Nintendo, Nintendo Game Boy Advance Wireless Adapter, Sep. 26, 2003.
Nishiyama, "A Nonlinear Filter for Estimating a Sinusoidal Signal and its Parameters in White Noise: On the Case of a Single Sinusoid," IEEE Transactions on Signal Processing, vol. 45, No. 4, pp. 970-981 (Apr. 1997).
Nishiyama, "Robust Estimation of a Single Complex Sinusoid in White Noise-H∞ Filtering Approach," IEEE Transactions on Signal Processing, vol. 47, No. 10, pp. 2853-2856 (Oct. 1999).
Odell, "An Optical Pointer for Infrared Remote Controllers," (1995) (downloaded from IEEE Xplore on Jul. 7, 2010).
Ojeda, et al., "No GPS? No Problem!" University of Michigan Develops Award-Winning Personal Dead-Reckoning (PDR) System for Walking Users, available at http://www.engin.umich.edu/research/mrl/urpr/In_Press/P135.pdf, (2004 or later).
Omelyan, "On the numerical integration of motion for rigid polyatomics: The modified quaternion approach" Computers in Physics, vol. 12 No. 1, pp. 97-103 (Jan./Feb. 1998).
Ovaska, "Angular Acceleration Measurement: A Review," Paper presented at IEEE Instrumentation and Measurement Technology Conference, St. Paul, MN, May 18-21, 1998 (1998).
Pai, et al., "The Tango: A Tangible Tangoreceptive Whole-Hand Interface," Paper presented at Joint Eurohaptics and IEEE Symposium on Haptic Interfaces for Virtual Environment and Teleoperator Systems, Pisa, Italy, Mar. 18-20, 2005 (2005).
Pajama Sam: No Need to Hide When It's Dark Outside Infogames, Sep. 6, 2002.
Paley, W. Bradford, "Interaction in 3D Graphics," SIGGRAPH Computer Graphics Newsletter, col. 32, No. 4 (Nov. 1998) (accessed at http://www.siggraph.org/publications/newsletter/v32n4/contributions/paley.html on Aug. 2, 2011).
Paradiso, et al., "Interactive Therapy with Instrumented Footwear," CHI 2004, Apr. 24-29, 2004, Vienna, Austria.
Park, Adaptive control strategies for MEMS gyroscopes (Dissertation), Univ. Cal. Berkley (Dec. 2000).
PC World, "The 20 Most Innovative Products of the Year," Dec. 27, 2006 (accessed at http://www.pcworld.com/printable/article/id,128176/printable.html on Aug. 2, 2011).
PCTracker, Technical Overview, available at http://www.est-kl.com/fileadmin/media/pdf/InterSense/PCTracker_Tech_Overview.pdf (date unknown).
Perry, Simon, "Nintendo to Launch Wireless Game Boy Adaptor," Digital Lifestyles, http://digital-lifestyles.info/2003/09/26/Nintendo-to-launch-wireless-game-boy-adaptor/, Sep. 26, 2003 (accessed on Jul. 29, 2011).
Phillips, "Forward/Up Directional Incompatibilities During Cursor Placement Within Graphical User Interfaces," Ergonomics, vol. 48, No. 6, May 15, 2005.
Phillips, "LPC2104/2105/2106, Single-chip 32-bit microcontrollers; 128 kB ISP/IAP Flash with 64 kB/32 kB/16 kB RAM," 32 pages, Dec. 22, 2004.
Phillips, "TECHWATCH: On the Right Track: A unique optical tracking system gives users greater freedom to explore virtual worlds," Computer Graphics World, vol. 23, Issue 4 (Apr. 2000).
Pierce, et al., "Image Plane Interaction Techniques in 3D Immersive Environments," Paper presented at 1997 symposium on Interactive 3D graphics, Providence, RI (Apr. 1997).
Pilcher, "AirMouse Remote Controls," IEEE Conference on Consumer Electronics (Jun. 1992).
Pique, "Semantics of Interactive Rotations," Interactive 3D Graphics, Proceedings of the 1986 workshop on Interactive 3D graphics, pp. 259-269 (Oct. 1986).
Piyabongkarn, "The Development of a MEMS Gyroscope for Absolute Angle Measurement," Dissertation, Univ. Minnesota, Nov. 2004 (Abstract only).
Polhemus, "Polhemus 3Space Fastrak devices" (image) (2001).

(56) References Cited

OTHER PUBLICATIONS

PowerGlove product Program Guide, Mattel, 1989 (Text of Program Guide provided from http://hiwaay.net/~lkseitz/cvtg/power_glove.shtml; the text was typed in by Lee K. Sietz; document created Aug. 25, 1988; accessed on Aug. 2, 2011).
PR Newswire, "Five New Retailers to Carry Gyration's Gyropoint Point and Gyropoint Pro," Jul. 8, 1996 (accessed at http://www.thefreelibrary.com/_/print/PrintArticle.aspx?id=54592268 on Jun. 18, 2010).
PR Newswire, "Three-Axis MEMS-based Accelerometer From STMicroelectronics Targets Handheld Terminals," Feb. 18, 2003 (accessed at http://www.thefreelibrary.com/_/print/PrintArticle.aspx?id=54592268 on Aug. 3, 2011).
Pryor, et al., "A Reusable Software Architecture for Manual Controller Integration," IEEE Conf. on Robotics and Automation, Univ of Texas, pp. 3583-3588 (Apr. 1997).
Raab et al., "Magnetic Position and Orientation Tracking System," IEEE Transactions on Aerospace and Electronic Systems, vol. AES-15, No. 5, pp. 709-718 (Sep. 1979).
Radica Legends of the Lake™ Instruction Manual (2003).
Regan, "Smart Golf Clubs," baltimoresun.com, Jun. 17, 2005.
Rekimoto, "Tilting Operations for Small Screen Interfaces," Tech Note presented at 9th Annual ACM Symposium on User Interface Software and Technology (UIST'96) (Nov. 1996) (available for download at http://www.sonycsl.co.jp/person/rekimoto/papers/uist96.pdf.
Response filed May 3, 2010 to Office Action dated Feb. 5, 2010 for U.S. Appl. No. 12/222,787, filed Aug. 15, 2008, now U.S. Pat. No. 7,774,155 (including Rule 1.132 Declaration by Steve Mayer).
Reunert, "Fiber-Optic Gyroscopes: Principles and Applications," SENSORS, Aug. 1993, pp. 37-38.
Ribo et al., "Hybrid Tracking for Outdoor Augmented Reality Applications," IEEE Computer Graphics and Applications, vol. 22, No. 6, pp. 54-63, Nov./Dec. 2002.
Riviere, et al., "Adaptive Canceling of Physiological Tremor for Improved Precision in Microsurgery," IEEE Transactions on Biomedical Engineering, vol. 45, No. 7, pp. 839-846 (Jul. 1998).
Roberts, "The Lincoln Wand," 1966 Proceedings of the Fall Joint Computer Conference (1966), available for electronic download at http://www.computer.org/portal/web/csdl/doi/10.1109/AFIPS, Apr. 1966,105.
Robinette, et al., "Implementation of Flying, Scaling, and Grabbing in Virtual Worlds," ACM Symposium (Jun. 1992).
Robinette, et al., "The Visual Display Transformation for Virtual Reality," University of North Carolina at Chapel Hill (Sep. 1994).
Roetenberg, "Inertial and magnetic sensing of human motion," Thesis, University of Twente (May 2006).
Roetenberg, et al., "Inertial and Magnetic Sensing of Human Movement Near Ferromagnetic Materials," Paper presented at Second IEEE and ACM International Symposium on Mixed and Augmented Reality, Mar. 2003 (available at http://www.xsens.com/images/stories/PDF/Inertial%20and%20magnetic%20sensing%20of%20human%20movement%20near%20ferromagnetic%20materials.pdf.
Rolland, et al., "A Survey of Tracking Technology for Virtual Environments," University of Central Florida, Center for Research and Education in Optics Lasers (CREOL) (Jan. 2001).
Romer, Kay et al., Smart Playing Cards: A Ubiquitous Computing Game, Personal and Ubiquitous Computing, Dec. 2002, vol. 6, Issue 5-6, pp. 371-377, London, England.
Rothman, Wilson, "Unearthed: Nintendo's Pre-Wiimote Prototype," gizmodo.com, Aug. 29, 2007 (accessed at http://gizmodo.com/gadgets/exclusive/unearthed-nintendo-2001-prototype-motion+sensing-one+handed-controller-by-gyration-294642.php on Aug. 31, 2011).
Rothman, Wilson, "Wii-mote Prototype Designer Speaks Out, Shares Sketchbook," Gizmodo.com, Aug. 30, 2007 (accessed at http://gizmodo.com/gadgets/exclusive/wii+mote-prototype-designer-speaks-out-shares-sketchbook-295276.php on Aug. 31, 2011).
Sakai, et al., "Optical Spatial Filter Sensor for Ground Speed," Optical Review, vol. 2, No. 1, pp. 65-67 (Jan. 1995).
Santiago, Alves, "Extended Kalman filtering applied to a full accelerometer strapdown inertial measurement unit," M.S. Thesis, Massachusetts Institute of Technology, Dept. of Aeronautics and Astronautics, Santiago (Sep. 1992).
Satterfield, Shane, "E3 2002: Nintendo announces new GameCube games," GameSpot, http://www.gamespot.com/gamecube/action/rollorama/news/2866974/e3-2002-nintendo-announces-new-gamecube-games, May 21, 2002 (accessed on Aug. 11, 2011).
Sawada, et al., "A Wearable Attitude-Measurement System Using a Fiberoptic Gyroscope," MIT Presence, vol. 11, No. 2, pp. 109-118, Apr. 2002.
Saxena, et al., "In Use Parameter Estimation of Inertial Sensors by Detecting Multilevel Quasi-Static States," Berlin: Springer-Verlag, pp. 595-601 (2005).
Sayed, "A Framework for State-Space Estimation with Uncertain Models," IEEE Transactions on Automatic Control, vol. 46, No. 7, Jul. 2001.
Schofield, Jack, et al., Games reviews, "Coming up for airpad," The Guardian (Feb. 3, 2000) (accessed at http://www.guardian.co.uk/technology/2000/feb/03/online supplement5/print on Jun. 18, 2010).
Sega/Sports Sciences, Inc., "Batter Up, It's a Hit," Instruction Manual, Optional Equipment Manual (1994).
Sega/Sports Sciences, Inc., "Batter Up, It's a Hit," Photos of baseball bat (1994).
Selectech Airmouse, "Mighty Mouse", Electronics Today International, p. 11 (Sep. 1990).
Shoemake, Ken, "Quaternions," available online at http://campar.in.tum.de/twiki/pub/Chair/DwarfTutorial/quatut.pdf (date unknown).
Skiens, Mike, "Nintendo Announces Wireless GBA Link", Bloomberg, Sep. 25, 2003 (accessed at http://www.nintendoworldreport.com/news/9011).
Smartswing, "SmartSwing: Intelligent Golf Clubs that Build a Better Swing," http://web.archive.org/web/20040728221951/http://www.smartswinggolf.com/ (accessed on Sep. 8, 2011).
Smartswing, "The SmartSwing Learning System Overview," Apr. 26, 2004, http://web.archive.org/web/2004426215355/http://www.smartswinggolf.com/tls/index.html (accessed on Jul. 29, 2011).
Smartswing, "The SmartSwing Learning System: How it Works," 3 pages, Apr. 26, 2004, http://web.archive.org/web/20040426213631/http://www.smartswinggolf.com/tls/how_it_works.html (accessed on Jul. 29, 2011).
Smartswing, "The SmartSwing Product Technical Product: Technical Information," Apr. 26, 2004, http://web.archive.org/web/20040426174854/http://www.smartswinggolf.com/products/technical_info.html (accessed on Jul. 29, 2011).
Smartswing, Training Aid, Austin, Texas, Apr. 2005.
Sorenson, et al., "The Minnesota Scanner: A Prototype Sensor for Three-Dimensional Tracking of Moving Body Segments," IEEE Transactions on Robotics and Animation, vol. 5, No. 4 (Aug. 1989).
Star Wars Action Figure with CommTech Chip by Hasbro (1999).
Stars Wars Episode 1 CommTech Reader Instruction Manual (1998).
Stovall, "Basic Inertial Navigation," NAWCWPNS TM 8128, Navigation and Data Link Section, Systems Integration Branch (Sep. 1997).
Sulic, "Logitech Wingman Cordless Rumblepad Review," Gear Review at IGN, Jan. 14, 2002 (accessed at http://gear.ign.com/articles/317/317472p1.html on Aug. 1, 2011).
Sutherland, "A Head-Mounted Three Dimensional Display," Paper presented at AFIPS '68 Fall Joint Computer Conference, Dec. 9-11, 1968, (1968); paper available at www.cise.ufl.edu/~lok/teaching/dcvef05/papers/sutherland-headmount.pdf.
Sutherland, Ivan E., "Sketchpad: A Man-Machine Graphical Communication System," Proceedings of the AFIPS Spring Joint Computer Conference, Detroit, Michigan, May 21-23, 1963, pp. 329-346 (source provided is reprinting of text accessed at http://www.guidebookgallery.org/articles/sketchpadamanmachinegraphicalcommunicationsystem on Sep. 8, 2011).

(56) References Cited

OTHER PUBLICATIONS

Tech Designers Rethink Toys: Make Them Fun Wall Street Journal, Dec. 17, 2001.
Templeman, James N., "Virtual Locomotion: Walking in Place through Virtual Environments," Presence, vol. 8, No. 6, pp. 598-617, Dec. 1999.
Timmer, "Modeling Noisy Time Series: Physiological Tremor," International Journal of Bifurcation and Chaos, vol. 8, No. 7 (1998).
Timmer, et al., "Characteristics of Hand Tremor Time Series," Biological Cybernetics, vol. 70, No. 1, pp. 75-80 (May 1993).
Timmer, et al., "Cross-Spectral Analysis of Tremor Time Series," International Journal of Bifurcation and Chaos, vol. 10, No. 11 pp. 2595-2610 (Nov. 2000); text available at http://www.fdmold.uni-freiburg.de/groups/timeseries/tremor/pubs/cs_review.pdf.
Timmer, et al., "Pathological Tremors: Deterministic Chaos or Nonlinear Stochastic Oscillators?" Chaos, vol. 10, No. 1 pp. 278-288 (Mar. 2000).
Timmer, et al., Cross-Spectral Analysis of Physiological Tremor and Muscle Activity: II Application to Synchronized Electromyogram, Biological Cybernetics, vol. 78 (Jun. 1998) (obtained from http://arxiv.org/abs/chao-dyn/9805012).
Titterton, et al., "Strapdown Inertial Navigation Technology," Peter Peregrinus Ltd., pp. 1-56 and pp. 292-321 (May 1997).
Toy Designers Use Technology in New Ways as Sector Matures, wsj.com, Dec. 17, 2001.
Traq 3D, "Healthcare,"http://www.traq3d.com/Healthcare/Healthcare.aspx (accessed on Jan. 21, 2010).
Ulanoff, Lance, "Nintendo's Wii is the Best Product Ever," PC Magazine, Jun. 21, 2007 (accessed at http://www.pcmag.com/print_article2/0,1217,a=210070,00.asp?hidPrint=true on Aug. 1, 2011).
UNC Computer Science Department, "News & Notes from Sitterson Hall," UNC Computer Science, Department Newsletter, Issue 24, Spring 1999 (Apr. 1999) (accessed at http://www.cs.unc.edu/NewsAndNotes/Issue24/ on Jun. 18, 2010).
Urban, "BAA 96-37 Proposer Information," DARPA/ETO (1996) (accessed at http://www.fbodaily.com/cbd/archive/1996/08(August)/19-Aug-1996/Aso1001.htm on Jul. 27, 2010).
US Dynamics Corp, "Spinning Mass Mechanical Gyroscopes," Aug. 2006.
US Dynamics Corp, "The Concept of 'Rate', (more particularly, angular rate pertaining to rate gyroscopes) (rate gyro explanation)," Aug. 2006.
US Dynamics Corp, "US Dynamics Model 475 Series Rate Gyroscope Technical Brief," Dec. 2005.
US Dynamics Corp, "US Dynamics Rate Gyroscope Interface Brief (rate gyro IO)" Aug. 2006.
Van Den Bogaard, Thesis, "Using linear filters for real-time smoothing of rotational data in virtual reality application," dated Aug. 2, 2004, available at http://www.science.uva.nl/research/ias/alumni/m.sc.theses/theses/RobvandenBogaarad.pdf.
Van Laerhoven et al., "Using an Autonomous Cube for Basic Navigation and Input," Proceedings of the 5th International Conference on Multimodal interfaces, Vancouver, British Columbia, Canada, pp. 203-210, Nov. 5-7, 2003.
Van Rheeden, et al., "Noise Effects on Centroid Tracker Aim Point Estimation," IEEE Trans. on Aerospace and Electronic Systems, vol. 24, No. 2, pp. 177-185 (Mar. 1988).
Vaz, et al., "An Adaptive Estimation of Periodic Signals Using a Fourier Linear Combiner," IEEE Transactions on Signal Processing, vol. 42, No. 1, pp. 1-10 (Jan. 1994).
Verplaetse, "Inertial-Optical Motion-Estimating Camera for Electronic Cinematography," Masters Thesis, MIT, Media Arts and Sciences (Jun. 1997).
Villoria, Gerald, "Hands on Roll-O-Rama Game Cube," Game Spot, http://www.gamespot.com/gamecube/action/rollorama/news.html?sid=2868421&com_act=convert&om_clk=newsfeatures&tag=newsfeatures;title;1&m, May 29, 2002 (accessed on Jul. 29, 2011).
Virtual Fishing, Operational Manual, 2 pages, Tiger Electronics, Inc. (1998).
Vorozcovs, et al., "The Hedgehog: A Novel Optical Tracking Method for Spatially Immersive Displays," MIT Presence, vol. 15, No. 1, pp. 108-121, Feb. 2006.
VTI, Mindflux-Vti CyberTouch, http://www.mindflux.com/au/products/vti/cybertouch.html (1996).
Wang, et al., "Tracking a Head-Mounted Display in a Room-Sized Environment with Head-Mounted Cameras," Paper presented at SPIE 1990 Technical Symposium on Optical Engineering and Photonics in Aerospace Sensing (Apr. 1990).
Ward, et al., "A Demonstrated Optical Tracker With Scalable Work Area for Head-Mounted Display Systems," Paper presented at 1992 Symposium on Interactive 3D Graphics (Mar. 1992).
Watt, Alan, 3D Computer Graphics, Chapter 1: "Mathematical fundamentals of computer graphics," 3rd ed. Addison-Wesley, pp. 1-26 (Dec. 2000).
Welch, "Hawkeye Zooms in on Mac Screens with Wireless Infrared Penlight Pointer," MacWeek, May 3, 1993 (excerpt of article accessed at http://www.accessmylibrary.com/article/print/1G1-13785387 on Jun. 18, 2010).
Welch, et al., "High-Performance Wide-Area Optical Tracking: The HiBall Tracking System," MIT Presence: Teleoperators & Virtual Environments (Feb. 2001).
Welch, et al., "SCAAT: Incremental Tracking with Incomplete Information," Paper presented at SIGGRAPH 97 Conference on Computer Graphics and Interactive Techniques (Aug. 1997), available at http://www.cs.unc.edu/~welch/media/pdf/scaat.pdf.
Welch, et al., "The HiBall Tracker: High-Performance Wide-Area Tracking for Virtual and Augmented Environments," Paper presented at 1999 Symposium on Virtual Reality Software and Technology in London, Dec. 20-22, 1999, available at http://www.cs.unc.edu/~welch/media/pdf/VRST99_HiBall.pdf.
Welch, et al., "Complementary Tracking and Two-Handed Interaction for Remote 3D Medical Consultation with a PDA," Paper presented at Trends and Issues in Tracking for Virtual Environments Workshop at IEEE Virtual Reality 2007 Conference (Mar. 2007), available at http://www.cs.unc.edu/~welch/media/pdf/Welch2007_TwoHanded.pdf.
Welch, et al., "Motion Tracking: No Silver Bullet, but a Respectable Arsenal," IEEE Computer Graphics and Applications, vol. 22, No. 6, pp. 24-38 (Nov./Dec. 2002), available at http://www.cs.unc.edu/~tracker/media/pdf/cga02_welch_tracking.pdf.
Welch, Hybrid Self-Tracker: An Inertial/Optical Hybrid Three-Dimensional Tracking System, University of North Carolina Chapel Hill Department of Computer Science, TR 95-048 (1995).
Widrow, et al., "Fundamental Relations Between the LMS Algorithm and the DFT," IEEE Transactions on Circuits and Systems, vol. CAS-34, No. 7 (Jul. 1987).
Wiley, M., "Nintendo Wavebird Review," Jun. 11, 2002, http://gear.ign.com/articles/361/361933p1.html (accessed on Aug. 1, 2011).
Williams, et al., "Physical Presence: Palettes in Virtual Spaces," Society of Photo-Optical Instrumentation Engineers (SPIE) Conference Series, vol. 3639, No. 374-384 (May 1999), available at http://www.fakespacelabs.com/papers/3639_46_LOCAL.pdf.
Williams, et al., "Implementation and Evaluation of a Haptic Playback System," vol. 3, No. 3, Haptics-e, May 2004.
Williams, et al., "The Virtual Haptic Back Project," presented at the IMAGE 2003 Conference, Scottsdale, Arizona, Jul. 14-18, 2003.
Wilson, "Wireless User Interface Devices for Connected Intelligent Environments," http://research.microsoft.com/en-us/um/people/awilson/publications/old/ubicomp%202003.pdf (Oct. 2003).
Wilson, "WorldCursor: Pointing in Intelligent Environments with the World Cursor," http://www.acm.org/uist/archive/adjunct/2003/pdf/demos/d4-wilson.pdf (2003).
Wilson, "XWand: UI for Intelligent Environments," http://research.microsoft.com/en-us/um/people/awilson/wand/default.htm, Apr. 2004.
Wilson, et al., "Demonstration of the Xwand Interface for Intelligent Spaces," UIST '02 Companion, pp. 37-38 (Oct. 2002).
Wilson, et al., "Gesture Recognition Using the Xwand," http://www.ri.cmu.edu/pub_files/pub4/wilson_daniel_h_2004_1/wilson_daniel_h_2004_1.pdf (Apr. 2004).

(56) References Cited

OTHER PUBLICATIONS

Wilson, et al., "Xwand: UI for Intelligent Spaces," Paper presented at CHI 2003 Conference, Ft. Lauderdale, FL, Apr. 5-10, 2003, available at http://research.microsoft.com/en-us/um/people/awilson/publications/WilsonCHI2003/CHI%202003%20XWand.pdf (2003).
Wired Glove, Wikipedia article, 4 pages, http://en.wikipedia.org/wiki/Wired_glove, Nov. 18, 2010.
Wormell, "Unified Camera, Content and Talent Tracking in Digital Television and Movie Production," Presented at NAB 2000, Las Vegas, NV, Apr. 8-13, 2000 (available for download at http://www.intersense.com/pages/44/116/) (2003).
Wormell, et al., "Advancements in 3D Interactive Devices for Virtual Environments," Presented at the Joint International Immersive Projection Technologies (IPT)/Eurographics Workshop on Virtual Environments (EGVE) 2003 Workshop, Zurich, Switzerland, May 22-23, 2003 (available for download at http://www.intersense.com/pages/44/123/) (2003).
Worringham, et al., "Directional Stimulus-Response Compatibility: A Test of Three Alternative Principles," Ergonomics, vol. 41, Issue 6, pp. 864-880 (Jun. 1998).
Yang, et al., "Implementation and Evaluation of 'Just Follow Me': An Immersive, VR-Based, Motion-Training System," MIT Presence: Teleoperators and Virtual Environments, vol. 11, No. 3, at 304-23 (MIT Press), Jun. 2002.
You, et al., "Hybrid Inertial and Vision Tracking for Augmented Reality Registration," http://graphics.usc.edu/cgit/pdf/papers/Vr1999.PDF (Mar. 1999).
You, et al., "Orientation Tracking for Outdoor Augmented Reality Registration," IEEE Computer Graphics and Applications, IEEE, vol. 19, No. 6, pp. 36-42 (Nov. 1999).
Youngblut, et al., "Review of Virtual Environment Interface Technology," Institute for Defense Analyses (Mar. 1996).
Yun, et al., "Recent Developments in Silicon Microaccelerometers," SENSORS, 9(10) University of California at Berkeley, Oct. 1992.
Zhai, "Human Performance in Six Degree of Freedom Input Control," Ph.D. Thesis, University of Toronto (1995).
Zhai, "User Performance in Relation to 3D Input Device Design," Computer Graphics 32(4), pp. 50-54, Nov. 1998; text downloaded from http://www.almaden.ibm.com/u/zhai/papers/siggraph/final.html on Aug. 1, 2011.
Zhou, et al., "A survey—Human Movement Tracking and Stroke Rehabilitation," Technical Report: CSM-420, ISSN 1744-8050, Dept. of Computer Sciences, University of Essex, UK, Dec. 8, 2004.
Zhu et al., "A Real-Time Articulated Human Motion Tracking Using Tri-Axis Inertial/Magnetic Sensors Package," IEEE Transactions on Neural Systems and Rehabilitation Engineering, vol. 12, No. 2, Jun. 2004.
Zowie Playsets, http://www.piernot.com/proj/zowie/ (accessed on Jul. 29, 2011).
Kirby Tilt 'n' Tumble (GCN-GBA Spaceworld 2001, You Tube Video, uploaded by adonfjv on Sep. 5, 2006 (accessed at http://www.youtube.com/watch?v=5rLhIwp2iGk on Sep. 7, 2011; video available upon request).
Resnick, et al., "Digital Manipulatives: New Toys to Think With," Chi 98; Apr. 1998; pp. 281-287.
Mattern, "State of the Art and Future Trends in Distributed Systems and Ubiquitous Computing", published on or before Aug. 31, 2000 and printed from URL < http://www.vs.inf.ethz.ch/publ/papers/DisSysUbiComp Report.pdf >, 14 pages.

* cited by examiner

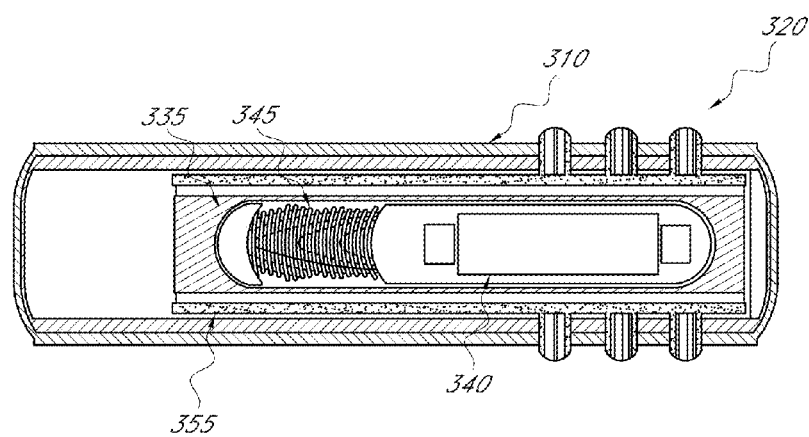
FIG. 17C
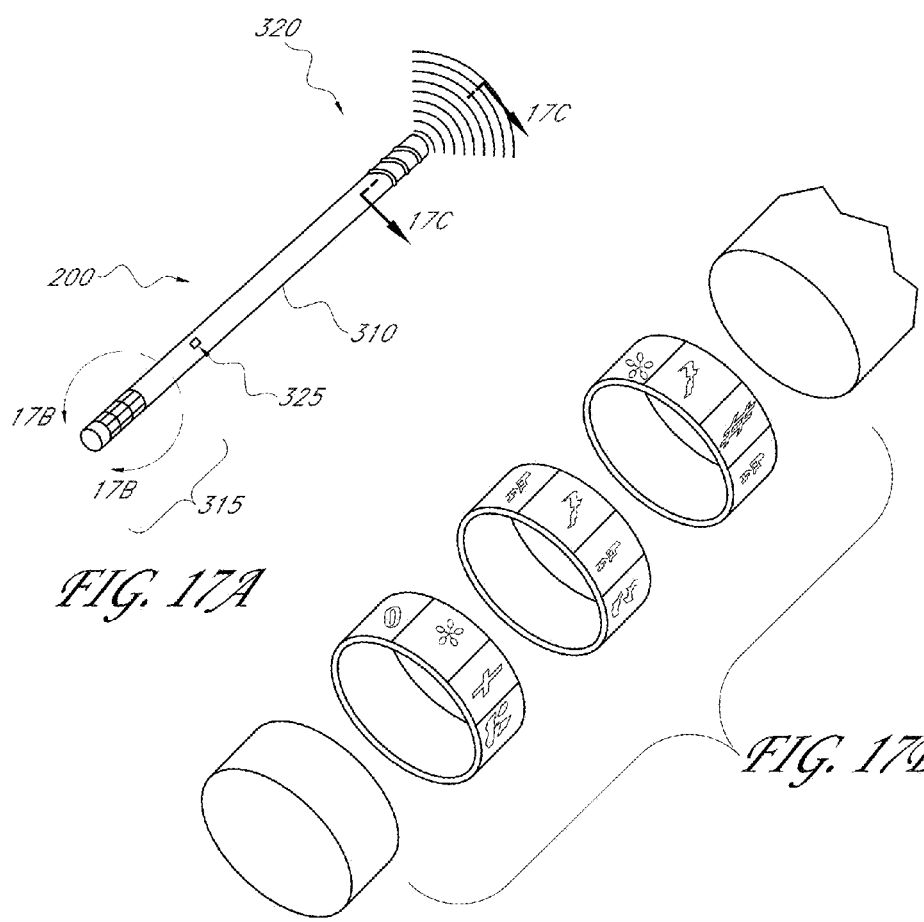
FIG. 17A
FIG. 17B

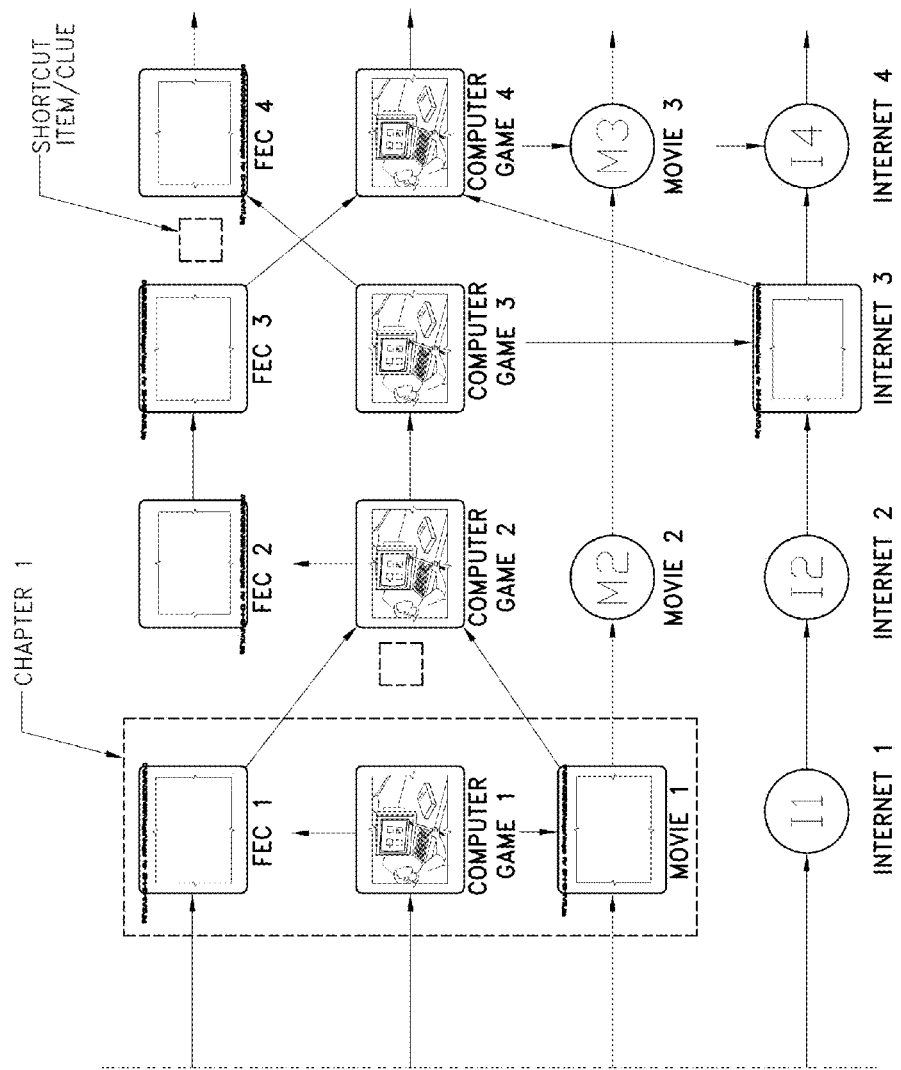

MULTI-PLATFORM GAMING SYSTEM USING RFID-TAGGED TOYS

RELATED APPLICATIONS

This application is a continuation of and claims priority benefit under 35 U.S.C. §120 from U.S. patent application Ser. No. 13/440,812, filed Apr. 5, 2012, now U.S. Pat. No. 8,702,515, issued Apr. 22, 2014, which is a divisional of U.S. patent application Ser. No. 13/209,087, filed Aug. 12, 2011, which is a continuation of and claims priority benefit under 35 U.S.C. §120 from U.S. patent application Ser. No. 11/507,934, filed Aug. 22, 2006, which is a continuation-in-part of and claims priority benefit under 35 U.S.C. §120 from U.S. patent application Ser. No. 11/183,592, filed Jul. 18, 2005, now U.S. Pat. No. 8,608,535, issued Dec. 17, 2013, which is a continuation of and claims benefit of priority under 35 U.S.C. §120 of U.S. patent application Ser. No. 10/410,583, filed Apr. 7, 2003, now U.S. Pat. No. 6,967,566, issued Nov. 22, 2005, which claims priority under 35 U.S.C. §119(e) to U.S. Provisional Application No. 60/370,568, filed Apr. 5, 2002, each of which is hereby incorporated herein by reference in its entirety and is to be considered a part of this specification.

BACKGROUND OF THE INVENTION

Field of the Invention

Embodiments of the present invention relate to providing a retail product to a consumer and, in particular, to methods for providing a retail product for interfacing with interactive devices in one or more venues.

Description of the Related Art

Games, play structures and other similar entertainment systems are well known for providing play and interaction among children and adults. A wide variety of commercially available play toys and games are also known for providing valuable learning and entertainment opportunities for children, such as role playing, reading, memory stimulation, tactile coordination and the like.

However, there is always a demand for more exciting and entertaining games and toys that increase the learning and entertainment opportunities for children and stimulate creativity and imagination.

SUMMARY OF THE INVENTION

The present invention provides a unique system and method of multi-media game play carried out utilizing an interactive "wand" and/or other tracking/actuation device to allow play participants to electronically and "magically" interact with their surrounding play environment(s). The play environment may either be real or imaginary (i.e. computer/TV generated), and either local or remote, as desired. Optionally, multiple play participants, each provided with a suitable "wand" and/or tracking device, may play and interact together, either within or outside one or more play environments, to achieve desired goals or produce desired effects within the play environment.

In accordance with one embodiment the present invention provides an interactive play system and wand toy for enabling a trained user to electronically send and receive information to and from other wand toys and/or to and from various transceivers distributed throughout a play facility and/or connected to a master control system. The toy wand or other seemingly magical object is configured to use a send/receive radio frequency communication (SRRF) protocol which provides a basic foundation for a complex, interactive entertainment system to create a seemingly magic interactive play experience for play participants who possess and learn to use the magical wand toy.

In accordance with another embodiment the present invention provides an interactive play structure in the theme of a "magic" training center for would-be wizards in accordance with the popular characters and storylines of the children's' book series "Harry Potter" by J. K. Rowling. Within the play structure, play participants learn to use a "magic wand" and/or other tracking/actuation device. The wand allows play participants to electronically and "magically" interact with their surrounding play environment simply by pointing or using their wands in a particular manner to achieve desired goals or produce desired effects within the play environment. Various receivers or transceivers are distributed throughout the play structure to facilitate such interaction via wireless communications.

In accordance with another embodiment the present invention provides a wand actuator device for actuating various interactive play effects within a radio frequency identification (RFID) compatible play environment. In certain embodiments, the wand comprises an elongated hollow pipe or tube having a proximal end or handle portion and a distal end or transmitting portion. An internal cavity may be provided to receive one or more batteries to power optional lighting, laser or sound effects and/or to power long-range transmissions such as via an infrared light emitting diode (LED) transmitter device or RF transmitter device. The distal end of the wand is fitted with an RFID transponder that is operable to provide relatively short-range radio frequency (RF) communications (for example, less than 60 centimeters) with one or more receivers or transceivers distributed throughout a play environment. The handle portion of the wand is fitted with optional combination wheels having various symbols and/or images thereon which may be rotated to produce a desired pattern of symbols required to operate the wand or achieve one or more special effects.

In accordance with another embodiment the present invention provides an RFID card or badge intended to be affixed or adhered to the front of a shirt or blouse worn by a play participant while visiting an RF equipped play facility. The badge comprises a paper, cardboard or plastic substrate having a front side and a back side. The front side may be imprinted with graphics, photos, or any other information desired. The front side may include any number of other designs or information pertinent to its application. The obverse side of the badge contains certain electronics comprising a radio frequency tag pre-programmed with a unique person identifier number (UPIN). The UPIN may be used to identify and track individual play participants within the play facility. Optionally, each tag may also include a unique group identifier number (UGIN) which may be used to match a defined group of individuals having a predetermined relationship.

In accordance with another embodiment the present invention provides an electronic treasure hunt game. Game participants receive a card, map and/or identification badge configured with an RFID tag, bar-code or a magnetic "swipe" strip or the like. The RFID tag or other identifying device is used to store certain information identifying each play participant and/or describing certain powers or abilities possessed by of an imaginary role-play character that the card represents. Players advance in the game by finding clues and solving various puzzles presented. Players may also gain (or lose) certain attributes, such as magic skills, magic strength, fighting ability, various spell-casting abilities, etc. All of this information is preferably stored on the RFID tag or card so that the character attributes may be easily and conveniently transported to other similarly-equipped play facilities, computer games, video games, home game consoles, hand-held game units, and the like. In this manner, an imaginary role-play character is created and stored on a card that is able to seamlessly transcend from one play medium to the next.

Certain embodiments of the invention include a method of providing a retail product to a consumer. The method comprises: (i) providing a first interactive device in a first venue, the first interactive device being capable of producing a first sensory response: (ii) providing a second interactive device in a second venue, the second interactive device being capable of producing a second sensory response, wherein the second venue differs from the first venue; (iii) providing to a consumer a retail product capable of interfacing in the first venue with the first interactive device to cause the first sensory response and in the second venue with the second interactive device to cause the second sensory response, the retail product further comprising an intrinsic value that is independent of a use of the retail product by the consumer in the first or second venues; and (iv) tracking the use of the retail product by the consumer in the first or second venues. For example, the retail product may comprise at least one of a toy, apparel and a collector's item, and/or the first venue may comprise at least one of an entertainment or leisure facility, a restaurant, and a hotel.

Certain embodiments of the invention also include another method for providing interactive entertainment. The method comprises: (i) providing a first interactive device in a first venue, the first interactive device configured to produce a first sensory response; (ii) providing a second interactive device in a second venue, the second interactive device configured to produce a second sensory response, wherein the second venue differs from the first venue; (iii) providing to a consumer a retail product configured to generate a first wireless signal to interface in the first venue with the first interactive device to cause the first sensory response, the retail product being further configured to generate a second wireless signal in the second venue with the second interactive device to cause the second sensory response; and (iv) tracking the use of the retail product by the consumer in the first or second venues. In certain embodiments, the first and/or second wireless signal may comprise an RF signal, an infrared signal, a laser, combinations of the same or the like.

In certain embodiments, a method is disclosed for providing an interactive toy to a consumer for use in a variety of different environments. The method comprises: (i) providing an interactive toy to a consumer, wherein the interactive toy comprises a stand-alone value independent of a use of the interactive toy with other objects; (ii) providing a first reader device in a first entertainment facility, the first reader device being capable of electrically interfacing with the interactive toy to produce a first sensory response; (iii) providing a second reader device in a second facility, the second reader device being capable of electrically interfacing with the interactive toy to produce a second sensory response, wherein the second facility is distinct from the first entertainment facility; and (iv) electronically tracking the use of the interactive toy in at least one of the first entertainment facility and the second facility.

In certain embodiments, another method is disclosed for providing interactive entertainment. The method includes: (i) providing an interactive toy to a consumer; (ii) providing a first reader device in a first entertainment facility, the first reader device configured to electrically interface with the interactive toy to produce a first sensory response; (iii) providing a second reader device in a second facility, the second reader device configured to electrically interface with the interactive toy to produce a second sensory response, wherein the second facility is distinct from the first entertainment facility; and (iv) electronically tracking the use of the interactive toy in at least one of the first entertainment facility and the second facility.

In certain embodiments, a method is disclosed for marketing a retail product to a consumer. The method includes: (i) providing at least one interactive device in a venue, the at least one interactive device configured to produce at least one effect; (ii) providing to a consumer a retail product capable of wirelessly interfacing in the venue with the at least one interactive device to trigger the at least one effect, the retail product comprising an intrinsic value that is independent of a use of the retail product by the consumer in the venue; (iii) allowing the consumer to use the retail product in the venue for a period of time; and (iv) offering for sale, after the period of time, the retail product to the consumer.

In yet other embodiments of the invention, a method is disclosed for marketing a retail product to a consumer. The method comprises: (i) providing at least one interactive device in a venue, the at least one interactive device configured to produce at least one effect; (ii) providing to a consumer a retail product configured to generate a wireless signal to interface in the venue with the at least one interactive device to trigger the at least one effect, the retail product comprising an intrinsic value that is independent of a use of the retail product by the consumer in the venue; (iii) allowing the consumer to use the retail product in the venue for a period of time; and (iv) offering for sale, after the period of time, the retail product to the consumer.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which:

FIG. 17A is a perspective view of a magic wand toy for use with an interactive adventure game having features and advantages in accordance with the present invention;

FIG. 17B is a partially exploded detail view of the proximal end or handle portion of the magic wand toy of FIG. 17A, illustrating the optional provision of combination wheels having features and advantages in accordance with the present invention;

FIG. 17C is a partial cross-section detail view of the distal end or transmitting portion of the magic wand toy of FIG. 17A, illustrating the provision of an RF transponder device therein;

FIG. 23, which includes FIGS. 23A and 23B, is a schematic block diagram illustrating how an interactive adventure game in accordance with the present invention can be implemented simultaneously and seamlessly within multiple play environments and entertainment mediums;

DETAILED DESCRIPTION OF THE PREFERRED EMBODIMENTS

Basic Game Play

In one preferred embodiment the invention provides a system and method of multi-media game play carried out using one or more interactive "wands" and/or other tracking/actuation devices which allow play participants to electronically and "magically" interact with their surrounding play environment(s). The play environment may either be real or imaginary (i.e. computer/TV generated), and either local or remote, as desired. Optionally, multiple play participants, each provided with a suitable "wand" and/or tracking device, may play and interact together, either within or outside one or more play environments, to achieve desired goals or produce desired effects within the play environment.

For example, the invention may be carried out as an electronic treasure hunt game. Game participants receive a card, map and/or identification badge configured with an RFID tag, bar-code or a magnetic "swipe" strip or the like. The RFID tag or other identifying device is used to store certain information identifying each play participant and/or describing certain powers or abilities possessed by of an imaginary role-play character that the card represents. Players advance in the game by finding clues and solving various puzzles presented. Players may also gain (or lose) certain attributes, such as magic skills, magic strength, fighting ability, various spell-casting abilities, etc. All relevant game information is preferably stored (or addressably identified) on the RFID tag or card so that the character attributes may be easily and conveniently transported to other similarly-equipped play facilities, computer games, video games, home game consoles, hand-held game units, and the like. In this manner, the game is able to seamlessly transcend from one play or entertainment medium the next.

Figure 1:
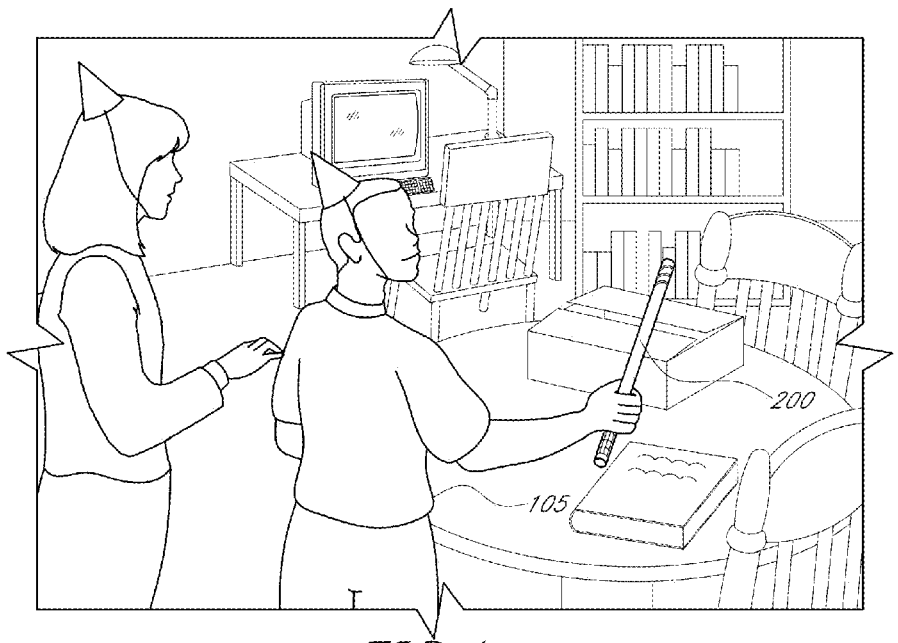
FIG. 1 is a perspective view of a play participant holding an interactive wand for playing an interactive adventure game in accordance the present invention.

FIG. 1 illustrates one embodiment of an interactive treasure hunt game having features and advantages of the present invention. The particular game illustrated takes on the theme of the popular characters and storylines of the children's' book series "Harry Potter" by J. K. Rowling. Within the game, play participants 105 learn to use a "magic wand" 200 and/or other tracking/actuation device. The wand 200 (described in more detail later) allows play participants to electronically and "magically" interact with their surrounding play environment simply by pointing or using their wands in a particular manner to achieve desired goals or produce desired effects within the play environment. FIG. 1 shows a play participant 105 receiving a wand 200 and game directions as a gift, for example. In yet other embodiments, and as described in more detail below, the play participant 105 may purchase the wand 200, and/or the wand 200 may be loaned, rented, or otherwise provided to the play participant 105.

Figure 2:
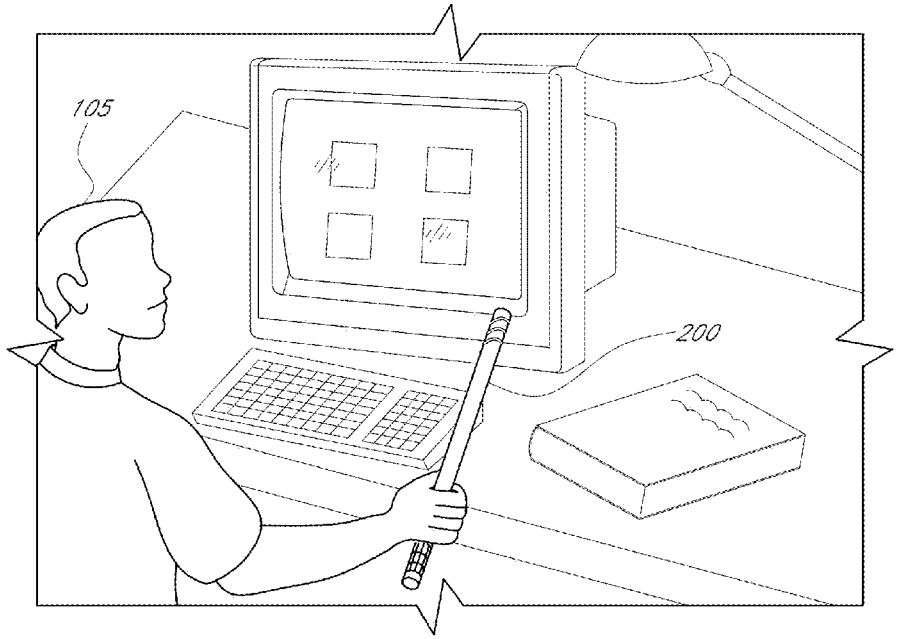
FIG. 2 is a perspective view of a play participant learning to use the interactive wand of FIG. 1 using a computer game and a training manual.

Once the play participant becomes generally familiar with the wand 200 and the game, he or she can preferably access a web site through the world wide web in order to register the wand and play the first interactive treasure hunt game (see, e.g., FIG. 2). Preferably this is a relatively simple game intended to provide a basic training session. In this on-line game session, the player learns how to use the wand to cast spells, levitate objects, open and close doors, etc. within an interactive computer-gaming environment provided by an ordinary home computer 110. The player also learns how to discover important clues needed to advance in the game and to solve various puzzles or challenges presented by the game.

Figure 3:
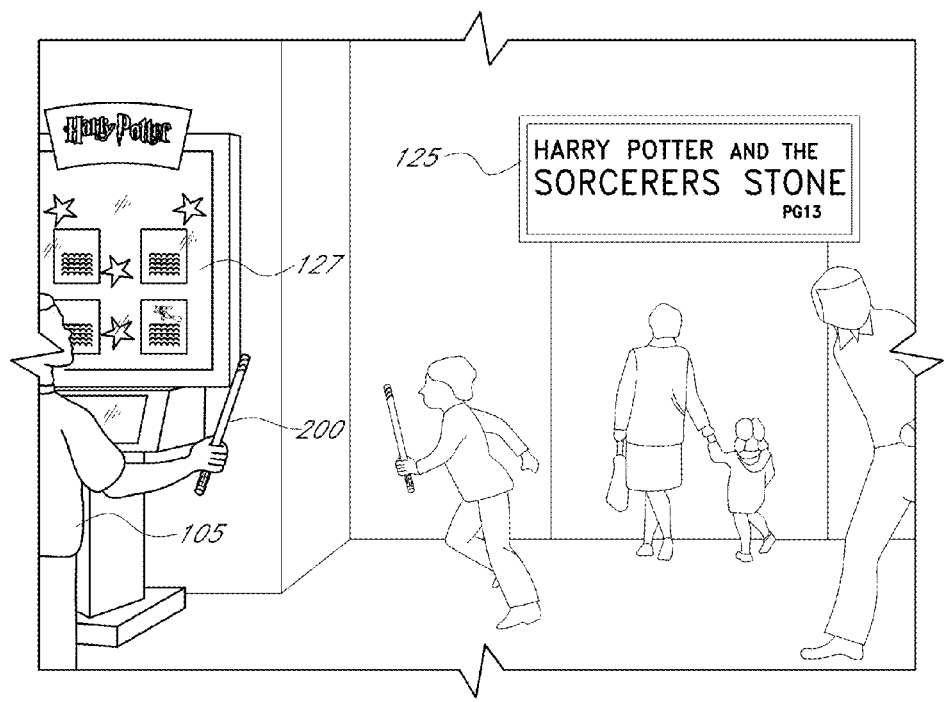
FIG. 3 is a perspective view of an adventure game center provided within a movie theatre configured to facilitate interactive game play in accordance with the present invention.
Figure 4:
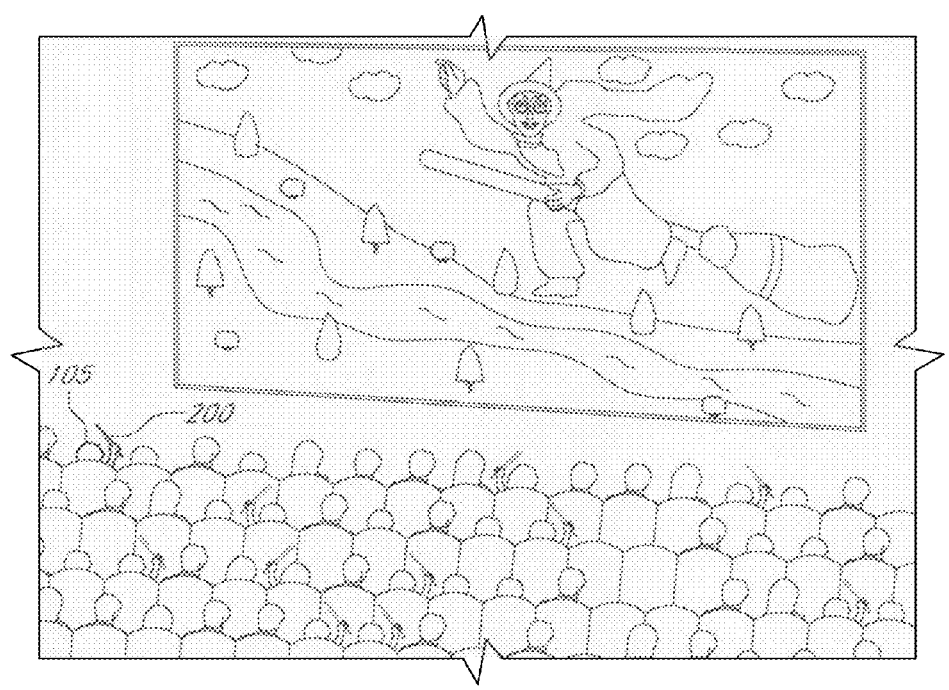
FIG. 4 is a perspective view illustrating how play participants can use the wand of FIG. 1 to create an interactive experience within a movie theatre.

Once the play participant 105 has mastered the basic game and successfully completed the various training sessions, he or she is ready to join other players in a world-wide multi-media gaming adventure. The adventure may begin with a new movie release. For example, FIG. 3 illustrates play participants entering a movie theater to enjoy a newly released Harry Potter movie. Preferably, play participants 105 take their wands 200 into one or more movie venues 125 in order to score points, learn clues and advance in the game. For example, a special check-in booth 127 may be provided within the movie venue for allowing play participants to use their wands 200 to receive clues, special powers and/or points. While watching the movie (see, e.g., FIG. 4), the movie storyline itself may reveal additional clues that will help carefully observant players to advance in the game later. Various clues may also be hidden within otherwise unnoticeable backgrounds, scenery, characters, movie credits, etc. Thus, play participants may need to view a movie multiple times to glean all of the available clues needed to complete the game. Optionally, at certain points in the movie play participants may be able to use their wands 200 or other similar devices to help direct the story-line progression, change to alternate plots, endings, etc. This may be conveniently achieved using any one or more suitable RFID communications protocols and interactive digital DVD technologies (described in more detail later).

Figure 5:
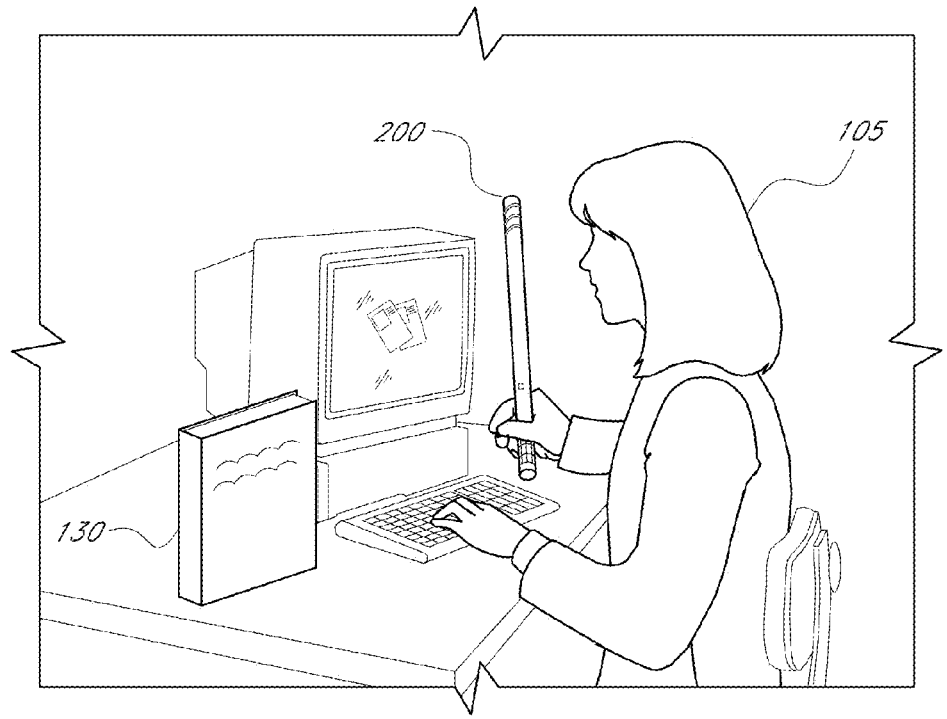
FIG. 5 is a perspective view of a play participant playing an interactive adventure game using a computer and the wand device of FIG. 1.
Figure 7:
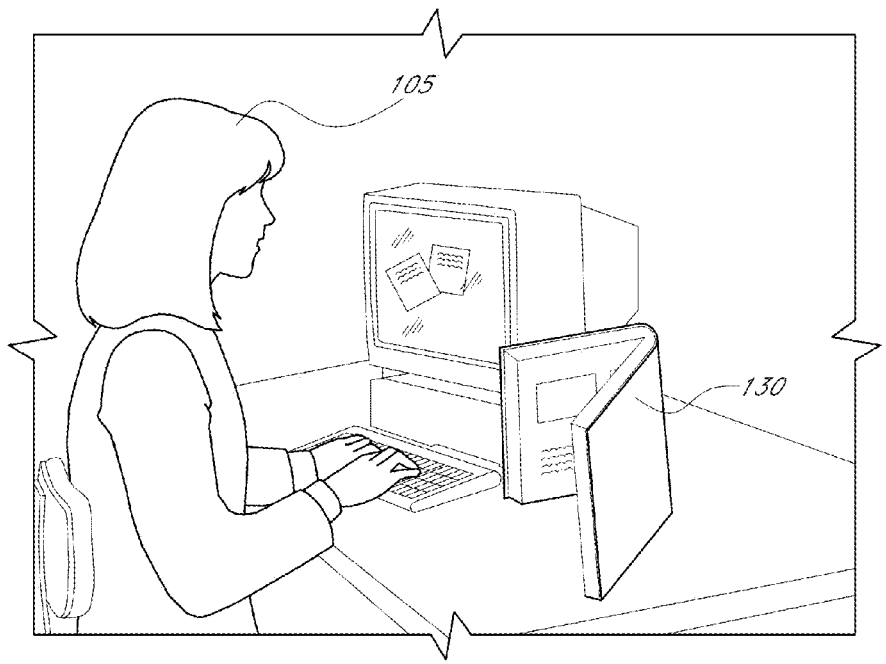
FIG. 7 is a perspective view of a play participant playing an interactive adventure game in accordance with the present invention, and illustrating the use of an extrinsic clue or information source.

Back at home, play participants 105 may use their wand 200 to continue playing the adventure game within one or more available on-line gaming environments (see, e.g., FIG. 5). Various books 130, aids, instructions and other similar materials may be provided to help play participants complete the adventure, while preferably learning valuable knowledge and skills. For example, part of the game play may require play participants to conduct independent research in a particular area or to become proficient in a chosen skill to advance in the game (e.g., FIG. 7).

Figure 6:
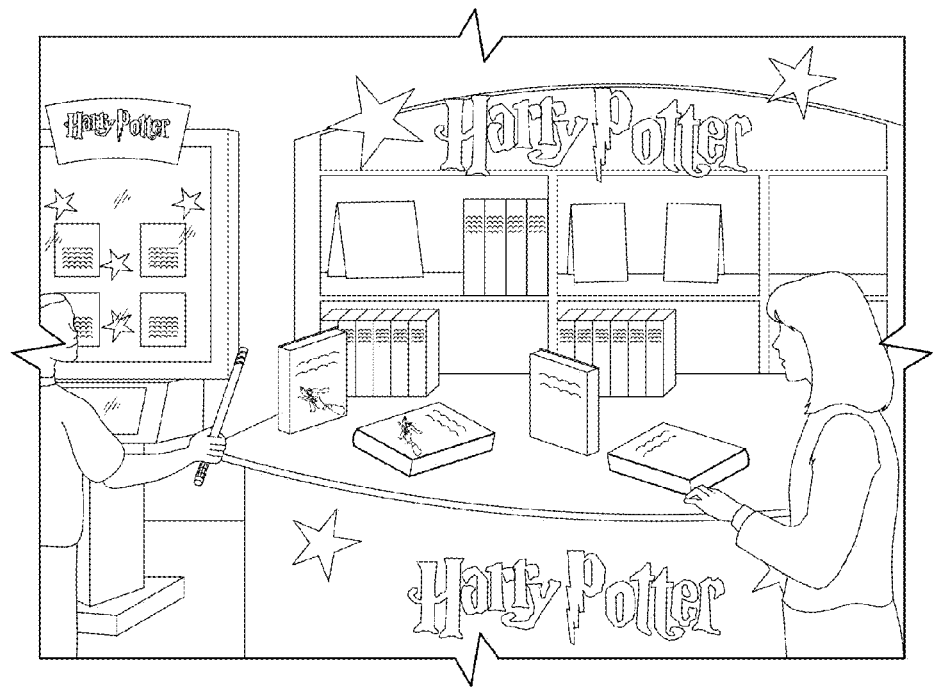
FIG. 6 is a perspective view of an interactive adventure game center having features of the present invention.
Figure 8:
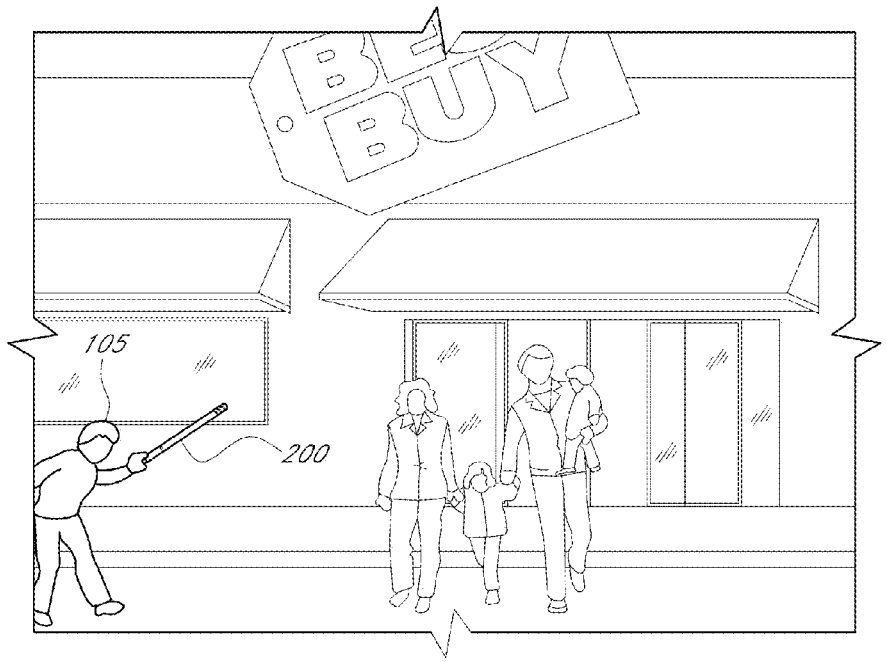
FIG. 8 is a perspective view of a retail store facility having an interactive adventure game center in accordance with the present invention.
Figure 9:
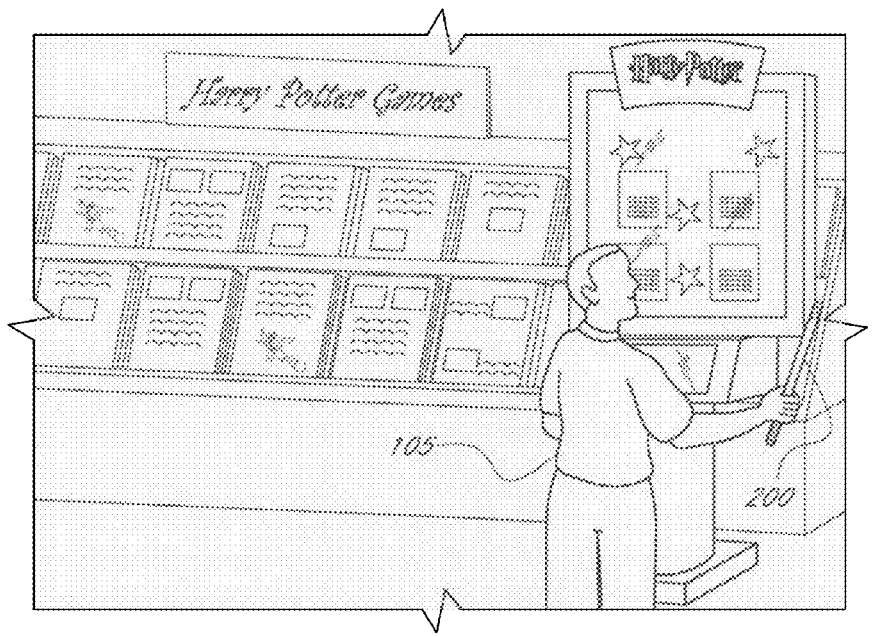
FIG. 9 is a perspective view of an alternative embodiment of an interactive adventure game center provided within the retail store of FIG. 8 and having features of the present invention.
Figure 10:
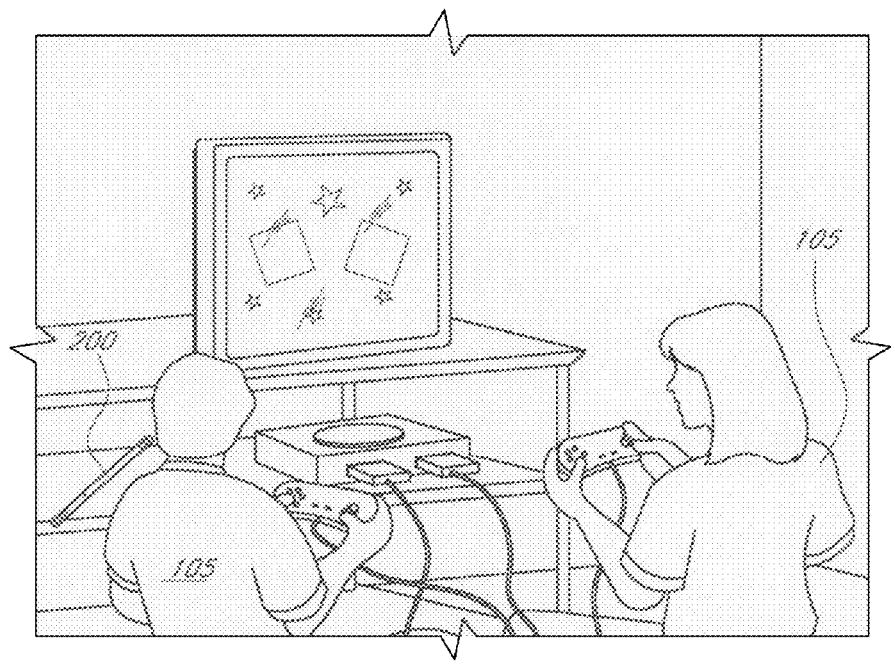
FIG. 10 is a perspective view of an interactive adventure game carried out using a computer game console and one or more wand devices.
Figure 11:
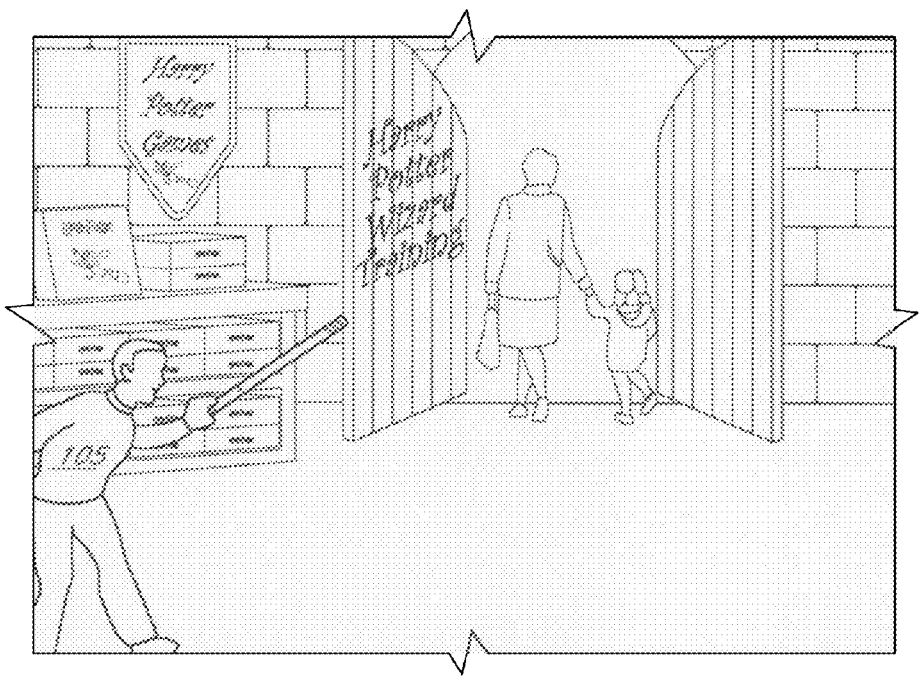
FIG. 11 is a perspective view of another alternative embodiment of an interactive adventure game center or play structure such as may be provided within a family entertainment center or theme park.
Figure 12:
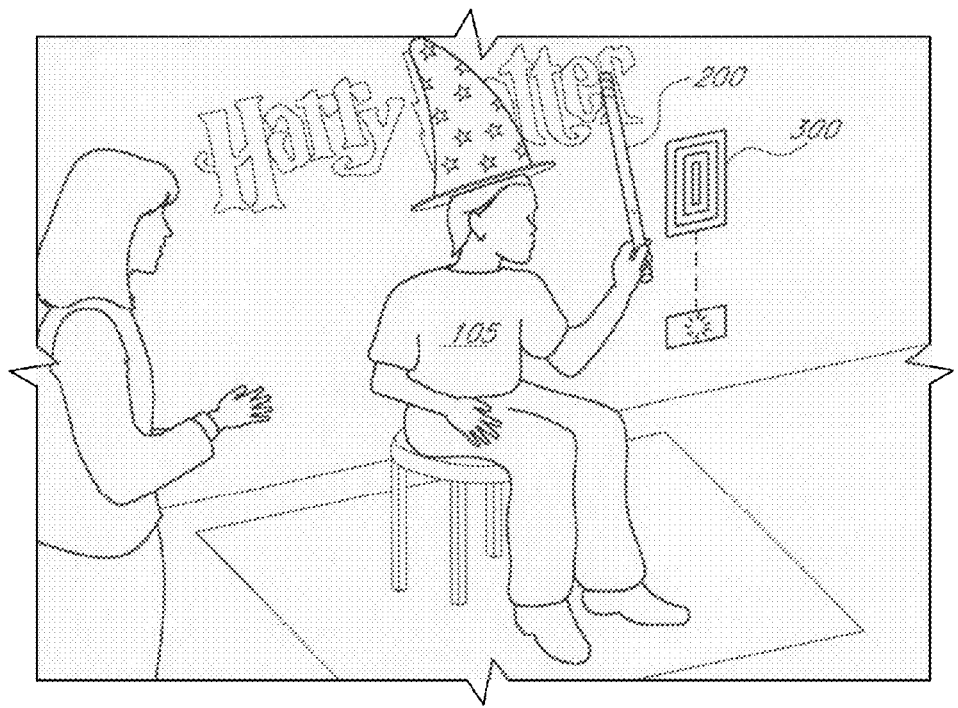
FIG. 12 is a perspective view of a play participant within an interactive adventure game center casting "magical" spells using the wand device of FIG. 1.
Figure 13:
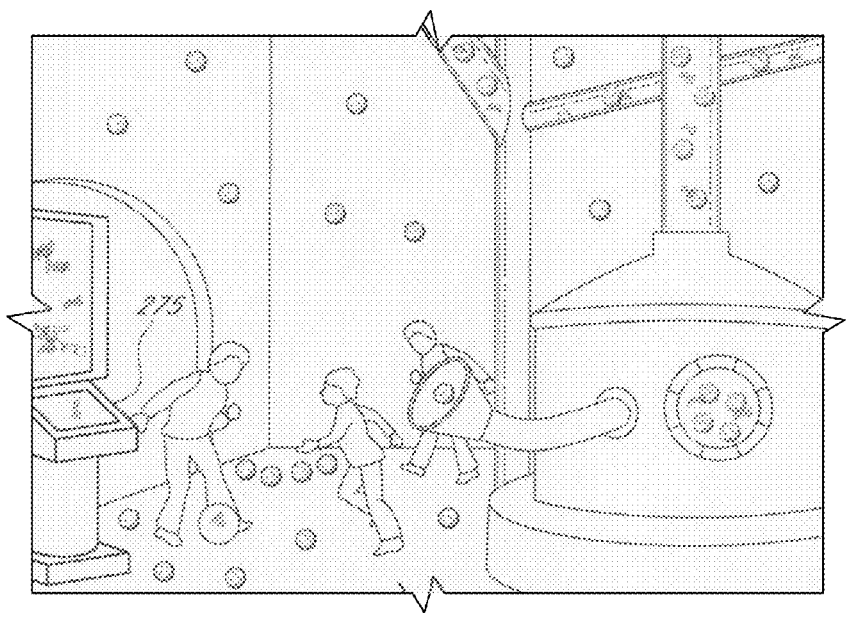
FIG. 13 is an alternative perspective view of the interactive adventure game center of FIG. 11.

The game continues within various participating retail environments. Thus, for example, FIG. 6 illustrates a local Harry Potter game adventure center created within a local book store, toy store, restaurant, or the like (e.g., FIG. 8). The game center preferably provides additional clues, assistance and/or opportunities for social interaction, information sharing and/or strategic cooperation among multiple game players. In a particularly preferred embodiment, cooperation among multiple play participants is required to allow cooperating players to advance in the game. The game center also preferably provides a distribution center for related products such as computer games, video games, wands 200 and the like (e.g. FIG. 9, 10). Purchased video games may be played at home (e.g., FIG. 10) using conventional game controllers and/or a specially configured controller (not shown) adapted to communicate wirelessly with wand 200 or a similar device.

Figure 23A:
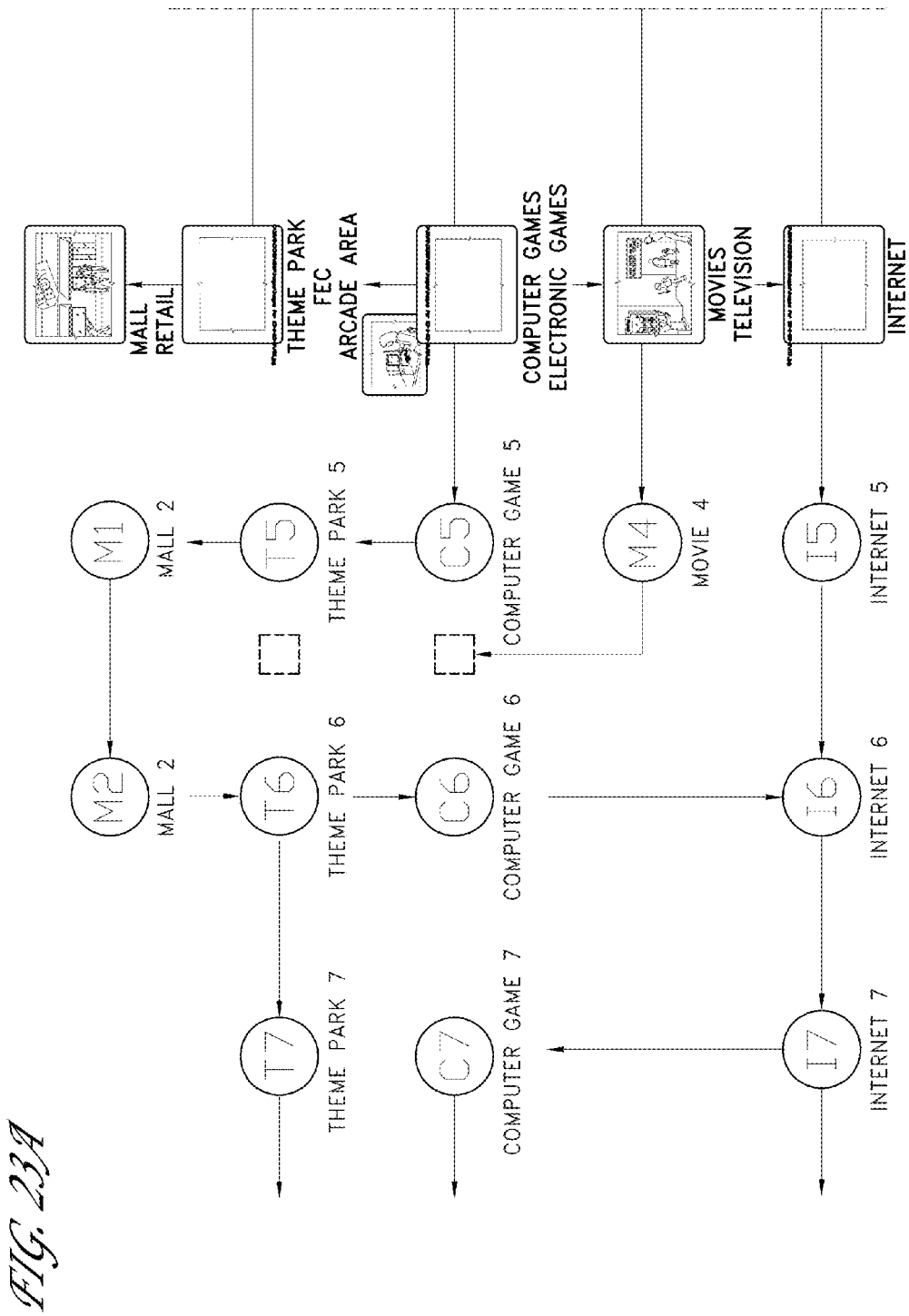

Advantageously, in this manner the game is able to transcend seamlessly from one entertainment medium to another using the wand 200 or other similar RFID-capable device as a means to store, transport and communicate character development and game progress between different entertainment mediums and play environments. Thus, game play preferably extends from the home, to television, to internet, to theatre, and/or to one or more local family entertainment centers ("FEC"), games centers, family restaurants, and the like (see, e.g., FIG. 23). For example, FIGS. 11-15 illustrate an entertainment center configured for interactive game play in accordance with the present invention. The particular entertainment center 250 illustrated takes on the theme of a "magic" training center for would-be wizards in accordance with the popular characters and storylines of the children's' book series "Harry Potter" by J. K. Rowling.

Within this family entertainment center 250, play participants 105 learn to use their magic wands 200 and/or other tracking/actuation devices. The wand 200 preferably allows play participants to electronically and "magically" interact with their surrounding play environment simply by pointing or using their wands in a particular manner to achieve desired goals or produce desired effects within the play environment. For example, various wireless receivers or transceivers 300 may be distributed throughout the play center 250 to facilitate such interaction via wireless communications. Depending upon the degree of game complexity desired and the amount of information sharing required, the transceivers 300 may or may not be connected to a master system or central server (not shown). Preferably, most, if not all, of the receivers or transceivers 300 are stand-alone devices that do not require communications with an external server or network. In one particularly preferred embodiment this may be achieved by storing any information required to be shared on the wand 200 and/or on an associated radio frequency tracking card or badge worn or carried by the play participant (described later).

If desired, a suitable play media, such as foam or rubber balls or similar objects, may be provided for use throughout the play center to provide convenient objects for clue sources, tools, trading currency and/or tactile interactive play. For example, thousands of soft foam balls may be provided as an interactive play medium (e.g., FIG. 13). These may be manipulated by play participants using various interactive play elements to create desired effects. Balls may range in size from approximately 1" to 12" in diameter or larger, as desired, and are preferable about 2½" in diameter. Preferably, the objects are not so small as to present a choking hazard for young children. The majority of the objects may be the same size, or a mixture of sizes may be utilized, as desired. Certain play elements within the play center may require the use of certain objects in order to complete a required task. For example, various play objects may be identified using one or more embedded or affixed RFID tags which may be electronically read by the various game consoles 275 within the play center 250.

Other suitable play media may include, without limitation, foam, plastic or rubber balls and similarly formed articles such as cubes, plates, discs, tubes, cones, rubber or foam bullets/arrows, the present invention not being limited to any particular preferred play media. These may be used alone or in combination with one another. For instance, flying discs, such as Frisbees™, may be flung from one location within the play center 250 while other play participants shoot at the discs using foam balls or suction-cup arrows. Wet or semi-wet play mediums, such as slime-like materials, snow, mud, squirt guns and/or water balloons may also be used, as desired, to cool and entertain play participants. Durable plastic or rubber play media are preferable in an outdoor play structure where environmental exposure may prematurely destroy or degrade the quality of certain play mediums such as foam balls. The particular play media used is not particularly important for purposes of carrying out the invention and, optionally, may be omitted altogether, if desired.

Figure 14:
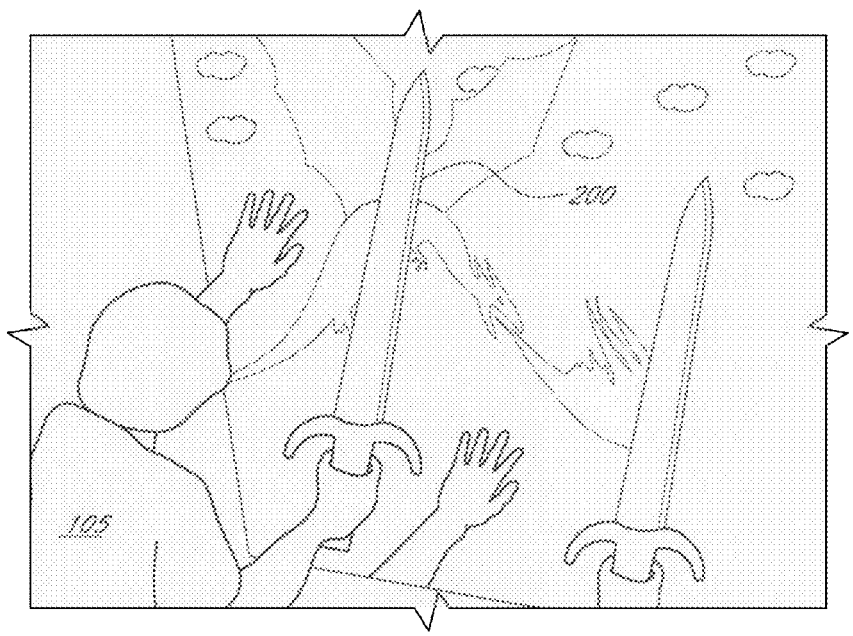
FIG. 14 is a perspective view of an RFID-enabled interactive game device or console having features of the present invention.
Figure 15:
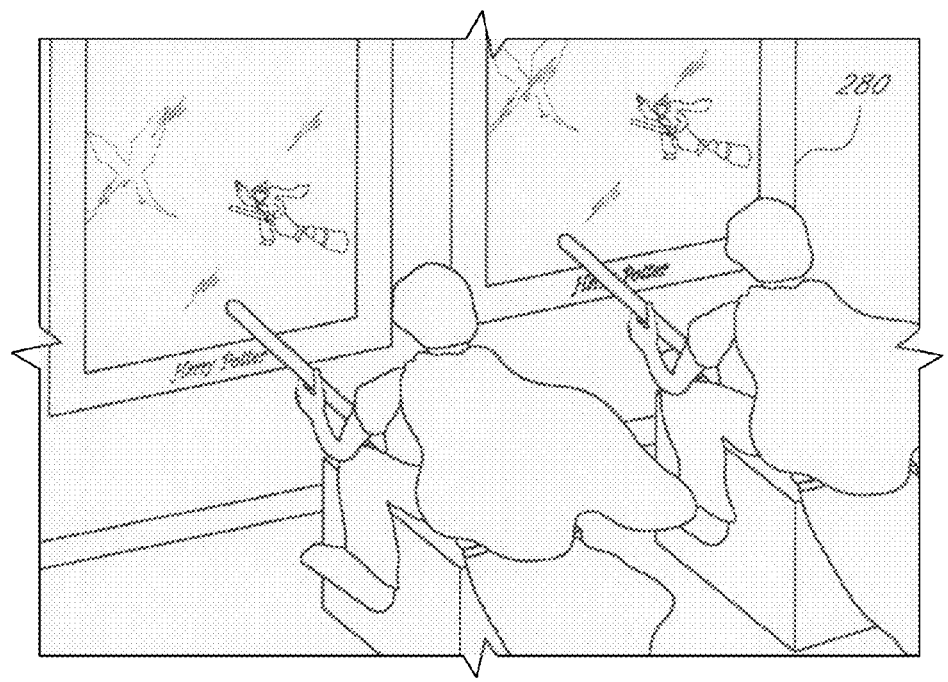
FIG. 15 is a perspective view of an RFID-enabled interactive game device, ride or console having features of the present invention.

Various interactive play elements and games 275, 280 are preferably provided within the play center 250 to allow play participants 105 to create desired "magical" effects, as illustrated in FIGS. 14 and 15. These may include interactive elements such as video games, coin-operated rides, and the like. These may be actuated manually by play participants or, more desirably, "magically" electronically by appropriately using the wand 200 in conjunction with one or more transceivers 300. Some interactive play elements may have simple immediate effects, while others may have complex and/or delayed effects. Some play elements may produce local effects while others may produce remote effects. Each play participant 105, or sometimes a group of play participants working together, preferably must experiment with the various play elements and using their magic wands in order to discover how to create the desired effect(s). Once one play participant figures it out, he or she can use the resulting play effect to surprise and entertain other play participants. Yet other play participants will observe the activity and will attempt to also figure it out in order to turn the tables on the next group. Repeated play on a particular play element can increase the participants' skills in accurately using the wand 200 to produce desired effects or increasing the size or range of such effects. Optionally, play participants can compete with one another using the various play elements to see which participant or group of participants can create bigger, longer, more accurate or more spectacular effects.

Figure 16:
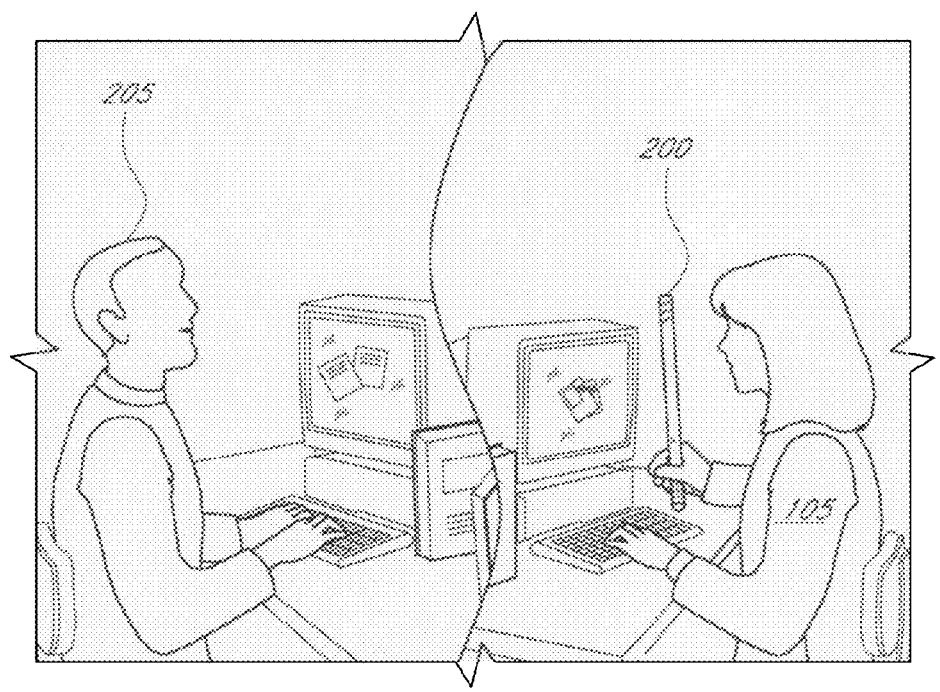
FIG. 16 is a perspective view of two play participants playing an interactive game using multiple computers communicating via the internet.

While several particularly preferred play environments have been described, it will be readily apparent to those skilled in the art that a wide variety of other possible play environments and other entertainment mediums may be used to carry out the invention. Alternatively, a suitable play environment may comprise a simple themed play area, or even a multi-purpose area such as a restaurant dining facility, family room, bedroom or the like. Internet (e.g., FIG. 16), video games, computer games, television, movies and radio can also be used to provide all or part of the overall game experience in accordance with the present invention.

Magic Wand

As indicated above, play participants 105 learn to use a "magic wand" 200 and/or other tracking/actuation device. The wand 200 preferably allows play participants to electronically and "magically" interact with their surrounding play environment simply by pointing or using their wands in a particular manner to achieve desired goals or produce desired effects within the play environment. Use of the wand 200 may be as simple as touching it to a particular surface or "magical" item within a suitably configured play environment or it may be as complex as shaking or twisting the wand a predetermined number of times in a particular manner and/or pointing it accurately at a certain target desired to be "magically" transformed or otherwise affected. As play participants play and interact within each play environment they learn more about the "magical" powers possessed by the wand 200 and become more adept at using the wand to achieve desired goals or desired play effects. Optionally, play participants may collect points or earn additional magic levels or ranks for each play effect or task they successfully achieve. In this manner, play participants 105 may compete with one another to see who can score more points and/or achieve the highest magic level.

FIG. 17 illustrates the basic construction of one preferred embodiment of a "magic" wand 200 having features and advantages in accordance with one preferred embodiment of the invention. As illustrated in FIG. 17A the wand 200 basically comprises an elongated hollow pipe or tube 310 having a proximal end or handle portion 315 and a distal end or transmitting portion 320. If desired, an internal cavity may be provided to receive one or more batteries to power optional lighting, laser or sound effects and/or to power longer-range transmissions such as via an infrared LED transmitter device or RF transmitter device. An optional button 325 may also be provided, if desired, to enable particular desired functions, such as sound or lighting effects or longer-range transmissions.

FIG. 17B is a partially exploded detail view of the proximal end 315 of the magic wand toy 200 of FIG. 17A. As illustrated, the handle portion 315 is fitted with optional combination wheels having various symbols and/or images thereon. Preferably, certain wand functions may require that these wheels be rotated to produce a predetermined pattern of symbols such as three owls, or an owl, a broom and a moon symbol. Those skilled in the art will readily appreciate that the combination wheels may be configured to actuate electrical contacts and/or other circuitry within the wand 200 in order to provide the desired functionality. Alternatively, the combination wheels may provide a simple security measure to prevent unauthorized users from actuating the wand. Alternatively, the wheels may provide a simple encoder/decoder mechanism for encoding, decoding, interpreting and/or transforming secret codes or passwords used during game play.

FIG. 17C is a partial cross-section detail view of the distal end of magic wand toy 200 of FIG. 17A. As illustrated, the distal end 320 is fitted with an RFID (radio frequency identification device) transponder 335 that is operable to provide relatively short-range RF communications (<60 cm) with one or more of the receivers or transceivers 300 distributed throughout a play environment (e.g., FIGS. 11, 12). At its most basic level, RFID provides a wireless link to uniquely identify objects or people. It is sometimes called dedicated short range communication (DSRC). RFID systems include electronic devices called transponders or tags, and reader electronics to communicate with the tags. These systems communicate via radio signals that carry data either uni-directionally (read only) or, more preferably, bi-directionally (read/write). One suitable RFID transponder is the 134.2 kHz/123.2 kHz, 23 mm Glass Transponder available from Texas Instruments, Inc. (http://www.tiris.com, Product No. RI-TRP-WRHP). This transponder basically comprises a passive (non-battery-operated) RF transmitter/receiver chip 340 and an antenna 345 provided within an hermetically sealed vial 350. A protective silicon sheathing 355 is preferably inserted around the sealed vial 350 between the vial and the inner wall of the tube 310 to insulate the transponder from shock and vibration.

Figure 18:
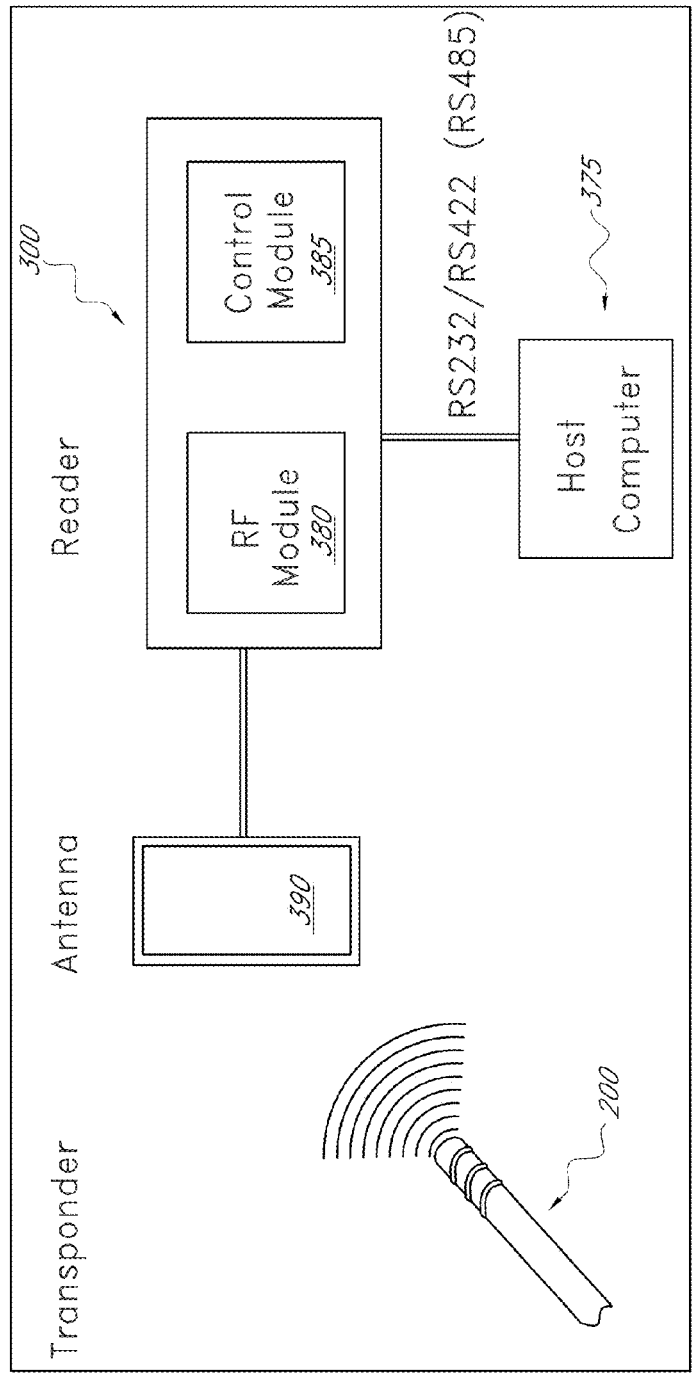
FIG. 18 is a simplified schematic diagram of an RF reader and master control system for use with the magic wand toy actuator of FIG. 17A having features and advantages in accordance with the present invention.

FIG. 18 is a simplified schematic diagram of one embodiment of an RF transceiver 300 and optional master control system 375 for use with the magic wand toy actuator of FIG. 17A. As illustrated, the transceiver 300 basically comprises an RF Module 380, a Control Module 385 and an antenna 390. When the distal end of wand 200 comes within a predetermined range of antenna 390 (~20-60 cm) the transponder antenna 345 (FIG. 17C) becomes excited and impresses a voltage upon the RF transmitter/receiver chip 340 disposed within transponder 335 at the distal end of the wand 200. In response, the RF transmitter/receiver chip 340 causes transponder antenna 345 to broadcast certain information stored within the transponder 335 comprising 80 bits of read/write memory. This information typically includes the user's unique ID number, magic level or rank and/or certain other information pertinent to the user or the user's play experiences.

This information is initially received by RF Module 380, which can then transfer the information through standard interfaces to an optional Host Computer 375, Control Module 385, printer, or programmable logic controller for storage or action. If appropriate, Control Module 385 provides certain outputs to activate or control one or more associated play effects, such as lighting, sound, various mechanical or pneumatic actuators or the like. Optional Host Computer 375 processes the information and/or communicates it to other transceivers 300, as may be required by the game. If suitably configured, RF Module 380 may also broadcast or "write" certain information back to the transponder 335 to change or update one of more of the 80 read/write bits in its memory. This exchange of communications occurs very rapidly (~70 ms) and so from the user's perspective it appears to be instantaneous. Thus, the wand 200 may be used in this "short range" or "passive" mode to actuate various "magical" effects throughout the play structure 100 by simply touching or bringing the tip of the wand 200 into relatively close proximity with a particular transceiver 300. To provide added mystery and fun, certain transceivers 300 may be provided as hidden clue stations within a play environment so that they must be discovered by play participants 105. The locations of hidden transceivers and/or other clue stations may be changed from time to time to keep the game fresh and exciting.

If desired, the wand 200 may also be configured for long range communications with one or more of the transceivers 300 (or other receivers) disposed within a play environment. For example, one or more transceivers 300 may be located on a roof or ceiling surface, on an inaccessible theming element, or other area out of reach of play participants. Such long-range wand operation may be readily achieved using an auxiliary battery powered RF transponder, such as available from Axcess, Inc., Dallas, Tex. If line of sight or directional actuation is desired, a battery-operated infrared LED transmitter and receiver of the type employed in television remote control may be used, as those skilled in the art will readily appreciate. Of course, a wide variety of other wireless communications devices, as well as various sound and lighting effects may also be provided, as desired. Any one or more of these may be actuated via button 325, as desirable or convenient.

Additional optional circuitry and/or position sensors may be added, if desired, to allow the "magic wand" 200 to be operated by waving, shaking, stroking and/or tapping it in a particular manner. If provided, these operational aspects would need to be learned by play participants as they train in the various play environments. One goal, for example, may be to become a "grand wizard" or master of the wand. This means that the play participant 105 has learned and mastered every aspect of operating the wand to produce desired effects within each play environment. Of course, additional effects and operational nuances can (and preferably are) always added over time in order to keep the interactive experience fresh and continually changing. Optionally, the wand 200 may be configured such that it is able to display 50 or more characters on a LTD or LCD screen. The wand may also be configured to respond to other signals, such as light, sound, or voice commands as will be readily apparent to those skilled in the art. This could be useful, for example for generating, storing and retrieving secret passwords, informational clues and the like.

RFID Tracking Card/Badge

Figure 19A:
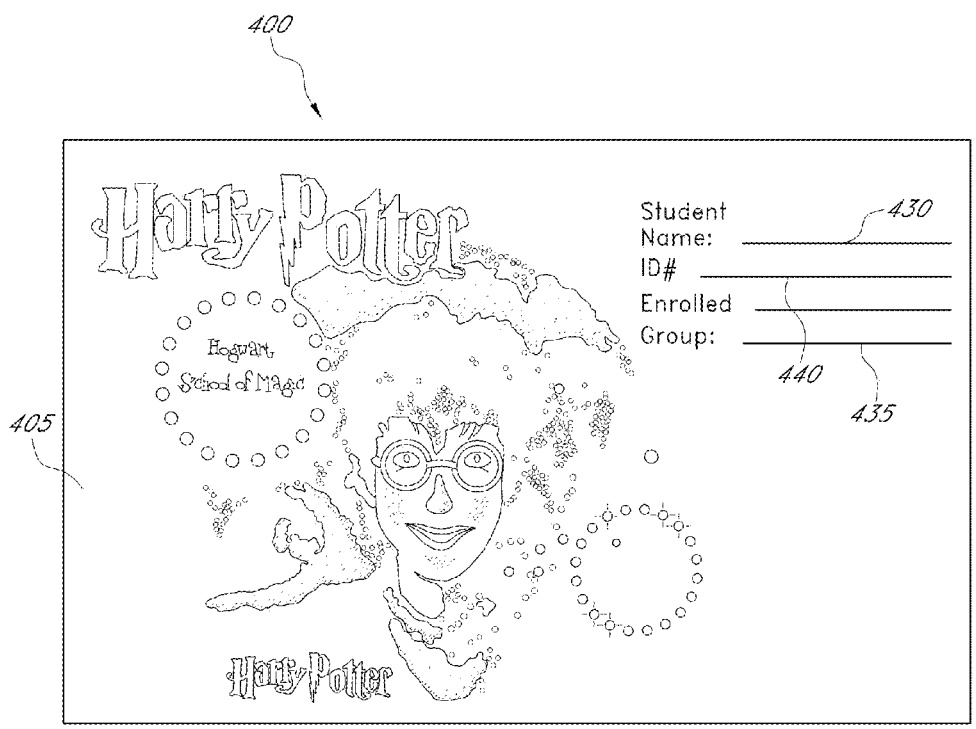
FIGS. 19A and 19B are front and rear views, respectively, of an optional RFID tracking badge or card for use within an interactive adventure game having features and advantages in accordance with the present invention.
Figure 19B:
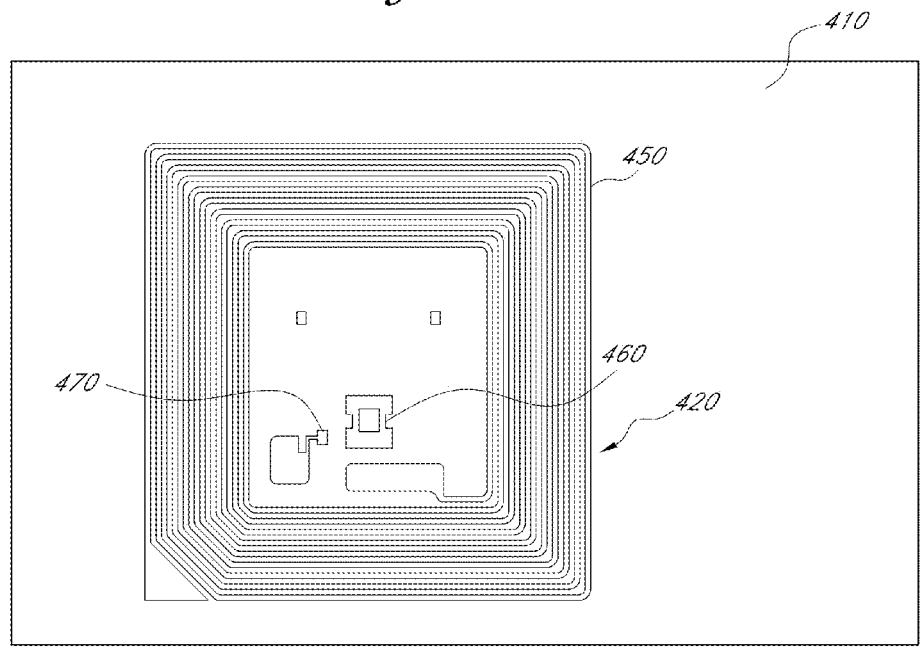

FIGS. 19A and 19B are front and rear views, respectively, of an optional or alternative RFID tracking badge or card 400 for use within the interactive game described above. This may be used instead of or in addition to the wand 200, described above. The particular badge 400 illustrated is intended to be affixed or adhered to the front of a shirt or blouse worn by a play participant during their visit to suitably equipped play or entertainment facilities. The badge preferably comprises a paper, cardboard or plastic substrate having a front side 404 and a back side 410. The front 405 of each card/badge 400 may be imprinted with graphics, photos, treasure maps or any other information desired. In the particular embodiment illustrated, the front 405 contains an image of Harry Potter in keeping with the overall theme of the game described above. In addition, the front 405 of the badge 400 may include any number of other designs or information pertinent to its application. For example, the guest's name 430, and group 435 may be indicated for convenient reference. A unique tag ID Number 440 may also be displayed for convenient reference and is particularly preferred where the badge 400 is to be reused by other play participants.

The obverse side 410 of the badge 400 contains the badge electronics comprising a radio frequency tag 420 pre-programmed with a unique person identifier number ("UPIN"). The tag 420 generally comprises a spiral wound antenna 450, a radio frequency transmitter chip 460 and various electrical leads and terminals 470 connecting the chip 460 to the antenna. Advantageously, the UPIN may be used to identify and track individual play participants within the play facility. Optionally, each tag 420 may also include a unique group identifier number ("UGIN") which may be used to match a defined group of individuals having a predetermined relationship—either pre-existing or contrived for purposes of game play. If desired, the tag 420 may be covered with an adhesive paper label (not shown) or, alternatively, may be molded directly into a plastic sheet substrate comprising the card 400.

Various readers distributed throughout a park or entertainment facility are able to read the RFID tags 420. Thus, the UPIN and UGIN information can be conveniently read and provided to an associated master control system, display system or other tracking, recording or display device for purposes of creating a record of each play participant's experience within the play facility. This information may be used for purposes of calculating individual or team scores, tracking and/or locating lost children, verifying whether or not a child is inside a facility, photo capture & retrieval, and many other useful purposes as will be readily obvious and apparent to those skilled in the art.

Preferably, the tag 420 is passive (requires no batteries) so that it is inexpensive to purchase and maintain. Such tags and various associated readers and other accessories are commercially available in a wide variety of configurations, sizes and read ranges. RFID tags having a read range of between about 10 cm to about 100 cm are particularly preferred, although shorter or longer read ranges may also be acceptable. The particular tag illustrated is the 13.56 MHz tag sold under the brand name Taggit™ available from Texas Instruments, Inc. (http://www.tiris.com, Product No. RI-103-110A). The tag 420 has a useful read/write range of about 25 cm and contains 256-bits of on-board memory arranged in 8×32-bit blocks which may be programmed (written) and read by a suitably configured read/write device. Such tag device is useful for storing and retrieving desired user-specific information such as UPIN, UGIN, first and/or last name, age, rank or level, total points accumulated, tasks completed, facilities visited, etc. If a longer read/write range and/or more memory is desired, optional battery-powered tags may be used instead, such as available from AXCESS, Inc. and/or various other vendors known to those skilled in the art.

Figures 20A, 20B:
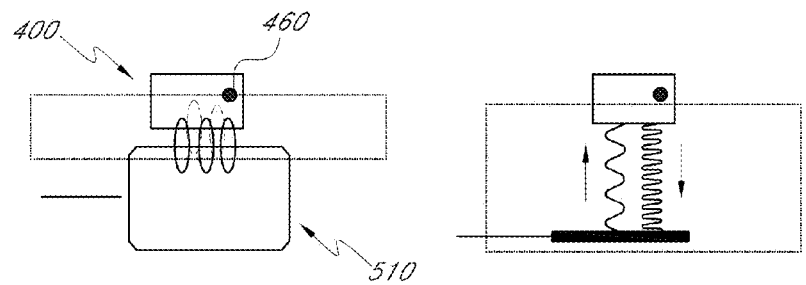
FIGS. 20A and 20B are schematic diagrams illustrating typical operation of the RFID tracking badge of FIG. 19.
Figure 21:
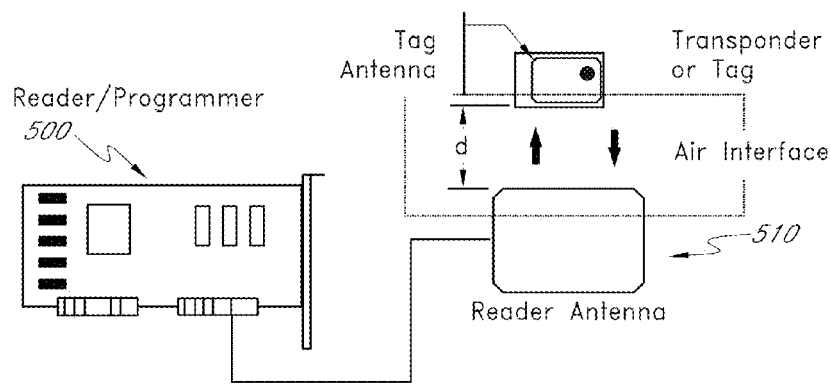
FIG. 21 is simplified schematic diagram of an RFID read/write system for use with the RFID tracking badge of FIG. 19 having features and advantages in accordance with the present invention.

FIGS. 20 and 21 are simplified schematic illustrations of tag and reader operation. The tag 420 is initially activated by a radio frequency signal broadcast by an antenna 510 of an adjacent reader or activation device 500. The signal impresses a voltage upon the antenna 450 by inductive coupling which is then used to power the chip 460 (see, e.g., FIG. 20A). When activated, the chip 460 transmits via radio frequency a unique identification number preferably corresponding to the UPIN and/or UGIN described above (see, e.g., FIG. 20B). The signal may be transmitted either by inductive coupling or, more preferably, by propagation coupling over a distance "d" determined by the range of the tag/reader combination. This signal is then received and processed by the associated reader 500 as described above. If desired, the RFID card or badge 400 may also be configured for read/write communications with an associated reader/writer. Thus, the unique tag identifier number (UPIN or UGIN) can be changed or other information may be added.

As indicated above, communication of data between a tag and a reader is by wireless communication. As a result, transmitting such data is always subject to the vagaries and influences of the media or channels through which the data has to pass, including the air interface. Noise, interference and distortion are the primary sources of data corruption that may arise. Thus, those skilled in the art will recognize that a certain degree of care should be taken in the placement and orientation of readers 500 so as to minimize the probability of such data transmission errors. Preferably, the readers are placed at least 30-60 cm away from any metal objects, power lines or other potential interference sources. Those skilled in the art will also recognize that the write range of the tag/reader combination is typically somewhat less (~10-15% less) than the read range "d" and, thus, this should also be taken into account in determining optimal placement and positioning of each reader device 500.

Typical RFID data communication is asynchronous or unsynchronized in nature and, thus, particular attention should be given in considering the form in which the data is to be communicated. Structuring the bit stream to accommodate these needs, such as via a channel encoding scheme, is preferred in order to provide reliable system performance. Various suitable channel encoding schemes, such as amplitude shift keying (ASK), frequency shift keying (FSK), phase shift keying (PSK) and spread spectrum modulation (SSM), are well known to those skilled in the art and will not be further discussed herein. The choice of carrier wave frequency is also important in determining data transfer rates. Generally speaking the higher the frequency the higher the data transfer or throughput rates that can be achieved. This is intimately linked to bandwidth or range available within the frequency spectrum for the communication process. Preferably, the channel bandwidth is selected to be at least twice the bit rate required for the particular game application.

Figure 22:
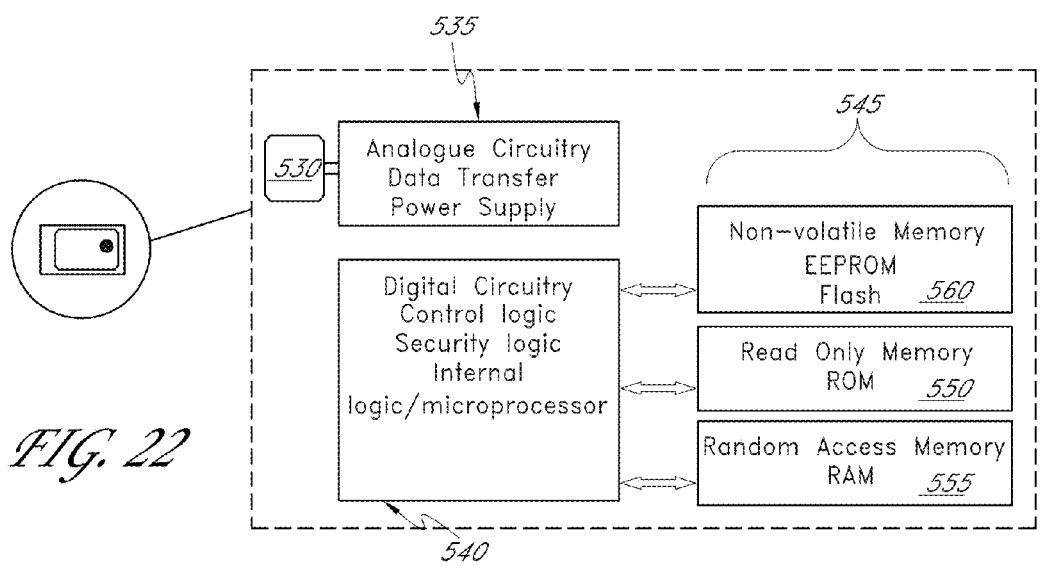
FIG. 22 is a simplified block diagram illustrating the basic organization and function of the electronic circuitry comprising the RFID tag device of FIG. 19B.

FIG. 22 is a simplified block diagram illustrating the basic organization and function of the electronic circuitry comprising the radio frequency transmitter chip 460 of the RFID tag device 420 of FIG. 19B. The chip 460 basically comprises a central processor 530, Analogue Circuitry 535, Digital Circuitry 540 and on-board memory 545. On-board memory 545 is divided into read-only memory (ROM) 550, random access memory (RAM) 555 and non-volatile programmable memory 560, which is available for data storage. The ROM-based memory 550 is used to accommodate security data and the tag operating system instructions which, in conjunction with the processor 530 and processing logic deals with the internal "house-keeping" functions such as response delay timing, data flow control and power supply switching. The RAM-based memory 555 is used to facilitate temporary data storage during transponder interrogation and response. The non-volatile programmable memory 560 may take various forms, electrically erasable programmable read only memory (EEPROM) being typical. It is used to store the transponder data and is preferably non-volatile to ensure that the data is retained when the device is in its quiescent or power-saving "sleep" state.

Various data buffers or further memory components (not shown), may be provided to temporarily hold incoming data following demodulation and outgoing data for modulation and interface with the transponder antenna 450. Analog Circuitry 535 provides the facility to direct and accommodate the interrogation field energy for powering purposes in passive transponders and triggering of the transponder response. Analog Circuitry also provides the facility to accept the programming or "write" data modulated signal and to perform the necessary demodulation and data transfer processes. Digital Circuitry 540 provides certain control logic, security logic and internal microprocessor logic required to operate central processor 530.

Role Play Character Cards

The RFID card 400 illustrated and described above is used, in accordance with the afore-mentioned preferred embodiment, to identify and track individual play participants and/or groups of play participants within a play facility. However, in another preferred embodiment, the same card 400 and/or a similarly configured RFID or a magnetic "swipe" card or the like may be used to store certain powers or abilities of an imaginary role-play character that the card 400 represents.

For example, card 400 may represent the Harry Potter character. As each play participant uses his/her favorite character card in various Harry Potter play facilities the Harry Potter character represented by the card 400 gains (or loses) certain attributes, such as magic skill level, magic strength, flight ability, various spell-casting abilities, etc. All of this information is preferably stored on the card 400 so that the character attributes may be easily and conveniently transported to other similarly-equipped play facilities, computer games, video games, home game consoles, hand-held game units, and the like. In this manner, an imaginary role-play character is created and stored on a card that is able to seamlessly transcend from one play medium to the next.

For example, character attributes developed during a play participant's visit to a local Harry Potter/Hogwart magic facility are stored on the card 400. When the play participant then revisits the same or another Harry Potter play facility, all of the attributes of his character are "remembered" on the card so that the play participant is able to continue playing with and developing the same role-play character. Similarly, various video games, home game consoles, and/or hand-held game units can be and preferably are configured to communicate with the card 400 in a similar manner as described above and/or using other well-known information storage and communication techniques. In this manner, a play participant can use the character card 400 and the role play character he or she has developed with specific associated attributes in a favorite video action game, role-play computer game or the like.

Master Control System

Depending upon the degree of game complexity desired and the amount of information sharing required, the transceivers 300 may or may not be connected to a master control system or central server 375 (FIG. 18). If a master system is utilized, preferably each wand 200 and/or RFID card 400 is configured to electronically send and receive information to and from various receivers or transceivers 300 distributed throughout a play facility using a send receive radio frequency ("SRRF") communication protocol. This communications protocol provides the basic foundation for a complex, interactive entertainment system which creates a seemingly magic interactive play experience for play participants who possess and learn to use the magical wand. In its most refined embodiments, a user may electronically send and receive information to and from other wands and/or to and from a master control system located within and/or associated with any of a number of play environments, such as a family entertainment facility, restaurant play structure, television/video/radio programs, computer software program, game console, web site, etc. This newly created network of SRRF-compatible play and entertainment environments provides a complex, interactive play and entertainment system that creates a seamless magical interactive play experience that transcends conventional physical and temporal boundaries.

SRRF may generally be described as an RF-based communications technology and protocol that allows pertinent information and messages to be sent and received to and from two or more SRRF compatible devices or systems. While the specific embodiments descried herein are specific to RF-based communication systems, those skilled in the art will readily appreciate that the broader interactive play concepts taught herein may be realized using any number of commercially available 2-way and/or 1-way medium range wireless communication devices and communication protocols such as, without limitation, infrared-, digital-, analog-, AM/FM-, laser-, visual-, audio-, and/or ultrasonic-based systems, as desired or expedient.

The SRRF system can preferably send and receive signals (up to 40 feet) between tokens and fixed transceivers. The system is preferably able to associate a token with a particular zone as defined by a token activation area approximately 10-15 feet in diameter. Different transceiver and antenna configurations can be utilized depending on the SRRF requirements for each play station. The SRRF facility tokens and transceivers are networked throughout the facility. These devices can be hidden in or integrated into the facility's infrastructure, such as walls, floors, ceilings and play station equipment. Therefore, the size and packaging of these transceivers is not particularly critical.

In a preferred embodiment, an entire entertainment facility may be configured with SRRF technology to provide a master control system for an interactive entertainment play environment using SRRF-compatible magic wands and/or tracking devices. A typical entertainment facility provided with SRRF technology may allow 300-400 or more users to more-or-less simultaneously send and receive electronic transmissions to and from the master control system using a magic wand or other SRRF-compatible tracking device.

In particular, the SRRF system uses a software program and data-base that can track the locations and activities of up to a hundred more users. This information is then used to adjust the play experience for the user based on "knowing" where the user/player has been, what objectives that player has accomplished and how many points or levels have been reached. The system can then send messages to the user throughout the play experience. For example, the system can allow or deny access to a user into a new play area based on how many points or levels reached by that user and/or based on what objectives that user has accomplished or helped accomplish. It can also indicate, via sending a message to the user the amount of points or specific play objectives necessary to complete a "mission" or enter the next level of play. The master control system can also send messages to the user from other users.

The system is preferably sophisticated enough that it can allow multiple users to interact with each other adjusting the game instantly. The master system can also preferably interface with digital imaging and/or video capture so that the users' activities can be visually tracked. Any user can locate another user either through the video capturing system or by sending a message to another device. At the end of a visit, users are informed of their activities and the system interfaces with printout capabilities. The SRRF system is preferably capable of sending and receiving signals up to 100 feet. Transmitter devices can also be hidden in walls or other structures in order to provide additional interactivity and excitement for play participants.

Suitable embodiments of the SRRF technology described above may be obtained from a number of suitable sources, such as AXCESS, Inc. and, in particular, the AXCESS active RFID network system for asset and people tracking applications. In another preferred embodiment the system comprises a network of transceivers 300 installed at specific points throughout a facility. Players are outfitted or provided with a reusable "token"—a standard AXCESS personnel tag clipped to their clothing in the upper chest area. As each player enters a specific interactive play area or "game zone" within the facility, the player's token receives a low frequency activation signal containing a zone identification number (ZID). The token then responds to this signal by transmitting both its unique token identification number (TID) along with the ZID, thus identifying and associating the player with a particular zone.

The token's transmitted signal is received by a transceiver 300 attached to a data network built into the facility. Using the data network, the transceiver forwards the TID/ZID data to a host computer system. The host system uses the SRRF information to log/track the guest's progress through the facility while interfacing with other interactive systems within the venue. For example, upon receipt of a TID/ZID message received from Zone 1, the host system may trigger a digital camera focused on that area, thus capturing a digital image of the player which can now be associated with both their TID and the ZID at a specific time. In this manner, the SRRF technology allows the master control system to uniquely identify and track people as they interact with various games and activities in a semi-controlled play environment. Optionally, the system may be configured for two-way messaging to enable more complex interactive gaming concepts.

In another embodiment, the SRRF technology can be used in the home. For enabling Magic at the home, a small SRRF module is preferably incorporated into one or more portable toys or objects that may be as small as a beeper. The SRRF module supports two-way communications with a small home transceiver, as well as with other SRRF objects. For example, a Magic wand 200 can communicate with another Magic wand 200.

The toy wand or other object 200 may also include the ability to produce light, vibration or other sound effects based on signals received through the SRRF module. In a more advanced implementation, the magical object may be configured such that it is able to display preprogrammed messages of up to 50 characters on a LCD screen when triggered by user action (e.g., button) or via signals received through the SRRF module. This device is also preferably capable of displaying short text messages transmitted over the SRRF wireless link from another SRRF-compatible device.

Preferably, the SRRF transceiver 300 is capable of supporting medium-to-long range (10-40 feet) two-way communications between SRRF objects and a host system, such as a PC running SRRF-compatible software. This transceiver 300 has an integral antenna and interfaces to the host computer through a dedicated communication port using industry standard RS232 serial communications. It is also desirable that the SRRF transmission method be flexible such that it can be embedded in television or radio signals, videotapes, DVDs, video games and other programs media, stripped out and re-transmitted using low cost components. The exact method for transposing these signals, as well as the explicit interface between the home transceiver and common consumer electronics (i.e., TVs, radios, VCRs, DVD players, A/V receivers, etc.) is not particularly important, so long as the basic functionality as described above is achieved. The various components needed to assemble such an SRRF system suitable for use with the present invention are commercially available and their assembly to achieve the desired functionality described above can be readily determined by persons of ordinary skill in the art. If desired, each SRRF transceiver may also incorporate a global positioning ("GPS") device to track the exact location of each play participant within one or more play environments.

Most desirably, a SRRF module can be provided in "chip" form to be incorporated with other electronics, or designed as a packaged module suitable for the consumer market. If desired, the antenna can be embedded in the module, or integrated into the toy and attached to the module. Different modules and antennas may be required depending on the function, intelligence and interfaces required for different devices. A consumer grade rechargeable or user replaceable battery may also be used to power both the SRRF module and associated toy electronics.

Interactive Game Play

The present invention may be carried out using a wide variety of suitable game play environments, storylines and characters, as will be readily apparent to those skilled in the art. The following specific game play examples are provided for purposes of illustration and for better understanding of the invention and should not be taken as limiting the invention in any way:

EXAMPLE 1

An overall interactive gaming experience and entertainment system is provided (called the "Magic" experience), which tells a fantastic story that engages children and families in a never-ending adventure based on a mysterious treasure box filled with magical objects. Through a number of entertainment venues such as entertainment facilities, computer games, television, publications, web sites, and the like, children learn about and/or are trained to use these magical objects to become powerful "wizards" within one or more defined "Magic" play environments. The play environments may be physically represented, such as via an actual existing play structure or family entertainment center, and/or it may be visually/aurally represented via computer animation, television radio and/or other entertainment venue or source.

The magical objects use the SRRF communications system allowing for messages and information to be received and sent to and from any other object or system. Optionally, these may be programmed and linked to the master SRRF system. Most preferably, the "magic wand" 200 is configured to receive messages from any computer software, game console, web site, and entertainment facility, television program that carries the SRRF system. In addition, the magic wand can also preferably send messages to any SRRF compatible system thus allowing for the "wand" to be tracked and used within each play environment where the wand is presented. The toy or wand 200 also preferably enables the user to interact with either a Master system located within a Magic entertainment facility and/or a home-based system using common consumer electronic devices such as a personal computer, VCR or video game system.

The master control system for a Magic entertainment facility generally comprises: (1) a "token" (gag, toy, wand 200 or other device) carried by the user 105, (2) a plurality of receivers or transceivers 300 installed throughout the facility, (3) a standard LAN communications system (optional), and (4) a master computer system interfaced to the transceiver network (optional). If a Master computer system is used, preferably the software program running on the Master computer is capable of tracking the total experience for hundreds of users substantially in real time. The information is used to adjust the play for each user based on knowing the age of the user, where the user has played or is playing, points accumulated, levels reached and specific objectives accomplished. Based on real-time information obtained from the network, the system can also send messages to the user as they interact throughout the Magic experience.

The Master system can quickly authorize user access to a new play station area or "zone" based on points or levels reached. It can also preferably indicate, via sending a message to the user, the points needed or play activities necessary to complete a "mission." The Master system can also send messages to the user from other users. The system is preferably sophisticated enough to allow multiple users to interact with each other while enjoying the game in real-time.

Optionally, the Master system can interface with digital imaging and video capture so that the users' activities can be visually tracked. Users can locate another user either through the video capturing system or by sending a message to another device. At the end of a visit, users are shown photos of their activities related to the Magic experience via display or printout.

For relatively simple interactive games, the Master system may be omitted in order to save costs. In that case, any game-related information required to be shared with other receivers or transceivers may be communicated via an RS-232 hub network, Ethernet, or wireless network, or such information may be stored on the wand itself and/or an associated RFID card or badge carried by the play participant (discussed later). For retrofit applications, it is strongly preferred to provide substantially all stand-alone receivers or transceivers that do not communicate to a master system or network. This is to avoid the expense of rewiring existing infrastructure. For these applications, any information required to be shared by the game system is preferably stored on the wand or other RFID device(s) carried by the play participants. Alternatively, if a more complex game experience is demanded, any number of commercially available wireless networks may be provided without requiring rewiring or existing infrastructure.

EXAMPLE 2

Game participants are immersed in a treasure hunt adventure that combines old fashioned storytelling, live entertainment, hands-on play and interactive gaming together in a seamless experience. The game is carried out in multiple venues and using multiple entertainment mediums so that cross-media promotion and traffic is encouraged and provided by the game (see, e.g., FIG. 23).

The treasure hunt is brought to life through a live-action story and interactive game using the RFID tag technology. Play participants receive points (optionally redeemable for one or more prizes) for searching and successfully finding clues and other items and for solving various puzzles and the final mystery of the whereabouts of a lost treasure located at Stone Mountain, Ga. Guests are awarded points for finding 18-20 hidden and not-so hidden items such as a framed letter, a painting on the wall, bottle of elixir buried amongst props, etc. These clues and other items are preferably distributed throughout a park facility and in various retail, restaurant and entertainment buildings for which the park desires to generate additional walk-in traffic.

Each item found is worth a certain number of points and/or reveals to the player one or more clue(s) needed to advance in the game. Clues may be the location of other hidden items, tools or clues. Preferably the clues are revealed in an appropriately themed manner, such as a local newspaper account, programmed and staff-led storytelling, signage, performances, and various interactive game consoles. The story is eventually revealed as follows:

Sample Storyline

In 1790 Alexander McGillivray, son of a Scottish soldier and Muskogee Indian Princess, became an important friend of both the Indians and the United States government. He met with several important men at Stone Mountain to put together a peace treaty between the Indians and the government. George Washington invited him to meet with him in New York where they agreed to the Treaty of New York. For his efforts, Alexander was made a Brigadier General in the army with a pension. It is believed that he was also given $100,000 gold coins.

This treasure of gold coins was passed down several generations and it is reported to be buried at Stone Mountain. Many in the town believe the story is legend, but two unrelenting men believe that it is true. A famous Historian by the name of Andrew Johnson, and an adventurer by the name of Tom Willingham, are convinced that the treasure exists and have spent the last 10 years searching for the gold. The last living relative to McGillivray buried the treasure but wanted the search to be difficult and has left important and revealing clues throughout the town of Crossroads. The two men's journey is coming to an exciting conclusion in that they have discovered that the final clue is buried under the fountain/mine/bust of Alexander McGillivray near the center of town. As they dig in "present" day for their final clue, they tell the story of their hunt for the treasure over the last decade. One and all are invited to retrace their steps in their search for the gold and become a part of the grand adventure when the final clue is revealed to where the treasure is buried.

Game Play

By participating in the game players receive valuable points for each level of accomplishment they make in finding these clues and items which could either give them high point rankings and/or earn them a prize or chance at a large prize in the future (e.g. part of a real treasure). Advantageously, clues and other necessary items are preferably hidden within various retail stores and designated entertainment areas giving kids and adults fun and alluring reasons to go inside buildings and seek out new experiences they might have otherwise overlooked.

Once a player completes the game, he or she will have collected enough points, clues and other information that will give them the knowledge they need to discover and/or solve the final clue of where the treasure is buried. The "reward" for successfully completing the game could be, for example, a small prize, recognition certificate, a sweepstakes entry to win a large prize.

EXAMPLE 3

Game participants are immersed in a worldwide treasure hunt adventure to locate a large, unknown amount or money stashed away in one or more Swiss bank accounts (the money and the accounts can be real or "made-up").

Sample Storyline

Willy Wonkers, a reclusive/eccentric billionaire, was unsure which of his many would-be heirs was worthy to receive his vast fortunes. So he provided in his will that upon his demise his entire estate was to be liquidated and all of the proceeds placed in a number of anonymous Swiss bank accounts (under secret passwords known only to Willy) to be distributed "to only such heir(s) who prove themselves worthy of inheriting my vast fortunes by successfully completing the Wonkers Worldwide Worthiness Challenge"—a series of intellectual, physical and moral challenges devised by Willy.

To create the ultimate "worthiness" challenge, Willy employed a team of a thousand of the world's top scientists, psychologists, teachers, musicians, engineers, doctors, etc. The goal was to develop a number of probative tests/challenges that would ultimately reveal the worthy recipient(s) of Willy's vast fortunes. Per Willy's instructions the challenges were very carefully and meticulously designed to ensure that only persons of the highest character and pureness of heart/mind could ever succeed in completing all of the necessary challenges and thereby obtain Willy's fortunes. Willy was especially vigilant to thwart the possible feigning efforts of unscrupulous persons who might attempt to gain access to his fortunes by cheating, trickery or other deceptive devices. Above all, he was determined to prevent any part of his vast estate and fortune from ever falling into the hands of persons who were lazy, ignorant or wicked of heart.

While Willy was a prodigiously brilliant and gifted man, he was also surprisingly naive. Willy soon met his demise at the bottom of a boiling vat of chocolate via the hands of his greedy nephew and would-be heir, Ignomeous ("Iggy") Ignoramus. When Iggy learned of his uncle's plan, he abducted Willy late one night outside his office and forced him at gunpoint to reveal the secret passwords which only Willy knew (it was easy for Willy to remember because the passwords were his favorite candies). While nervously holding the gun to Willy's head, Iggy frantically inscribed the secret account numbers and passwords on the back of a chocolate bar (there being no paper handy at the time). He then bound and gagged Willy and threw him into the boiling vat of chocolate whereupon Willy was found dead the next morning.

Iggy's plan (such as it was) was to lay low and wait for Willy's estate to be liquidated and transferred into the various secret Swiss accounts in accordance with Willy's final wishes. But, before any genuinely worthy recipient would have a chance to successfully complete all of the challenges and rightfully claim the Wonkers fortunes, Iggy would secretly divert all of the funds in each of the secret Swiss accounts to his own secret accounts whereupon he would enjoy the good-life forever thereafter.

Unfortunately, Iggy failed to consider the extreme heat radiated by the boiling vat of chocolate. By the time Iggy had gagged, bound, dragged and threw Willy into the boiling vat of chocolate and watched him as he slowly sank deeper and deeper into the molten chocolate to his demise, Iggy realized he was sweating like a pig. It was at that time that he also noticed the chocolate bar—upon which he had inscribed the secret Swiss account numbers and passwords—had all but melted away in his shirt pocket. Frantically, Iggy tried to preserve the rapidly melting chocolate bar, but it was too late. He was only able to salvage a few incomplete numbers and passwords before the candy bar was no more.

Iggy tried mentally to recreate the missing information, but he was not good at remembering much of anything, let alone numbers and obscure passwords. Thus, he could only recreate a few bits and pieces of the critical information. On the brighter side, Iggy did manage to salvage some of the information and he figured, given enough time, he would probably be able to break the secret passwords and ultimately get the loot before anyone else does. His cousin, Malcolm Malcontent, and several other greedy would-be heirs agreed to help him in exchange for a cut of the loot.

Game participants are invited to a reading of the will where they are identified as a potential heir to the Wonkers family fortune. Each participant is challenged to complete the Wonkers Worldwide Worthiness test and to thereby obtain the secret Swiss account number(s)/passwords and the Wonkers fortunes before Iggy does. The first participant who successfully completes the challenge gets all the loot. However, the failure to complete any single challenge results in immediate and permanent disinheritance.

The challenges are arranged so that only those who are smart, diligent and who are pure of heart and mind (etc., etc. ... ) will be able to successfully complete the worthiness challenge. Thus, participants must faithfully carry out and complete each challenge in the exact manner specified. Any changes or deviations will result in failure. The game is also set up to provide many temptations along the way to cut corners, cheat or trick ones way through the various challenges. Players must not succumb to these temptations, lest they be immediately and permanently disinherited. Players must also be careful not to reveal any helpful information to Iggy or his posse of greedy co-conspirators, lest they get to the loot first.

Game Play

Each game participant receives a card, token, key chain, or other gaming implement ("game token"). This token contains a unique identification number (preferably an RFID tag, mag-strip card, bar-coded card, or the like) which is used to uniquely identify each player throughout the game play. Optionally, a user-selected password is associated with each token so that it can only be used or activated by its proper owner. The token allows players to interact with one or more game enabled readers/stations and/or other compatible devices distributed throughout a selected geographic region (e.g., book stores, theme parks, family entertainment centers, movie theaters, fast-food venues, internet, arcades, etc.).

Preferably, each token represents a specific character in the treasure hunt game. Thus, play participants would preferably select which character he or she would like to play. For example, possible characters may include Eddy the Electrician, Abe the Accountant, Martha the Musician, Doctor Dave, Nurse Betty, Policeman Paul, etc. Each character would come with a unique story about who they are, how they were related to Willy and, most importantly, a touching little vignette about Willy that no one else knows. Hidden within each story is one or more unique clues that are necessary to solve the various challenges the players will soon face. The game is preferably arranged and set up so that clues can only be successfully used by the particular character(s) who legitimately possesses them. If any other character illegitimately obtains these secret clues and tries to use them in the game, he or she will fail the challenge.

Preferably all of the clues (and possibly other, extrinsic clues) are required to complete the quest. Thus, players will preferably need to cooperate with other players in order to receive and exchange clues and/or other specified assistance "legitimately" to enable each player to advance in the game. For example, assume that Policeman Paul knows that Willy detests white chocolate. Nurse Betty knows that Willy can't stand licorice. In the course of game play, Betty and Paul independently determine that one of the secret passwords must be either: (1) Jelly Bean; (2) White Chocolate; or (3) Licorice. Neither Betty nor Paul, alone, knows the correct answer (they can try to "trick" the game by guessing, but then they will lose the quest). But, together they can solve the challenge. Betty can share her information with Paul and Paul can share his information with Betty.

Preferably, any sharing of information must be conducted within the rules of the game to be "legitimate" and recognized by the game. Thus, preferably, players cannot advance in the game simply by getting the relevant clue info from the internet or by asking other players. To be legitimate and, therefore, recognized by the game, both players of the Betty and Paul characters must present their tokens together to an enabled token reader (e.g., at a local game center or theme park) and request that the information be shared between the characters. Once the information is legitimately exchanged within the context of the game, it then can be used by each player/character to solve further challenges and to thereby advance in the game. However, if a player guesses the answer (even correctly) or if the clue information is obtained illegitimately, then the player preferably loses the quest and must purchase a new token.

More complex sharing scenarios could also be developed. For example, certain unique clue information could be revealed only during the course of game play and only to certain characters. Other characters would need this clue information to advance in the game and would have to figure out which other character(s) have the information they need. They would then need to find and contact another player (a friend, acquaintance, classmate, etc.) who has the appropriate character token and who has successfully found the clue information they need. Then they would need to meet in order to make the necessary exchange transaction.

For instance, assume in the above example that Paul had information to help Betty, but Betty did not have the information needed to help Paul. Betty had information to help Martha and Martha had the information to help Paul. Now, the players must somehow negotiate a mutual three-way exchange that works for everyone's interest. The resulting transactions could be simple bartering (information in exchange for information/help) and/or there could be some kind of currency involved, such as bonus points or the like, whereby players could negotiate and accumulate points each time they help other players. One goal of the game is to encourage playful interaction among the players by requiring them to work with (and possibly negotiate against) other players to see who can get the information and points they need to advance in the game.

Alternatively, players may need to acquire or learn some special skill or knowledge that is necessary to interpret a clue. For example, one player may get a clue in a strange foreign language and another player happens to be (or chooses to become within the context of the game) an international language expert who can interpret the foreign-language clue. Both players need to somehow find and cooperate with one another in order to advance in the game. Players can (and preferably must) also obtain certain information or clues from other extrinsic sources in order to further advance in the game. These can be simple extrinsic sources like a dictionary, encyclopedia, a local library or museum, or a secret code word printed on a participating retail store purchase receipt.

Preferably, the game is self-policing. That is, it "knows" when an exchange of information and/or other help is legitimately given (i.e. conducted within the rules of the game) and can react accordingly. For example, the game may require both players (or multiple players, if more than two are involved) to simultaneously present their tokens to an enabled reader/device. The reader would then be able to verify the identities of each character/player, extract relevant info, token ID, user password, etc., and write the relevant new info to each player's token. Once the transaction is completed, each player would then legitimately possess and be able to use the information stored on his/her token to advance further in the game using any other gaming device that can read the token.

Alternatively, the same sequence can be followed as described above, except that the token is used only to verify character and player identities (e.g. an RFID read only tag). All other relevant information is stored in a local and/or central database. The data-base keeps track of each individual player's progress, what information/clues they have learned, who they have interacted with, points accumulated, etc. Thus, game play can proceed on any device that can communicate via the internet, such as a home computer, game console, internet appliance, etc.

Alternatively, an authenticating password may be used in conjunction with each RFID identifying token. When two or more players present their tokens to an enabled reader device as in the examples described above, each player is given an authenticating password, which the player(s) then can enter into any other gaming platform. The password may be an alpha-numeric code that is mathematically derived from the unique ID numbers of each participating player involved in the sharing transaction. Thus, it is unique to the specific players involved in the authorized exchange transaction and cannot be used by other players (even if they copy or steal the password). When the alpha-numeric number is subsequently re-entered into another device (e.g., a home game console or home computer) by the authorized player, the game software can reverse the mathematical algorithm using the players unique ID (previously entered at the beginning of the game) and thereby determine and/or validate the event(s) that generated the authenticating password. Existing public-key/private-key encryption algorithms and/or the like could be used for encoding and decoding the authenticating passwords. Optionally, each authenticating password could have a "shelf life" of any desired length of time such that it must be used within an hour, a day, a week, a month, etc. This might help move the game along by keeping players on their toes. Authenticating passwords could be easily printed and dispensed on special tickets or stickers, which can be collected. Alternatively, and/or in addition, authenticating passwords can be readily printed on any ordinary cash register receipt as part of any purchase transaction (e.g. at a fast food or other retail establishment).

The treasure hunt game may be continual in its progression or it may be orchestrated in "real time" via the internet or any other mass distribution/communication medium, such as TV commercials, mini-gameboy installments, computer-animated MPEG videos. For example, each game might last several days/weeks/months, and may be launched in conjunction with a promotional/advertising campaign for a complementing movie or the like. In that event, players would preferably sign up in advance to receive their tokens to play the game or they can purchase one or more tokens at any participating gaming outlet before or during the game.

Of course, those skilled in the art will readily appreciate that the underlying concept of an RFID trading card 900 and card game is not limited to cards depicting fantasy characters or objects, but may be implemented in a wide variety of alternative embodiments, including sporting cards, baseball, football and hockey cards, movie character cards, dinosaur cards, educational cards and the like. If desired, any number of other suitable collectible/tradable tokens or trinkets may also be provided with a similar RFID tag device in accordance with the teachings of the present invention as dictated by consumer tastes and market demand.

EXAMPLE 4

Game participants are immersed in a "whodunit" murder mystery. For example, this interactive adventure game could be based on the popular board game "CLUE™." Players learn that a murder has been committed and they must figure out who did it, in what room, with what weapon, etc. The game is preferably live-action interactive with simulated live-news casts, letters, telephone calls, etc.

Sample Storyline

Major Mayonnaise is found dead in his palatial mansion of an apparent massive coronary. However, clues at the crime scene indicate that this was in fact a carefully planned murder. Based on the indisputable physical evidence, the murder could only have been committed by one of eight possible suspects.

It is common knowledge that each player hated Mayonnaise and, thus, each player has been identified as a suspect in the murder. Thus, the mission is to figure out WHO DUNIT! and how.

Game Play

Game play is essentially as described above in connection with Example 3. Players receive game tokens, cards, bands or the like uniquely identifying each player. Preferably, each token represents one of the eight suspect characters in the Whodunit game. As in Example 3, above, each character would preferably have a unique story about who they are, where they were on the night of the murder, and why they dislike Mayonnaise. Hidden within the collective stories are the unique clues necessary to solve the murder mystery challenge. Players cooperate by exchanging clues and other information needed to solve the mystery. As in Example 3, the game is preferably set up and organized so that relevant clues can only be successfully used by the particular character(s) who legitimately possess them. Any player who tries to cheat will preferably be disqualified or otherwise prevented from advancing in the game.

EXAMPLE 5

Game participants are immersed in a magical computer adventure game. For example, this Interactive adventure game could be based on the popular "HARRY POTTER™" series of children's books by J. K. Rowling and licensed computer games by Electronic Arts. Players learn basic magic skills as they progress through an adventure game and solve one or more challenges/puzzles.

Sample Storyline

Players are students enrolled at the Hogwart school of witchery where they are learning witchcraft, spell casting, secret messaging and the like. But something terrible and evil has happened and it is up to each player and their fellow classmates to solve the mystery and ferret out the evil-doer and save the school.

Game Play

Game play is essentially as described above in connection with Examples 3 and 4. Players preferably receive game tokens, cards, bands and/or the like uniquely identifying each player. Each token provides a unique identifier for the player and preferably can store his/her progress in the game. Each player begins the adventure with essentially the same magic powers, skills and abilities. Each player may also receive a magic wand or other similar device which the players must learn to use to accomplish certain goals set out in the game.

Players cooperate by exchanging clues and other information needed to solve the mystery. As in Examples 3 and 4, the game is preferably organized so that relevant clues can only be successfully used by the particular character(s) who legitimately possess them. Any player who tries to cheat will preferably be disqualified or otherwise prevented from advancing in the game.

An authenticating password system is preferably used to verify or authenticate game events and to thereby discourage cheating. These secret codes or passwords may be obtained from any participating game venue (e.g., fast food venues, toy store, theme parks, etc.) or other sources that will become obvious once the game is implemented. Once a secret password is obtained, players can enter it into a specially enabled home computer game, arcade game, portable gaming device, or other device, to get secret powers and/or to find secret parts of the game otherwise unobtainable without the secret code. For example, a player may buy a meal from a fast-food vendor and as part of the meal package would receive a token and/or a secret code. The secret code preferably may be used to access a secret portion or level of a popular computer adventure game.

Most preferably (although not required) authenticating passwords are unique or semi-unique to the player(s) who possess them. For example, each password may be an alpha-numeric code that is mathematically derived from a unique ID number stored on each participating players token or from a password the player selects. Thus, the secret code is more-or-less unique to the specific player(s) involved in an authenticated game event and preferably cannot be used by other players (even if they copy or steal the secret code). When the alpha-numeric number is subsequently re-entered into another device (e.g., a home game console or home computer) by the authorized player, the game software can reverse the mathematical algorithm using the players unique ID or user-selected password (this may or may not be previously entered at the beginning of the game) and thereby determine and/or validate the game event(s) that generated the authenticating password. Existing public-key/private-key encryption algorithms and/or the like could be used for encoding and decoding the authenticating passwords.

Optionally, each authenticating password could have a "shelf life" of any desired length of time such that it must be used within an hour, a day, a week, a month, etc. This might help move the game along by keeping players on their toes. Authenticating passwords could be easily printed and dispensed on special tickets or stickers, which can be collected. Alternatively, and/or in addition, authenticating passwords can be readily printed on any ordinary cash register receipt as part of any purchase transaction (e.g. at a fast food or other retail establishment).

To make the password system more convenient, the token device may optionally include one or more entry buttons and an LCD display. When players insert the token into an enabled reader, the secret code(s) are downloaded automatically to the token device and can be displayed on the LCD screen. The token thus becomes a secret encoder/decoder device that allows players to electronically transport and send/receive secret messages and codes to each other that can only be read by players/devices that possess the correct authenticating code. An optional communication port may allow secret codes to be downloaded directly to a computer game, portable game unit or other devices using, for example, a standard USB communication port.

Retail Methods

The above-described games additionally allow for unique methods for providing a retail product to a consumer. In particular, such methods include selling a retail product, advertising the retail product, combinations of the same and the like. In general, the retail methods disclosed herein allow a consumer to purchase a product that is capable of interacting, such as through wireless communication, with a variety of devices and/or in a variety of venues. In addition, in certain embodiments, the consumer is able to "feel-out" the product by using the product for a certain period of time prior to purchasing the product. For instance, the consumer may use the retail product to participate in an interactive game, after which he/she has the option of purchasing the product as a souvenir and/or, preferably, of using the product in subsequent games and/or venues.

Furthermore, unlike magnetically-stripped cards used in certain entertainment centers to keep track of a consumer's account balance (for example, play credits) and/or awards (for example, number of tickets earned), the retail products described herein may be used in a variety of venues and/or may have an independent use or value, as described in more detail below. That is, embodiments of the retail product allow a consumer to use the product in a variety of interactive venues, while the retail product also has a separate utility or value outside the venues.

As disclosed previously herein, certain embodiments of the invention include a retail product, such as a toy device, that is provided to a consumer for interactive use in one or more venues. For exemplary purposes, the retail product will be generally referred to hereafter as a toy wand. It is contemplated, however, that the retail product may take on a variety of different forms and/or uses, examples of which are disclosed below.

Figure 24:
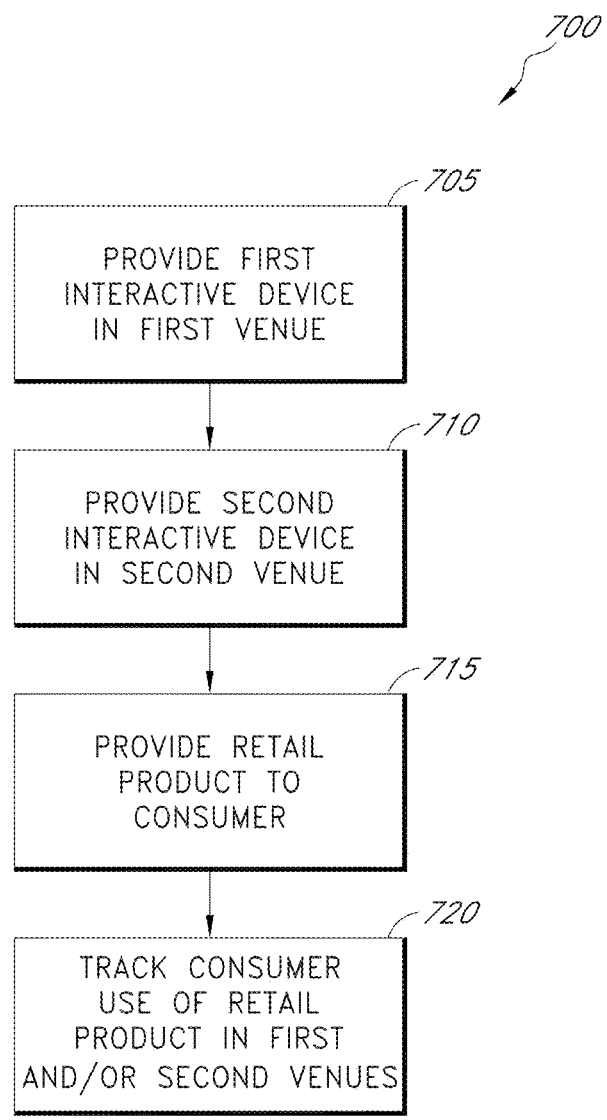
FIG. 24 illustrates a flowchart of an exemplary embodiment of a retail process of providing an interactive device for use in multiple interactive venues.

FIG. 24 illustrates an embodiment of a retail process 700 wherein a consumer is able to use a toy wand in a variety of venues. As shown, the retail process 700 begins with Block 705, wherein a first interactive device is provided in a first venue. In certain embodiments, the first interactive device is capable of producing one or more sensory, or physical, effects in response to communication to and/or from the toy wand. For instance, the first interactive device may be capable of controlling one or more play effects as described above. In certain embodiments, the first interactive device is capable of activating a light and/or sound, controlling an animated character, providing the consumer with clues to complete a challenge, providing the consumer with coupons and/or discounts, decoding riddles, providing the consumer with certain information, upgrading and/or enhancing the consumer's play experience, combinations of the same, or the like.

In certain embodiments, the first interactive device comprises an RF device, such as an RF reader and/or transceiver. In other embodiments, the first interactive device may comprise a receiver (for example, an infrared receiver), a detector, a scanner, and/or other like devices capable of communication with an external device.

At Block 710, a second interactive device is provided in a second venue. In certain embodiments, the second interactive device is also capable of producing one or more sensory effects in response to communication to and/or from the toy wand. For example, the second interactive device may be similar to the first interactive device. In yet other embodiments, the second interactive device may differ from the first interactive device.

In certain embodiments of the invention, the first and/or second venues may comprise one or more of a wide variety of facilities, locations, and/or structures. For example, one or more of the venues may comprise an interactive entertainment facility, embodiments of which are described above. In certain other embodiments, the venue(s) may comprise an amusement park, an arcade, a family entertainment center, a dentist's office, a doctor's office, an automobile, a bus, a taxi, a sports arena or field, a post office, an airplane, a store, a restaurant, a conference center, a hotel, a television set, a personal computer, a billboard, the Internet, combinations of the same, or the like.

In certain embodiments, the first venue identified in Block 705 is geographically separate from the second venue identified in Block 710. That is, the first and second venues are advantageously positioned in different locations, such as for example, different cities and/or neighborhoods.

At Block 715, the consumer is provided with the toy wand, which is capable of interfacing with the first and second interactive devices. As will be appreciated, in other embodiments, the consumer may be provided with an interactive toy or product other than a wand, such as, for example, a stuffed animal, a toy vehicle, a lunchbox, or the like. In yet other embodiments, the retail product comprises apparel (such as clothing, a hat, a backpack, shoes, or the like), jewelry (such as a necklace, a bracelet, a watch, or glasses, or the like), a collector's item (such as a card or badge), combinations of the same or the like.

Advantageously, the toy wand is of a size that may be easily transported by the consumer. In embodiments of the invention involving other types of retail products, the consumer may wear the retail product and/or attach the retail product to his/her clothing.

Furthermore, in certain preferred embodiments, the toy wand is capable of wireless communication with the first and second interactive devices. For instance, in certain embodiments, the toy wand may comprise an RF tag, such as a passive (batteryless) or an active RF tag, configured to interface with the interactive devices through RF communications, as described in more detail above. In yet other embodiments, the toy wand is configured to communicate with the first and/or second interactive devices through infrared or other wireless communications.

In certain embodiments of the invention, the retail product, such as the toy wand, advantageously comprises an object having an independent and/or intrinsic value that is separate from the use of the product in the first and second venues. For instance, the retail product may comprise a "play" value such that the consumer is able to play with the retail object as a stand-alone toy. For example, the retail object may be a stuffed animal that the consumer may play and interact with outside the first and second venues. In yet other embodiments, the retail product may comprise an independent collectible value (for example, a collector card), an independent utilitarian value (for example, a shirt), and/or an independent artistic value (for example, a figurine).

With continued reference to Block 715, providing the toy wand to the consumer may comprise loaning, renting, giving and/or selling the toy wand to the consumer. In certain embodiments, the consumer may be loaned or rented the toy wand for a period of time prior to receiving an offer to sell the toy wand, which is described in more detail below with respect to FIG. 25.

After the toy wand is provided to the consumer, the retail process 700 moves to Block 720. At Block 720, the retail process 700 tracks the consumer's use of the toy wand in the first and/or second venues. Such tracking may be performed in a variety of ways. For example, in preferred embodiments, the tracking comprises electronic tracking, such as through the use of one or more computers and/or databases.

For instance, a main computer may be used to store information relating to the consumer's use of the toy wand in the first and/or second venues. Such information may include the number of interactive devices visited by the consumer, challenges completed by the consumer, the types and/or number of "spells" cast by the consumer, the progress of the consumer in one or more interactive games, combinations of the same, or the like. In such embodiments, the main computer may be networked to a plurality of computerized devices that are associated with each interactive device. In yet other embodiments, the main computer may comprise multiple computers, and/or each venue may include its own computer that may or may not be networked to computers of other venues.

In such embodiments, the toy wand is advantageously capable of storing identification information, such as information that uniquely identifies the particular consumer or group of consumers. Such types of identification information are disclosed in more detail above and may be stored, for example, on a memory of the toy wand.

In other embodiments, the toy wand stores information regarding the use of the wand by the consumer. For instance, the toy wand may store information relating to interactive devices visited by the consumer, challenges completed by the consumer, the types and/or number of "spells" cast by the consumer, the progress of the consumer in one or more interactive games, combinations of the same, or the like. In such embodiments, the toy wand preferably comprises a memory and may communicate or upload such information to a main computer or like device.

Such tracking information may be advantageously used to analyze the consumer's use of the toy wand and/or to monitor a progress of the consumer. For instance, information gathered with respect to the consumer's use of the toy wand in the first venue may be used to customize and/or enhance the consumer's experience in the second venue or in a subsequent visit by the consumer to the first venue. For example, tracking a consumer's progress in a first interactive game in the first venue may be used to determine a "reward" obtainable by the consumer in the second venue. In yet other embodiments, such tracking may be used to analyze behavioral characteristics of the consumer and/or patterns of use of the toy wand. Information gathered from such an analysis may be subsequently used to customize the consumer's play experience as he or she interacts with particular interactive devices. For example, tracking may be used to monitor in which environments (for example, locations such as particular restaurants or stores) the consumer uses the wand.

As disclosed, the retail process 700 provides for use of the toy wand in a wide variety of venues. For instance, the consumer may use the toy wand to participate in the interactive game (the first venue) and then later use his/her toy wand in a restaurant (second venue) to obtain a coupon. In yet other embodiments, the effect the consumer experiences in the second venue may depend on his/her prior experience in the first and/or other venues. With respect to the foregoing example, for instance, the value and/or type of coupon received by the consumer in the second venue may depend, at least in part, on the consumer's progress in the interactive game in the first venue, or, alternatively, the consumer may receive a coupon from an interactive device in the first venue that may be used in the second venue.

The retail process 700 described herein is not limited to any particular sequence, and the blocks or states relating thereto can be performed in other sequences that are appropriate. For example, the toy wand may be provided to the consumer (Block 715) prior to providing the first interactive device (Block 705) and/or the second interactive device (Block 710). Furthermore, described blocks or states may be performed in an order other than that specifically disclosed, or multiple blocks or states may be combined in a single block or state.

In yet other embodiments, additional blocks may be performed by the retail process 700. For instance, the consumer may be allowed to customize the design of the toy wand prior to his/her use and/or purchase of the toy wand.

Figure 25:
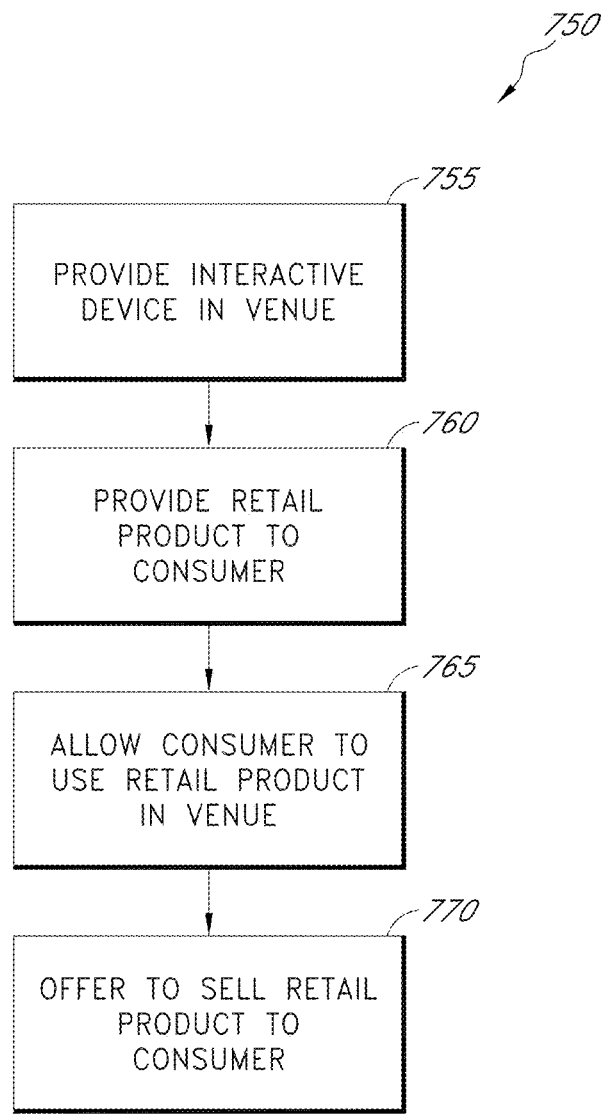
FIG. 25 illustrates a flowchart of an exemplary embodiment of a retail process for providing a consumer with an option of purchasing an interactive device after using the device in at least one venue.

FIG. 25 illustrates an example of a retail process 750 wherein a consumer has an option to purchase a retail product, such as a toy wand, after a certain period of use and/or interaction. The illustrated retail process 750 begins at Block 755 wherein an interactive device is provided in a venue. The interactive device and/or venue may comprise any of the interactive devices and/or venues described above with respect to the retail process 700 (FIG. 24).

At Block 760, the consumer is provided with the retail product, such as a toy wand. In other embodiments, the retail product may include any other of the retail products described above. In certain embodiments, in particular, the retail product advantageously comprises a product having an independent and/or intrinsic value.

In certain embodiments, the consumer is loaned or rented the toy wand for use by the consumer in the venue. As shown in Block 765, the consumer is allowed to use the toy wand in the venue for a certain period of time. For example, the consumer may be allowed to use the toy wand to interface with one or more interactive devices for a predetermined period of time, for a particular game or session, or the like.

Once the consumer has used the toy wand in the venue, the consumer is then given the option of purchasing the toy wand (Block 770). In embodiments wherein the consumer has paid money to rent the toy wand, the consumer may optionally be given an offer to purchase the toy wand at a reduced price in view of the payment(s) already made. In yet other embodiments, the consumer is able to purchase the wand after the consumer has completed or solved a particular number of games or challenges, has attained a particular progress level in an interactive game, has visited a particular number of venues and/or interactive devices, combinations of the same or the like. In yet other embodiments, the consumer may receive a particular discount on the price of the toy wand depending on his/her experience (for example, progress) in the venue.

In certain embodiments, the toy wand is offered for sale to the consumer when the consumer exits the particular venue, such as an interactive play facility. For example, a gift shop and/or other retail facility may be located near an exit of the venue. When the consumer exits the facility, he or she is given the option to either purchase or return the toy wand.

The retail process 750 advantageously provides the consumer with an opportunity to use and interact with the toy wand prior to purchase. Furthermore, it is contemplated that, once the consumer discovers the usefulness and entertainment value of the toy wand, the consumer will have an increased desire to purchase the toy wand.

Although the retail process 750 has been described with reference to particular embodiments, the blocks or states relating thereto can be performed in other sequences that are appropriate. For example, the consumer may have the option of purchasing the toy wand (Block 770) prior to using the toy wand in the venue (Block 765) and/or at any time during the consumer's participation in the venue. Details of such embodiments are discussed in U.S. patent application Ser. No. 11/274,760, filed Nov. 15, 2005, now U.S. Pat. No. 7,878,905, issued Feb. 1, 2011, which is hereby incorporated herein by reference to be considered part of this specification. Furthermore, described blocks or states may be performed in an order other than that specifically disclosed, or multiple blocks or states may be combined in a single block or state.

Figure 26:
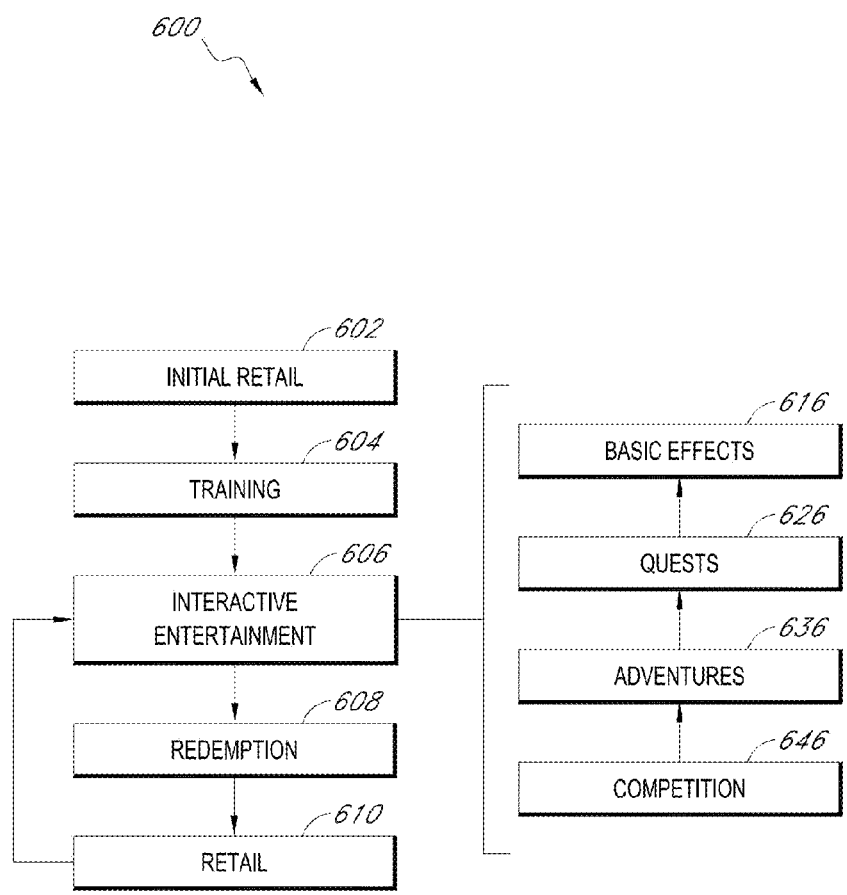
FIG. 26 illustrates a flowchart of a multi-layered interactive game that utilizes both retail and entertainment phases, according to certain embodiments of the invention.

As discussed above, systems and methods described herein may be utilized in an interactive game environment, wherein an experience of a game participant may dynamically change based on a variety of factors. FIG. 26 illustrates a flowchart of a multi-layered interactive game 600 that interleaves retail and entertainment phases, according to certain embodiments of the invention. For exemplary purposes, the interactive game 600 will be described with reference to a magic-themed game wherein game participants use a magic wand to accomplish a variety of tasks, such as one of the wands described previously. It is recognized that the interactive game 600 may be used in a variety of environments.

As shown in FIG. 26, the interactive game 600 begins with an initial retail phase (Block 602). During the retail phase, the game participant acquires (for example, purchases) an item that allows the participant to enter and participate in a gaming area or entertainment space. In certain embodiments, the item allows the participant to interact with a physical space, such as with other objects and/or other game participants. For instance, the participant may purchase a magic wand that allows the participant to pass through an entrance gate into a game area. The magic wand may then activate one or more sensors around a play space that allow a computer to track the participant's movement and progress within the game 600.

In certain embodiments, the retail phase may be performed near a gaming area, such as in an adjacent room. For instance, the retail phase may take place in a gift shop or the like. In yet other embodiments, the retail phase may be performed online by the game participant. For example, the participant may purchase an item over the Internet or other network or virtual environment.

After the retail phase, the game participant moves to the training phase (Block 604). During the training phase, the participant is provided with information relating to his or her participation in the game. For example, the participant may be provided with the rules and/or guidelines for the game via a video and/or a game character. In some embodiments, the game participant may bypass the training phase (Block 604), such as, for example, if the game participant is already familiar with the game 600 or if the game 600 does not include training.

Following the training phase, the participant moves to the interactive entertainment phase (Block 606). During the interactive entertainment phase, the participant is involved in one or more activities through which the participant may progress and/or advance in the game 600. For instance, the participant may advance through a series of clues to obtain a variety of virtual objects. A computer system may track, such as through a database, information regarding the actions of the participants during the interactive entertainment phase.

In certain embodiments, the interactive entertainment phase is dynamic and changes based on the status, experiences and/or items acquired by the participant. For example, during the interactive entertainment phase, the participant may acquire virtual objects that give the participant new abilities or spells. The computer system may then update this new information in the database and modify the interactive entertainment accordingly.

In certain embodiments, and as described in more detail below, the interactive entertainment phase comprises a variety of levels and/or layers that are interrelated. For instance, the progress of the participant during one level may directly affect the participant's advancement to and/or success in a subsequent level.

From the interactive entertainment phase, the participant may move to the redemption phase (Block 608). During the redemption phase, the participant may redeem virtual items and/or points that he or she has acquired for real items that may be obtained in a store. For instance, a participant who has acquired a certain level of points may redeem the points for a rune, such as an artifact or a jewel.

The participant may also have the option of directly purchasing an item from the retail location (Block 610). In such circumstances, the participant need not redeem or have acquired any points or objects to purchase the desired item. For example, the participant may pass through a gift shop when leaving the game area and may purchase even more items for use inside the game or as a souvenir. In other embodiments, only participants who have reached a certain level can purchase an item and/or purchase the item at a "special" and/or reduced price.

As shown in FIG. 26, once the participant has redeemed and/or purchased an item from the retail location, the participant may return to the interactive entertainment phase (Block 606) to complete one or more challenges. In certain embodiments, the items that the participant has acquired from the retail store may be decorative and/or may further assist the participant in the interactive game.

In certain embodiments, an item that is purchased from the retail area is associated with a higher "power" or strength than the powers associated with a similar item acquired through redemption and/or as a result of one or more activities. For instance, a rune that is purchased through a retail store may give a participant more powers in the interactive entertainment phase than the same rune that has been acquired by another participant through an interactive quest or may allow the participant access to certain features of the game to which participants without the rune are not allowed access.

In certain embodiments, the participant is able to end the interactive game 600 at his or her convenience. Because a computer system records the progress of the participant, the participant is able to return to the interactive game 600 at a later time and/or another day and is able to continue his or her game where he or she left off. Such a game advantageously provides for virtually endless possibilities in managing the game and allows for additional layers to be added to the interactive entertainment phase as previous phases are completed.

Although the interactive game 600 has been described with reference to particular embodiments, a wide variety of alternative sequences may be used. For example, the blocks described herein are not limited to any particular sequence, and the acts relating thereto can be performed in other sequences that are appropriate. For example, described acts or blocks may be performed in an order other than that specifically disclosed, or multiple acts or blocks may be combined in a single act or block or be performed substantially currently.

For instance, in certain embodiments, the participant may not be required to initially purchase an item (Block 602) to enter the interactive entertainment phase. Instead, the participant may be provided with a "loaner" wand for use in the interactive entertainment phase. The participant may then be given the option to purchase the wand at the end or during the game play. The participant may also be given one or more objects that may be discarded or "upgraded."

Furthermore, FIG. 26 illustrates a plurality of blocks comprised by the interactive entertainment phase represented by Block 606. In particular, the interactive entertainment phase comprises a plurality of layers that are interrelated such that progress in one or more layers may affect the participant's experience in one or more other layers. In certain embodiments, the layers are hierarchal and include upper layers that encompass one or more lower layers. As a participant completes a task or activity in one of the lower layers, he or she may be given access to, or his or her interactive experience may change, with respect to one or more of the higher layers.

As shown in FIG. 26, the interactive entertainment phase has a basic layer (Block 616). In certain embodiments, the basic layer is the first layer of game play and includes a simple magic effect, such as at least one audio, visual and/or physical effect that is activated or triggered by a device associated with the participant, such as, for example, a magic wand. For instance, a participant may enter the game place with his or her magic wand in an effort to find one or more objects. The participant may then maneuver his or her magic wand to activate a box that lights up and shows the words "You found the forest fern" or that shows a picture of a forest fern.

In other embodiments, at least one of a plurality of simple effects may be activated by the participant in the basic layer, including, but not limited to: the playing of a sound, such as a voice or a musical tone; the lighting of a crystal; the opening of a treasure chest, the playing of a musical instrument; the turning on of a video display, such as a picture; the lighting of a lantern; the talking of a book; the sounding of thunder and/or the shaking of a ground surface beneath the play participant as strobe lights flash; and combinations of the same and the like.

During the basic phase, the participant may be awarded points for each time he or she activates an effect. In certain embodiments, the points may be in the form of "gold" and/or experience points. For instance, the more experience points a participant has, the further the participant progresses in the game. The participant may even be awarded a certain level or title as he or she gathers points (for example, 0-1000 points is an Apprentice Magi; 1000-2000 points is a Beginning Magi; 2000-5000 points is an Advanced Magi; and over 5000 points is a Master Magi).

The basic layer is advantageously adapted to the beginner-level participant. Even young children, such as three- to five-year old children may enjoy an extended period of time activating various audio and/or visual effects. Such a layer is also adapted to those who are not interested in performing a more involved quest but enjoy observing the different effects possible through the use of the magic wand. In other embodiments, the basic layer is limited to participants who have purchased only the basic wand and/or a basic entrance pass.

For many participants, however, the basic layer serves as a platform to a subsequent layer, such as the quests layer illustrated by Block 626 in FIG. 26. In certain embodiments, the quests layer includes one or more interactive challenges that a participant experiences and/or completes to advance in the interactive game 600. An exemplary embodiment of such challenges is detailed below.

The quests layer may comprise a plurality of "missions" that are given to the participant by a "GameMaster" or a "QuestMaster." The participant is provided with a screen that lists all of the available quests and their associated "runes" and/or tokens. As the participant completes each quest and collects the rune(s), the magic wand of the participant is given new powers, and the participant acquires additional gold and/or experience points.

In certain embodiments, the quest sequence begins with the participant activating a main quest screen by waving his or her magic wand. A sensor near the screen detects and identifies the wand, which has a unique identification stored in the computer system. For instance, the wand may be identified by an alphanumeric code and may be associated with a game participant named "Jimmy." The main quest screen then greets this game participant by name by displaying the phrase "Welcome Magi Jimmy" and provides the game participant with a number of options. For example, the main quest screen may allow this game participant to select a "Quests" option, an "Adventures" option or a "Status" option. In certain embodiments, by selecting the "Status" option, the main quest screen displays the total gold and/or experience points this game participant has acquired and his progress on any quest or adventure he has commenced.

Figure 27A:
FIGS. 27A-27E illustrate screen shots usable with the multi-layered interactive game depicted in FIG. 26, according to certain embodiments of the invention.

When the game participant selects the "Quests" option, a display appears on the main quest screen showing twelve runes. FIG. 27A illustrates an example screen shot 650 depicting twelve different runes that are each associated with a different quest and/or that represent a special power that is granted when the participant completes the quest.

Figure 27B:
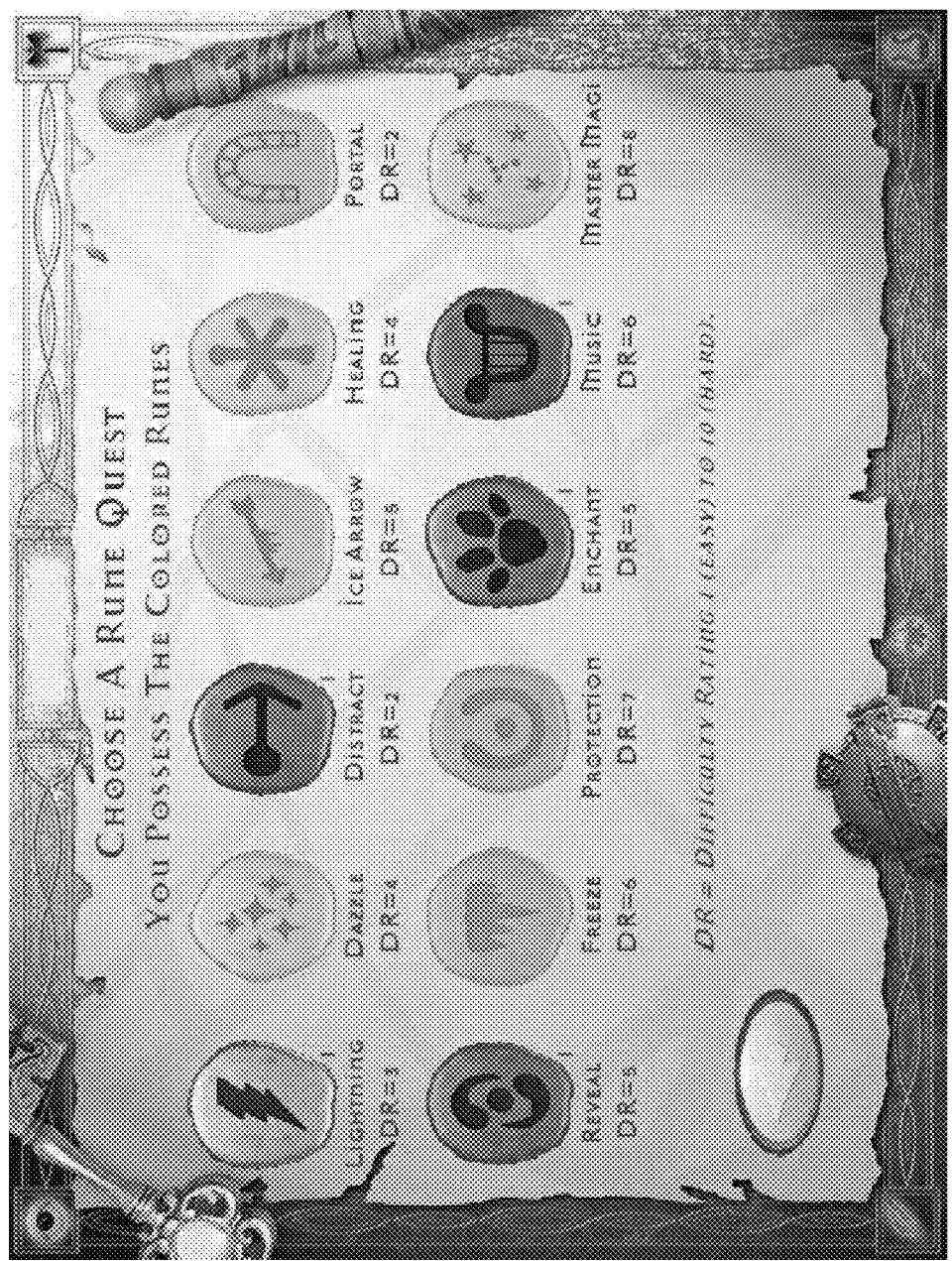

In certain embodiments, when a game participant selects a particular rune (for example, through pointing his magic wand), the QuestMaster appears on the screen (for example, as a full motion live action or an animated character) and tells the game participant a story about the rune, its powers and what the game participant must accomplish to earn the rune. Once the QuestMaster has finished talking, another screen appears that shows the game participant the physical items that he must find in the interactive game area. Each time the game participant finds a particular item, the item is highlighted on the screen with a surrounding glow. This allows the game participant to monitor which items have been found and those items that he still has yet to obtain. For instance, FIG. 27B illustrates an exemplary screen shot of a plurality of runes that can be obtained through a plurality of quests. As shown five of the runes, which are highlighted, have already been obtained by the participant (i.e., a Lightning Rune 661, a Distract Rune 662, a Reveal Rune 663, a Enchant Rune 664, and a Music Rune 665).

To accept a quest, the game participant selects an "Accept" button. This notifies the computer system that the wand associated with this particular game participant is now active with respect to the selected quest. Thus, when the game participant finds the right item, the computer system recognizes the item and rewards the game participant accordingly. In certain embodiments, if a game participant obtains the wrong item, the computer system may notify him as well.

Figure 27C:
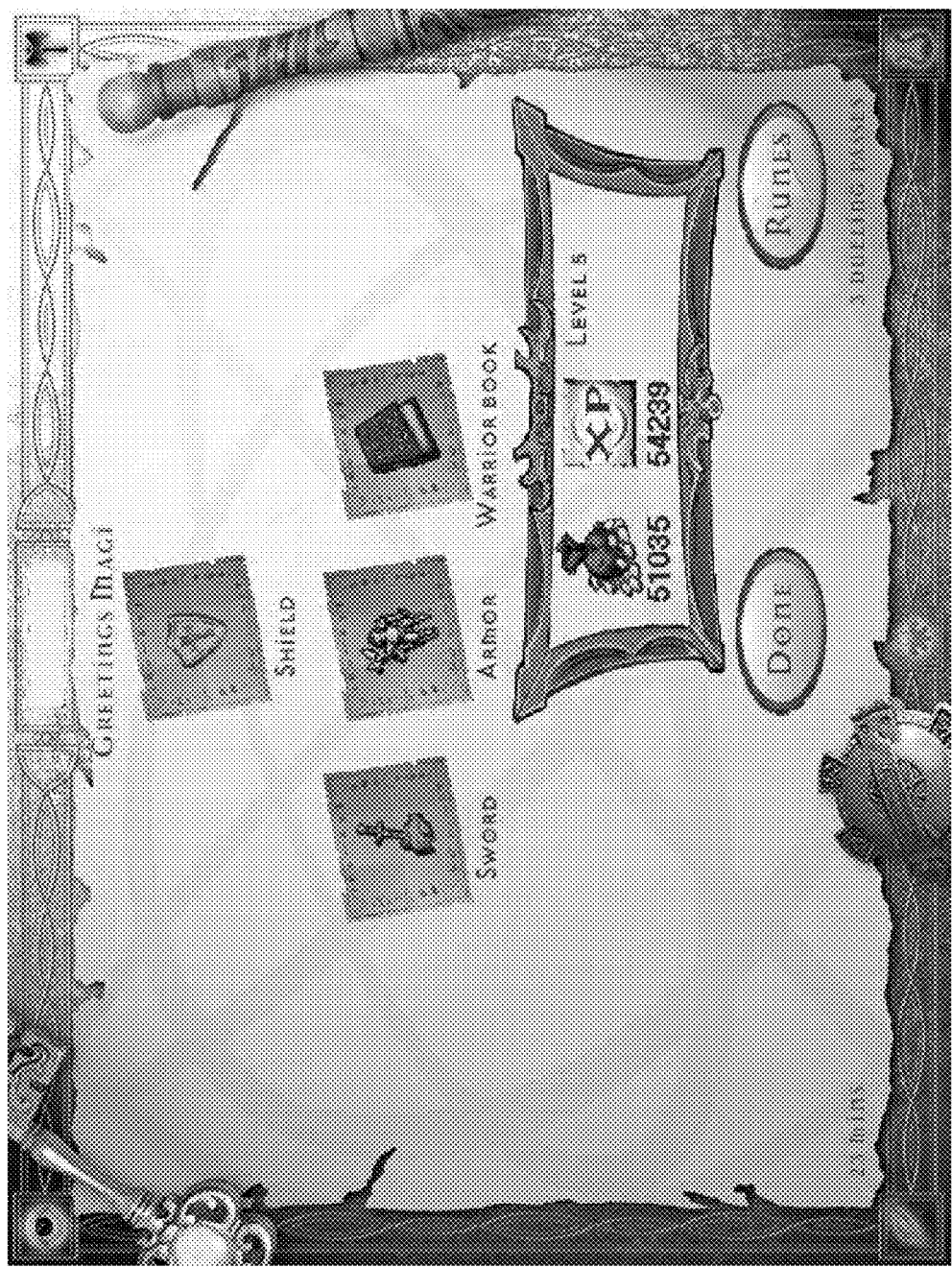

Quests may take on many different forms. For instance, a quest may comprise one or more scavenger hunts wherein the participant is required to find one or more objects identified by a list. For example, in order to complete a "Lightning Quest," a participant may be required to find a suit of armor, a shield, a sword in a stone, and a Book of Lightning. FIG. 27C illustrates an exemplary screen shot 670 that depicts the items needed to complete the Lightning Quest. Each of these items may be tangible items that are located and/or hidden in a predefined play space and identified by a sensor located on or approximate thereto. For example, the participant may "acquire" the item by waving his magic wand (or like device) at the item such that the sensor detects the wand and outputs a signal to the computer system, which records the participant's obtaining of the particular item. In other embodiments, the items may be virtual items that may be acquired when the participant completes one or more tasks and/or activities.

In certain embodiments, once the participant has acquired all the items, the participant is given one final task to collect the rune and/or complete the quest. For example, the participant may be required to contact a Duel Master, which may be an animated or live action character depicted on a screen.

In certain embodiments, a quest may contain one or more characters that respond to signals from the magic wand or like device depending on the progress of the participant in the interactive game 600. These characters may "live" in the game by being continuously depicted on a screen (whether or not they are "active"). For example, a Dragon may be asleep in his lair, snoring and exhaling smoke when no players are in the lair to challenge him. Likewise, the Duel Master may pace back and forth in his room until a player "activates" him.

For instance, the Duel Master may be activated by a participant who has completed all the elements of the particular quest (for example, finding all the items) and that directs his or her wand at the entrance to the Duel Master's house. The computer system then accesses its database to determine if the participant associated with the wand has completed all the tasks. If the participant has completed all the tasks, the computer system activates a new video sequence in which the Duel Master turns and looks at the camera, thanking the player for finding all of the items and rewarding them with the rune. An animated graphic of the Rune then appears on the screen with the Duel Master. When the participant later accesses the "Status" option on the main quest screen, the Rune is displayed as being earned by the participant and the participant may activate one or more powers associated with the Rune. For instance, a Lightning Rune may allow a participant to "zap" non-participant characters in the interactive game 600 and/or other participants in the gaming area or at a dueling station.

In other embodiments, a quest may comprise a timed event during which a participant is required to find one or more items. In yet other embodiments, a quest may comprise finding a particular object and delivering the object to another character. A skilled artisan will recognize from the disclosure herein a wide variety of alternative forms of activities and/or tasks usable with one or more quests.

With reference to FIG. 26, the interactive game 600 may comprise a subsequent level to the quests layer. As shown, the quests layer may serve as a platform to an adventures layer (Block 636). For instance, once the participant has completed a plurality of quests, he or she may move on to an adventure. As another example, once the participant has purchased additional items and/or passes in combination with or in place of completing at least one quest, the participant may move on to an adventure.

Figure 27D:
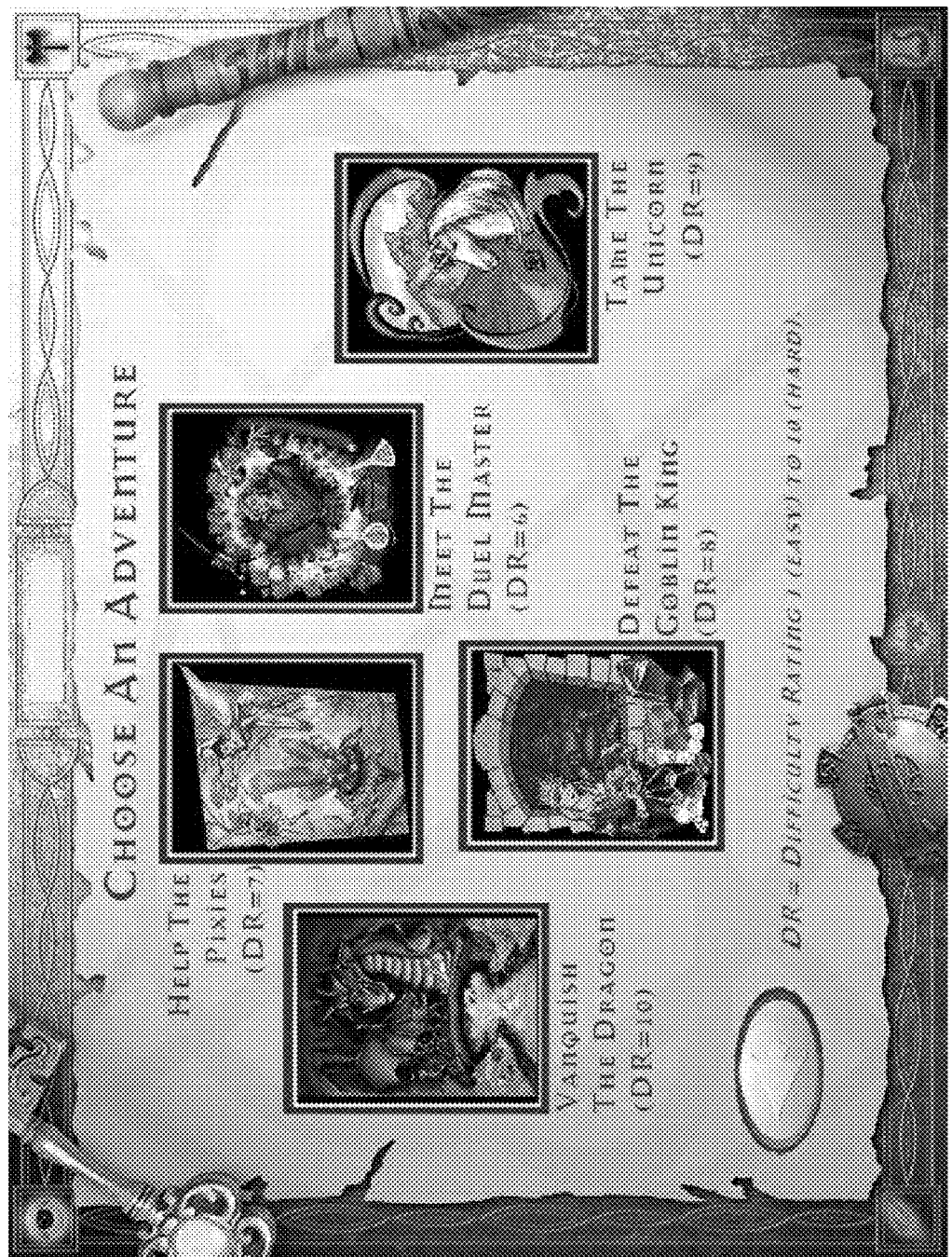

In certain embodiments, an adventure is a story within the interactive game 600 in which a participant may interact. For example, an adventure may comprise: battling a Goblin King; taming a Unicorn; assisting Pixies; meeting with the Duel Master, dueling the Dragon; and combinations of the same or the like. An example screen shot 675 for providing the participant with adventure selections is illustrated in FIG. 27D. An adventure may begin in a manner similar to a quest, wherein the participant selects from a screen a particular adventure. The QuestMaster may then deliver to the participant a story about a problem in the kingdom and the first task that must be accomplished by the participant to solve the problem. As one example, the problem may be that Dungeon Goblins have stolen a Princess's jewels. The participant may then need to battle the Goblin King to obtain the jewels and return them to the Princess.

In certain embodiments, the participant is required to complete a plurality of tasks or steps prior to completing the adventure. For instance, the participant may be required to complete one task before being informed as to the subsequent task. As one example, the participant may need to light torches, open a gate, distract a guard, battle the Goblin King, find the jewels scattered around the dungeon, and then return the jewels to the Princess.

In certain embodiments, in order to successfully complete each step of an Adventure, the participant must have acquired one or more particular runes during the quest layer. For example, to open the gate, a participant may need a Portal Rune. To distract the guard, the participant may need a Distraction Rune. To battle the Goblin King, the participant may need the Lightning Rune. As can be seen, a participant may complete an adventure only after he or she has completed particular quests.

Figure 27E:

In certain embodiments, each adventure advantageously includes an ending in which, once the adventure has been completed, a game character gives the participant a virtual magic item. FIG. 27E illustrates an exemplary screen shot 680 that depicts various awards for completing certain adventures. In certain embodiments, the virtual magic item gives the participant more power and/or ability to progress in the interactive game 600. Furthermore, the virtual magic item may also be purchased in the retail store, such as during either of the retail phases illustrated by Blocks 602 and 610. In yet other embodiments, if the participant has both purchased and earned the virtual magic item, the participant may be awarded with certain enhanced power that may be used during the interactive game 600, such as at a dueling station.

With reference to FIG. 26, the interactive game 600 may comprise a subsequent level to the adventures layer. As shown, the adventures layer may serve as a platform to a competition layer (Block 636). For instance, once the participant has completed one or more adventures, he or she may advance to the competition layer to compete with one or more other game participants. As another example, once the participant has purchased additional items and/or passes in combination with or in place of completing at least one adventure, the participant may move on to the competition layer.

The competition layer will be described hereinafter with respect to a dueling competition, wherein at least two players face off against each other by casting certain spells and using powers that they have acquired during their quests and adventures. That is, the power and/or strength of each duel participant depends on the progress of the participant in one or more other activities (for example, quests, adventures). Of course, other types of competitive games may be used during the competition layer, as will be readily apparent from the disclosure herein.

In certain embodiments, the dueling competition utilizes dueling stations that are set up as an interactive arcade-type game. The dueling stations may be located in or near the gaming area used for the quests and/or adventures, or the dueling stations may be at a remote location. For instance, the dueling stations may be located at a fast food restaurant or another recreational facility or online.

Figure 28:
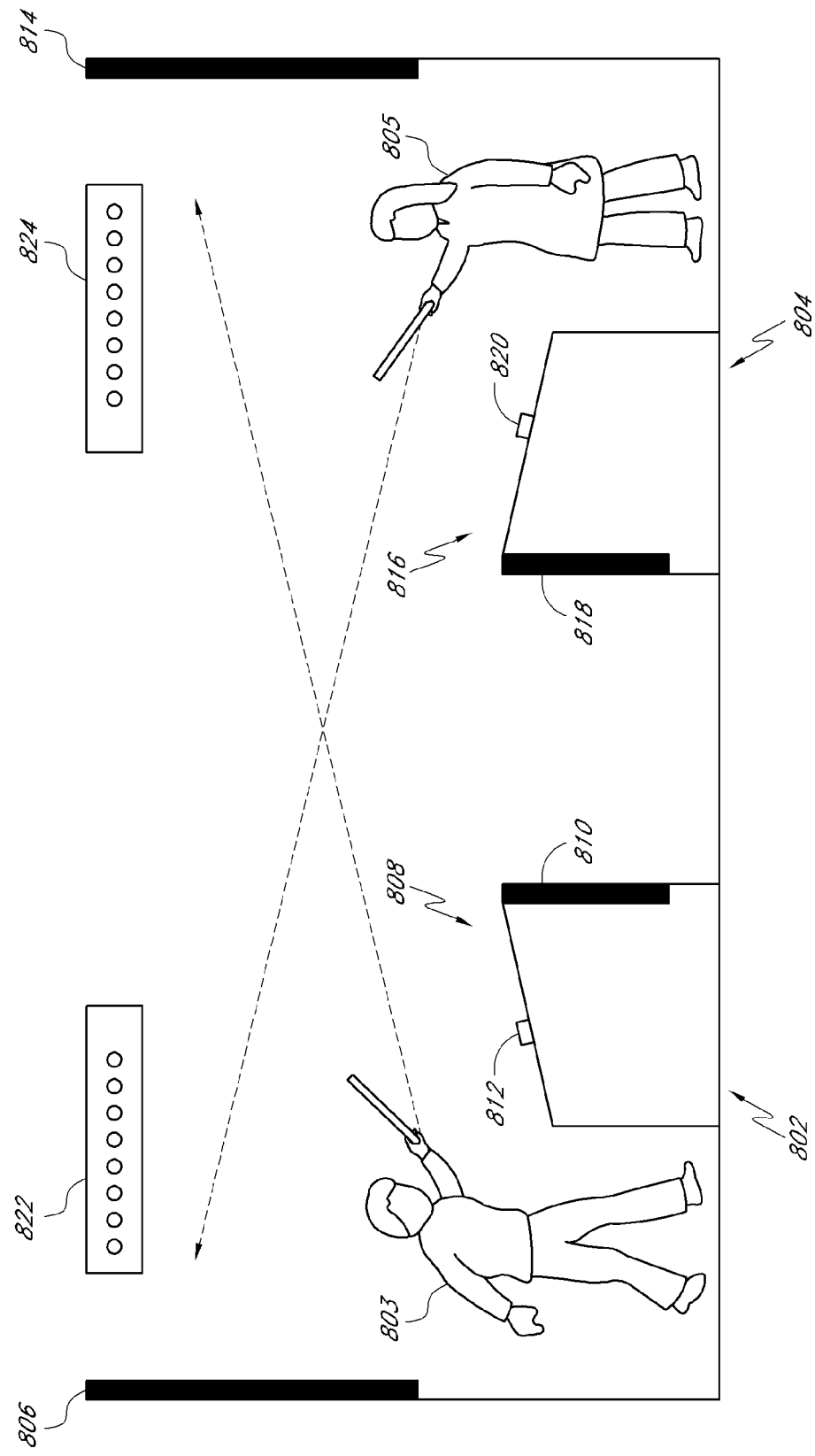
FIG. 28 illustrates dueling stations according to certain embodiments of the invention.

FIG. 28 illustrates an exemplary embodiment of dueling stations usable in the competition layer. In particular, a first dueling station 802 is used by a first participant 803 and is set up opposite a second dueling station 804 (for example, at a distance approximately twelve feet apart) usable by a second participant 805. The first dueling station 802 further includes a first rear display 806 and a first console 808, which further includes a first front display 810 and a first sensor 812. The second dueling station 804 includes a second rear display 814 and a second console 816, which further includes a second front display 818 and a second sensor 820. For example, in certain embodiments, each of the rear displays 806 and 814 comprises a projection screen, and each of the front displays 810 and 818 comprises a video monitor (for example, a 25-inch to 3D-inch monitor).

The first participant 803 is advantageously positioned to view both the second rear display 814 and the second front display 818. In certain embodiments, the second rear display 814 shows the spells (such as, for example, attack, shield and/or heal spells) cast by the second participant 805 during the duel. The second front display 818 shows the spells cast by the first participant 803 during the duel. In situations where multiple spells are cast at the same time by a single participant, the attack graphic may appear first, followed by the shield or heal graphic.

The first dueling station 802 may also include a first "mana" pole 822 that displays the current power of the first participant 803. For instance, the first mana pole 822 may include a plurality of lights (for example, eight lights) that are initially lit up at the beginning of the duel and that successively turn off as the first participant 803 loses powers. When all the lights of the mana pole 822 turn off, the first participant is out of power and is defeated. In certain embodiments, each of the lights represents ten mana/points (for example, for a total of eighty mana/points).

The second participant 805 is advantageously positioned to view both the first rear display 806 and the first front display 810. The first rear display 806 shows the spells cast by the first participant 803 during the duel. The first front display 810 shows the spells cast by the second participant 805 during the duel. The second dueling station 804 also includes a second "mana" pole 824 that displays the current power of the second participant 805.

In certain embodiments, the dueling stations 802, 804 may also include a plurality of special effect devices to enhance the dueling experience. For instance, either or both of the dueling stations 802 and 804 may include at least one fan to simulate "wind," a heating element to simulate "fire," a vibratable floor, a fog machine, multi-colored overhead lights (for example, bright white, red, blue and/or purple lights), an integrated sound system (for example, with speakers at the base of the dueling station), and combinations of the same and the like.

In certain embodiments, the sensors 812, 820 comprise illumination devices and detect "spells" cast by the participants 803, 805, respectively, maneuvering their magic wands. For instance, the sensors 812, 820 may detect at least two different qualities of spells (for example, low quality and high quality), each of which results in a different effect. In certain embodiments, the low level spell is equal to the lowest level of mana (for example, ten mana/points). For instance, a participant who casts a low-level spell may cause damage of ten mana/points to his or her opponent, while a participant who casts a high-level spell may inflict damage of twenty or thirty mana/points.

In certain embodiments, the duel between the first participant 803 and the second participant 805 begins when each of the participants hovers his or her wand about the sensors 812, 820, respectively. Each of the front displays 810 and 818 then shows symbols representing the plurality a spells for use in dueling. Furthermore, the front displays 810, 818 may highlight the spells that have been earned by the particular play participant for use in the current duel. In certain embodiments, each participant is given fire (basic attack) and shield (basic defend) spells. Each attack spell is capable of damaging the opposing participant's mana. Once one participant's mana is depleted, the other participant wins. In certain embodiments, the successful participant also earns gold and/or powers to be added to his or her interactive game profile.

Although the dueling competition has been described with reference to particular embodiments, a wide variety of alternative systems and/or devices may be used. For instance, one or more of the dueling stations may include a scoreboard that displays the current state of the duel, the names of the highest scoring players for the day, and/or current events relating to the gaming area.

Also, as will be recognized from the disclosure herein, additional layers may be added to the interactive game 600 as appropriate. For instance, the game 600 may further include an Expeditions layer, wherein the participant is required to complete one or more adventures and/or make certain purchases in order to participate in an expedition. In addition, the competition layer may be implemented before or after different layers and/or may be integrated into the layers. Moreover, retail layers may be integrated into the training and interactive entertainment layers. For example, there may be certain basic effects, quests, adventures, or competitions that cannot be completed without a certain retail purchase, and/or the participant's strength or power may be increased during the levels based on certain retail purchases.

Furthermore, although the interactive game 600 has been described with reference to particular embodiments, devices other than a wand may be used. For example, the interactive game 600 may use cards with magnetic strips, a device with an embedded RFID reader or other like electronic tag or device that stores and/or outputs a readable signal. In certain embodiments, the participant may be further associated with a compass that tracks the location of the participant and/or allows others to locate or send messages to the participant (for example, a parent contacting his or her child in the game area).

The interactive game 600 may also be performed in a plurality of locations. For instance, the adventure layer represented by Block 636 of FIG. 26 may be performed in a location different than the location of the quests layer (Block 626) and/or the competition layer (Block 646).

In addition, although the interactive game 600 is explained herein with reference to a magical-themed environment, the interactive game 600 may adapted to, but not restricted to the following themes: space, pirates, dinosaurs, time travel, Tom Sawyer, Nickelodeon, Looney Tunes, Haunted Houses, and the like. For instance, the following provides an example of a racing themed, interlinked games wherein progress within one game and/or retail purchases effect the progress and/or advancement in a second linked game.

Interlinked Games

In certain embodiments, the systems and methods disclosed herein may provide interlinked games such that as a participant earns points, levels, strengths, and the like by playing one game, those earnings affect how the participant advances to or progresses in a second game.

For example, imagine that a game participant "Joshua" plays a first car racing game and reaches Level 5 of 10 which places him at "expert level driver" with "turbo boost" strength and "ten extra spare tires." The game participant then goes to play a second car racing game that is "linked" to the first car racing game. The second car racing game recognizes this game participant, his Level 5 status of "expert level driver," his turbo boost strength and ten extra spare tires. Thus, when the game participant starts to play the second car racing game, he starts at the equivalent of Level 5 and is able to use his turbo boost strength and ten extra spare tires.

The game participant then wants to earn rocket fuel, and he discovers that in order to have rocket fuel for playing the first car racing game and/or the second car racing game, he has to compete and place in the top three in a multiple participant car racing game. If the game participant does so, he will earn rocket fuel and be able to use that fuel when he goes back to play the first car racing game and/or the second car racing game.

In addition, if the game participant wants to earn the "extreme exhaust system" for his car, then he has to purchase at least five HAPPY MEALS® at MCDONALD'S® and correctly answer twenty questions in an online quiz. Once he enters his receipt codes for his five HAPPY MEALS®, and enters the correct answers on the quiz, the game participant's status is updated to include the "extreme exhaust system." When he goes back to play the first car racing game and/or the second car racing game, the games will recognize that he has earned the extreme exhaust system.

Next, our game participant wants to obtain a "fire retardant driving jacket" to make him more likely to survive a crash in the first car racing game and/or the second car racing game. The game participant then goes to the local GYMBOREE® and purchases a particular jacket. With the particular jacket comes a special code that our game participant enters online to obtain the "fire retardant driving jacket." When the game participant returns to play the first car racing game and/or the second car racing game, the games will recognize that he has the fire retardant driving jacket. Thus, if the game participant crashes during the game, his character may survive the crash, whereas the game may end for another participant who did not get the fire retardant driving jacket.

While a car racing example has been used, it is recognized that the interlinked game system may be used in a variety of environments and may include participation in several different areas, including gaming, food service, clothing, toys, libraries, doctors, dentists, restaurants, and the like. In addition, a variety of different games could be interlinked including virtual and physical games and challenges.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A packaged retail product that allows game participant to access one or more portions or features of a computer-animated game played on multiple compatible gaming devices, said packaged retail product comprising:
   a game token representing a playable character in said computer-animated game, said game token comprising a wirelessly-powered radio-frequency identification (RFID) tag configured to wirelessly communicate and exchange information with one or more compatible RFID tag readers communicatively associated with said first gaming device, said RFID tag comprising non-volatile memory storing at least one unique identification number that uniquely identifies said game token and that enables said game participant to access a first portion or feature of said computer-animated game on a first claming device; and
   a human-readable access code comprising a unique alpha-numeric code capable of being decoded or authenticated by a second gaming device using at least one encryption key, wherein said unique alpha-numeric code provides access to a second portion or feature of said computer-animated game on the second gaming device.

2. The packaged retail product of claim 1, wherein said game token comprises a collectible toy depicting or representing said playable character.

3. The packaged retail product of claim 1, wherein said game token comprises a figurine.

4. The packaged retail product of claim 1, wherein said first portion or feature of said computer-animated game comprises a role-play adventure game, and wherein said at least one unique identification number enables said game participant to access an animated character in said role-play adventure game.

5. The packaged retail product of claim 1, wherein said second portion or feature of said computer-animated game comprises an internet-accessible online game.

6. The packaged retail product of claim 1, wherein said human-readable access code is printed on a collectible ticket or sticker included as part of said packaged retail product.

7. The packaged retail product of claim 1, wherein said unique alpha-numeric code is configured to be decrypted or authenticated by said second gaming device using said at least one unique identification number.

8. A combination toy and gaming device that provides a game participant access to one or more portions or features of a computer-animated game played on a compatible game console, said combination toy and gaming device comprising:
   a wireless-enabled toy representing a playable character in said computer-animated game and comprising a wirelessly-powered radio-frequency identification (RFID) tag configured to wirelessly communicate with one or more compatible RFID tag readers communicatively associated with said compatible game console, said RFID tag comprising non-volatile memory configured to store game-relevant information associated with said wireless-enabled toy;
   a first selection of game-relevant information stored in said non-volatile memory comprising unique information associated with said wireless-enabled toy;
   a second selection of game-relevant information stored in said non-volatile memory comprising one or more attributes of said playable character; and
   a third selection of game-relevant information stored in said non-volatile memory comprising encrypted information that can be decrypted or authenticated using an encryption key, and where at least a portion of said encryption key comprises said unique information associated with said wireless-enabled toy.

9. The combination toy and gaming device of claim 8, wherein said wireless-enabled toy comprises a figurine.

10. The combination toy and gaming device of claim 8, wherein said computer-animated game comprises a role-play adventure game, and wherein said game-relevant information enables said game participant to access an animated character in said role-play adventure game.

11. The combination toy and gaming device of claim 8, wherein said first selection of game-relevant information comprises a unique identifier that can be used to uniquely identify said wireless-enabled toy.

12. The combination toy and gaming device of claim 8, wherein said second selection of game-relevant information comprises strength, powers or abilities of said playable character in said computer-animated game.

13. The combination toy and gaming device of claim 8, wherein said third selection of game-relevant information comprises game progress information.

14. The combination toy and gaming device of claim 8, further comprising a collectible sticker comprising a human-readable unique access code that provides access to further portions or features of said computer-animated game by said game participant.

15. The combination toy and gaming device of claim 14, wherein said unique access code comprises an encrypted alpha-numeric code that can be decrypted or authenticated using said encryption key.

16. A gaming system for entertaining one or more game participants, said gaming system comprising:
   a wireless interactive toy representing a playable character in said computer-animated game and comprising a wirelessly-powered radio-frequency identification (RFID) tag comprising non-volatile memory configured to store game-relevant information associated with said wireless interactive toy;

a first selection of game-relevant information stored in said non-volatile memory comprising at least one unique identifier corresponding to said wireless interactive toy that uniquely identifies said wireless interactive toy;

a second selection of game-relevant information stored in said non-volatile memory comprising one or more attributes of said playable character;

a third selection of game-relevant information stored in said non-volatile memory comprising game progress information, and wherein at least a portion of said game progress information comprises encrypted information that can be decrypted or authenticated using one or more encryption keys; and an RFID reader configured to wirelessly power and communicate with said RFID tag to thereby ascertain said first, second and third selections of game-relevant information, said RFID reader further configured to communicate said first, second and third selections of game-relevant information to said compatible game console.

17. The gaming system of claim 16, wherein said wireless interactive toy comprises a figurine.

18. The gaming system of claim 16, wherein said computer-animated game comprises a role-play adventure game, and wherein said game-relevant information enables said game participant to access an animated character in said role-play adventure game.

19. The gaming system of claim 16, further comprising a collectible sticker comprising a human-readable unique access code that can be used by said game participant to access further portions or features of said computer-animated game, said unique access code comprising an encrypted alpha-numeric code that can be decrypted or authenticated using said one or more encryption keys.

20. The gaming system of claim 16, further comprising a fourth selection of game-relevant information stored in said non-volatile memory comprising information identifying one or more games, game consoles, or venues in which said wireless interactive toy has been used.

* * * * *

UNITED STATES PATENT AND TRADEMARK OFFICE
CERTIFICATE OF CORRECTION

PATENT NO. : 9,616,334 B2
APPLICATION NO. : 14/204330
DATED : April 11, 2017
INVENTOR(S) : Denise Chapman Weston et al.

Page 1 of 1

It is certified that error appears in the above-identified patent and that said Letters Patent is hereby corrected as shown below:

In Column 39 at Line 49, In Claim 1, change "claming" to --gaming--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*